United States Patent
Ho et al.

(10) Patent No.: US 8,468,129 B2
(45) Date of Patent: Jun. 18, 2013

(54) ASYNCHRONOUS REPLICATION OF DATABASES OF PEER NETWORKS

(75) Inventors: Matthew Ho, San Francisco, CA (US); Arthur M. Peel, San Francisco, CA (US); Alex Zuzin, San Francisco, CA (US)

(73) Assignee: Loyal3 Holdings, Inc., San Francisco, CA (US)

( * ) Notice: Subject to any disclaimer, the term of this patent is extended or adjusted under 35 U.S.C. 154(b) by 0 days.

(21) Appl. No.: 13/242,081

(22) Filed: Sep. 23, 2011

(65) Prior Publication Data

US 2013/0080385 A1 Mar. 28, 2013

(51) Int. Cl.
G06F 17/00 (2006.01)

(52) U.S. Cl.
USPC .......................................... 707/614; 709/248

(58) Field of Classification Search
None
See application file for complete search history.

(56) References Cited

U.S. PATENT DOCUMENTS

| | | | |
|---|---|---|---|
| 5,233,514 A | 8/1993 | Ayyoubi et al. | |
| 6,345,261 B1 | 2/2002 | Feidelson et al. | |
| 6,351,775 B1 | 2/2002 | Yu | |
| 6,405,207 B1 | 6/2002 | Petculescu et al. | |
| 6,574,608 B1 * | 6/2003 | Dahod et al. | 705/26.41 |
| 6,792,411 B1 | 9/2004 | Massey, Jr. | |
| 6,895,386 B1 | 5/2005 | Bachman et al. | |
| 7,149,736 B2 | 12/2006 | Chkodrov et al. | |
| 7,558,857 B2 | 7/2009 | Ammerlaan et al. | |
| 7,577,604 B2 | 8/2009 | Ogilvie | |
| 7,634,492 B2 | 12/2009 | Parker et al. | |
| 7,698,211 B2 | 4/2010 | Avery | |
| 7,801,752 B2 | 9/2010 | Neulight | |
| 7,945,463 B2 | 5/2011 | Sussman et al. | |
| 7,962,391 B2 | 6/2011 | Simon et al. | |
| 2001/0047295 A1 | 11/2001 | Tenembaum | |
| 2002/0042742 A1 | 4/2002 | Glover et al. | |
| 2002/0082969 A1 | 6/2002 | O'Keeffe et al. | |
| 2002/0087625 A1 * | 7/2002 | Toll et al. | 709/203 |

(Continued)

FOREIGN PATENT DOCUMENTS

| | | |
|---|---|---|
| WO | WO0106438 A1 | 1/2001 |
| WO | WO0131483 A2 | 5/2001 |
| WO | WO0131529 A1 | 5/2001 |

OTHER PUBLICATIONS

Bottcher et al, "An Atomic Web-Service Transaction Protocol for Mobile Environments", 2006.*
Brian Suda, "SOAP Web Services", Master of Science Computer Sicence Schools of Informatics University of Edinburgh, 2003.*

(Continued)

Primary Examiner — Hung Le
(74) Attorney, Agent, or Firm — Vierra Magen Marcus LLP

(57) ABSTRACT

User data is shared among servers or server farms, referred to transaction nodes. A user is assigned to one of multiple transaction nodes as its home when the user enrolls in a web-based service. Each transaction nodes maintains records of the users assigned to it, including blocks which are formed when a specified number of new users are assigned. A block hash value is computed based on row hash values, where one row is provided for each user. A transaction node advertises its block identifiers when there is a changed full or partial block, or at other times, to allow other transaction nodes to request a block they do not have. Changed blocks can also be advertised with their recomputed block hash value. Advertisements can be provided to transaction nodes actively accepting new users, and to a subset of transaction nodes which are deactivated and not accepting new users.

25 Claims, 36 Drawing Sheets

U.S. PATENT DOCUMENTS

| | | | |
|---|---|---|---|
| 2002/0143915 | A1 | 10/2002 | Mathieson |
| 2003/0004803 | A1 | 1/2003 | Glover et al. |
| 2003/0004809 | A1 | 1/2003 | Palcic et al. |
| 2003/0028444 | A1 | 2/2003 | Kubicek et al. |
| 2003/0083978 | A1 | 5/2003 | Brouwer |
| 2005/0086178 | A1* | 4/2005 | Xie et al. .................. 705/80 |
| 2005/0144301 | A1* | 6/2005 | Park et al. .................. 709/230 |
| 2005/0192989 | A1* | 9/2005 | Adiba et al. .................. 707/101 |
| 2005/0197857 | A1 | 9/2005 | Avery |
| 2005/0209916 | A1 | 9/2005 | Longman et al. |
| 2006/0106702 | A1* | 5/2006 | Pauw et al. .................. 705/35 |
| 2007/0056024 | A1 | 3/2007 | Hsu et al. |
| 2007/0244731 | A1 | 10/2007 | Barhydt et al. |
| 2007/0245351 | A1 | 10/2007 | Sussman et al. |
| 2008/0077505 | A1 | 3/2008 | Ilechko et al. |
| 2008/0222023 | A1 | 9/2008 | Hambrecht et al. |
| 2009/0254588 | A1 | 10/2009 | Li |
| 2009/0254844 | A1 | 10/2009 | Davidson et al. |
| 2010/0017344 | A1 | 1/2010 | Hambrecht et al. |
| 2010/0223297 | A1 | 9/2010 | Li et al. |
| 2010/0319056 | A1 | 12/2010 | Gillum et al. |
| 2011/0111734 | A1* | 5/2011 | Walker et al. .............. 455/414.1 |
| 2012/0296868 | A1* | 11/2012 | Holenstein et al. .......... 707/611 |
| 2012/0307844 | A1* | 12/2012 | Bollapalli et al. ............ 370/503 |

OTHER PUBLICATIONS

Zakaria Maamar et al, "Policies for Context-Driven Transactional Web Services", 2007.*
Baset et al, "An Analysis of the Skype Peer-to-Peer Internet Telephony Protocol", 2006.*
Johnson et al, "The Security Risks of Peer-to-Peer File Sharing Networks", 2007.*
Johnson et al, "The Evolution of the Peer-to-Peer File Sharing Industry and the Security Risks for Users", 2008.*
Parameswaran et al, P2P Networking: An Information-Sharing.*
Wice, Nathaniel, "Nit-Wit," New York Magazine online, [http://nymag.com/print/ . . . ] downloaded on Jul. 21, 2011, 3 pages.
Louko, Patrik, "Initial Public Offerings and Online IPO Auctions—Significant Advantages in Pricing?" Master's thesis, Hanken School of Economics, Helsinki, Finland, 2006, 73 pages.
Securities and Exchange Commission No-Action Letters (1990-2003), Wit Capital Corp., Jul. 14, 1999, Wolters Kluwer, 19 pages.
Securities and Exchange Commission No-Action Letters (1990-2003), Wit Capital Corp., Jul. 20, 2000, Wolters Kluwer, 8 pages.
Non-final Office Action dated Jan. 16, 2013, U.S. Appl. No. 13/242,111, filed Sep. 23, 2011.

* cited by examiner

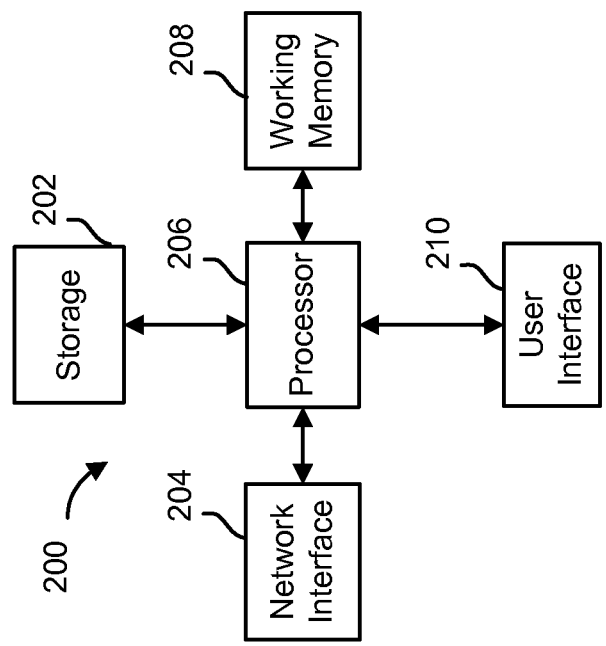

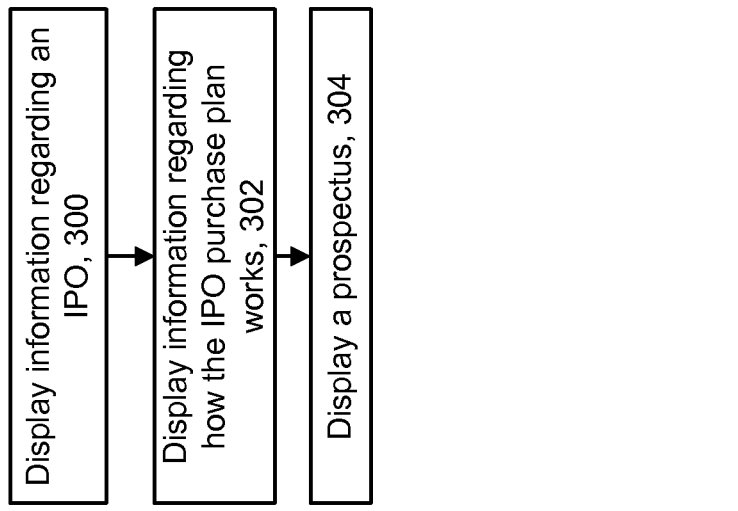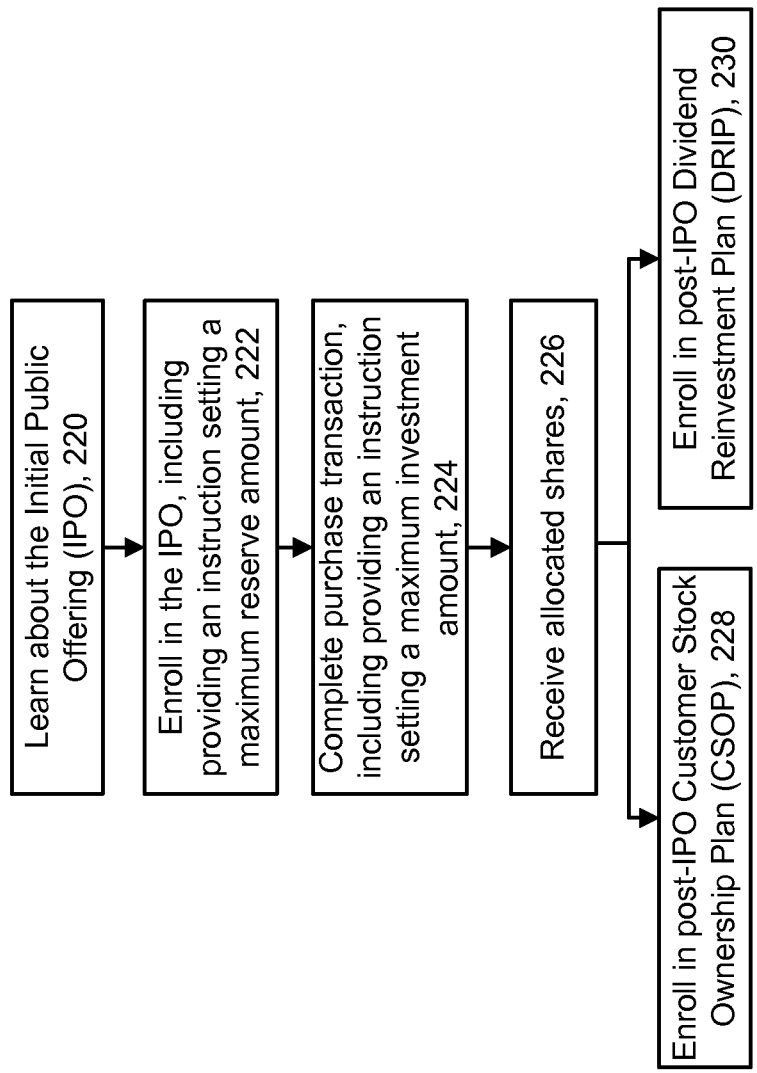

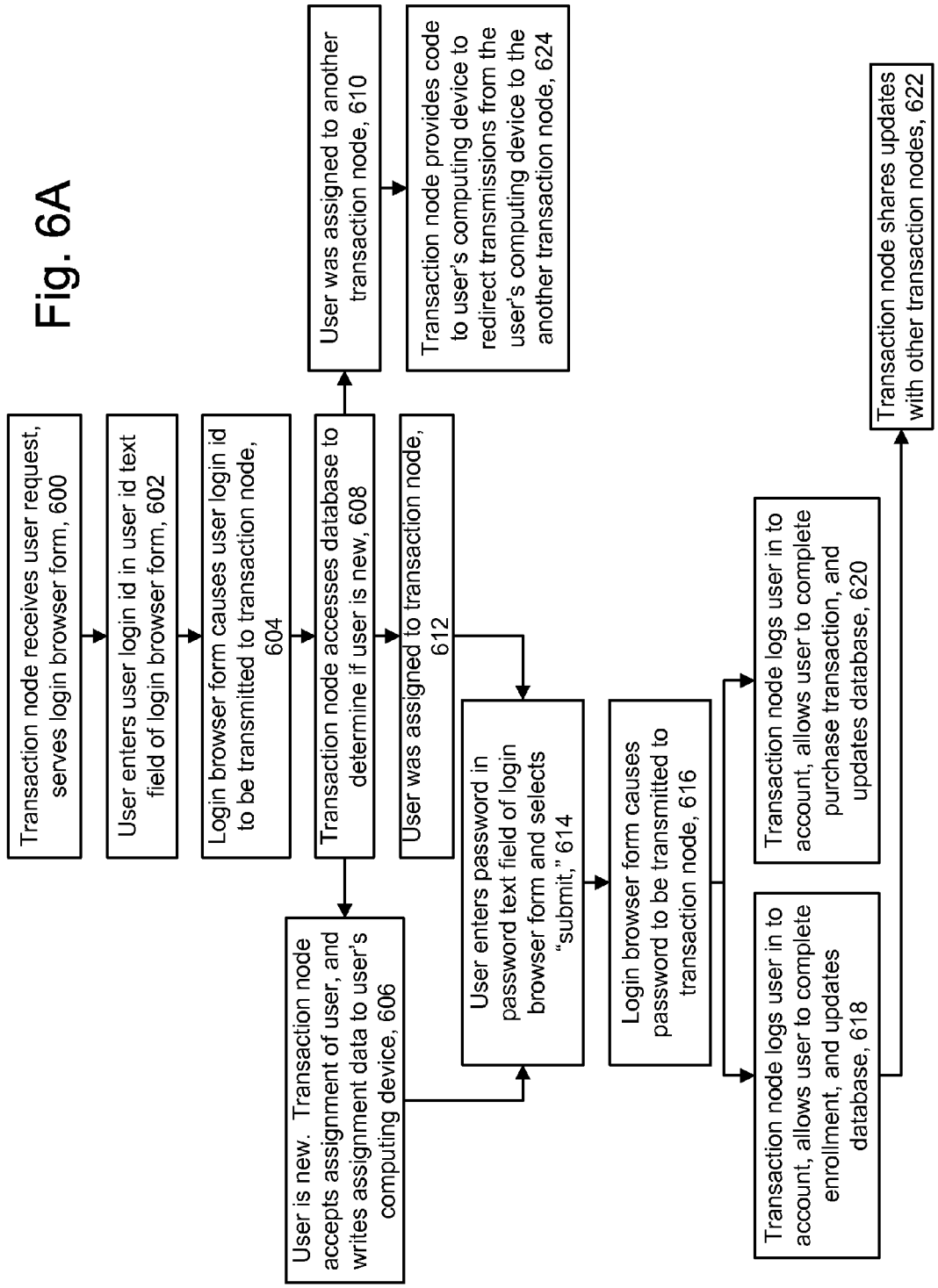

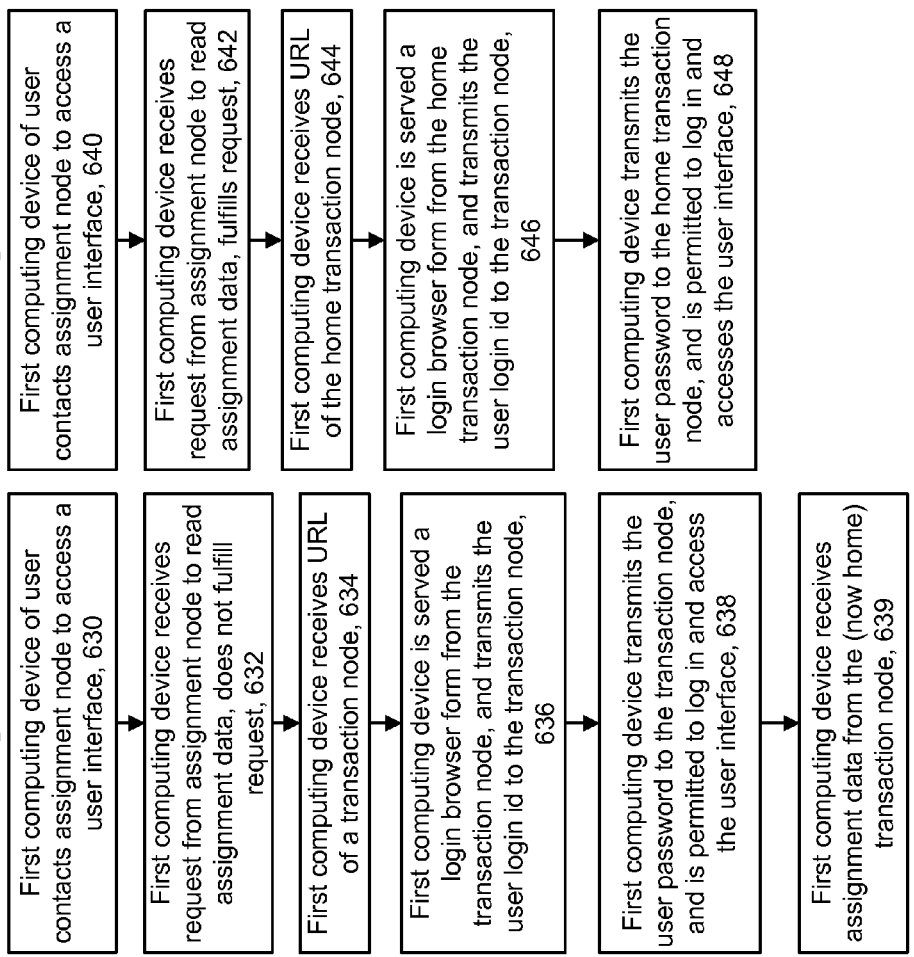

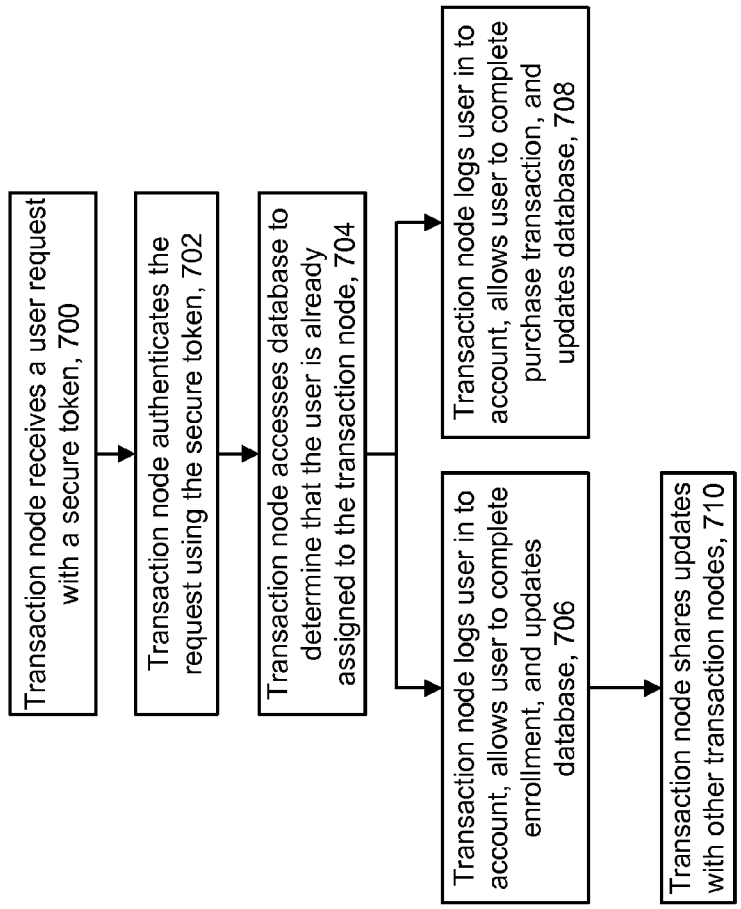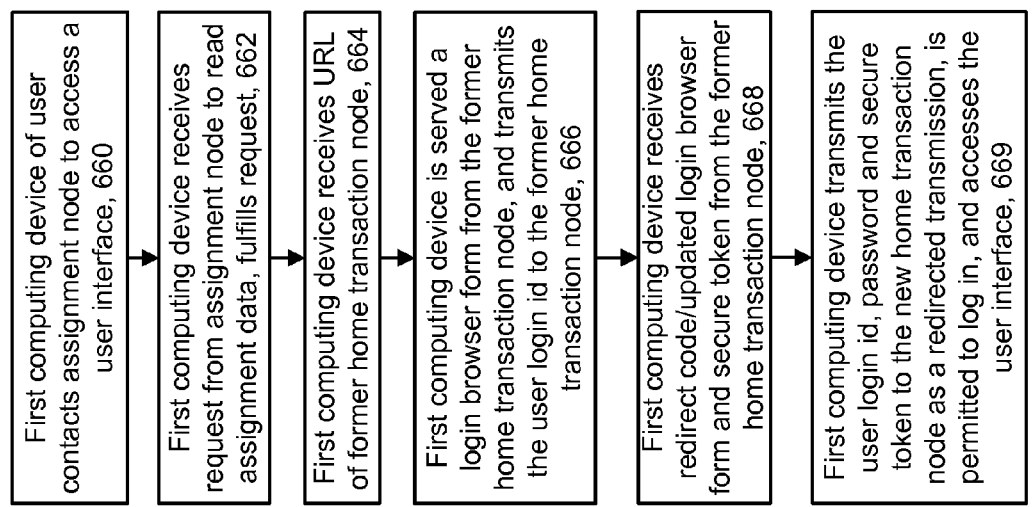

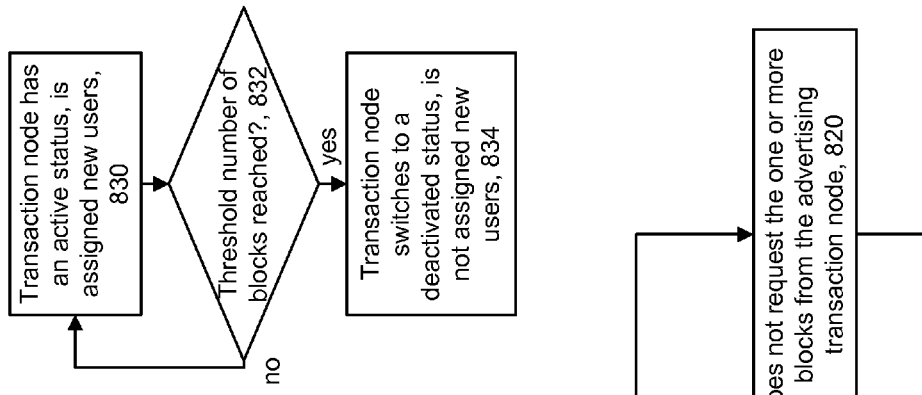
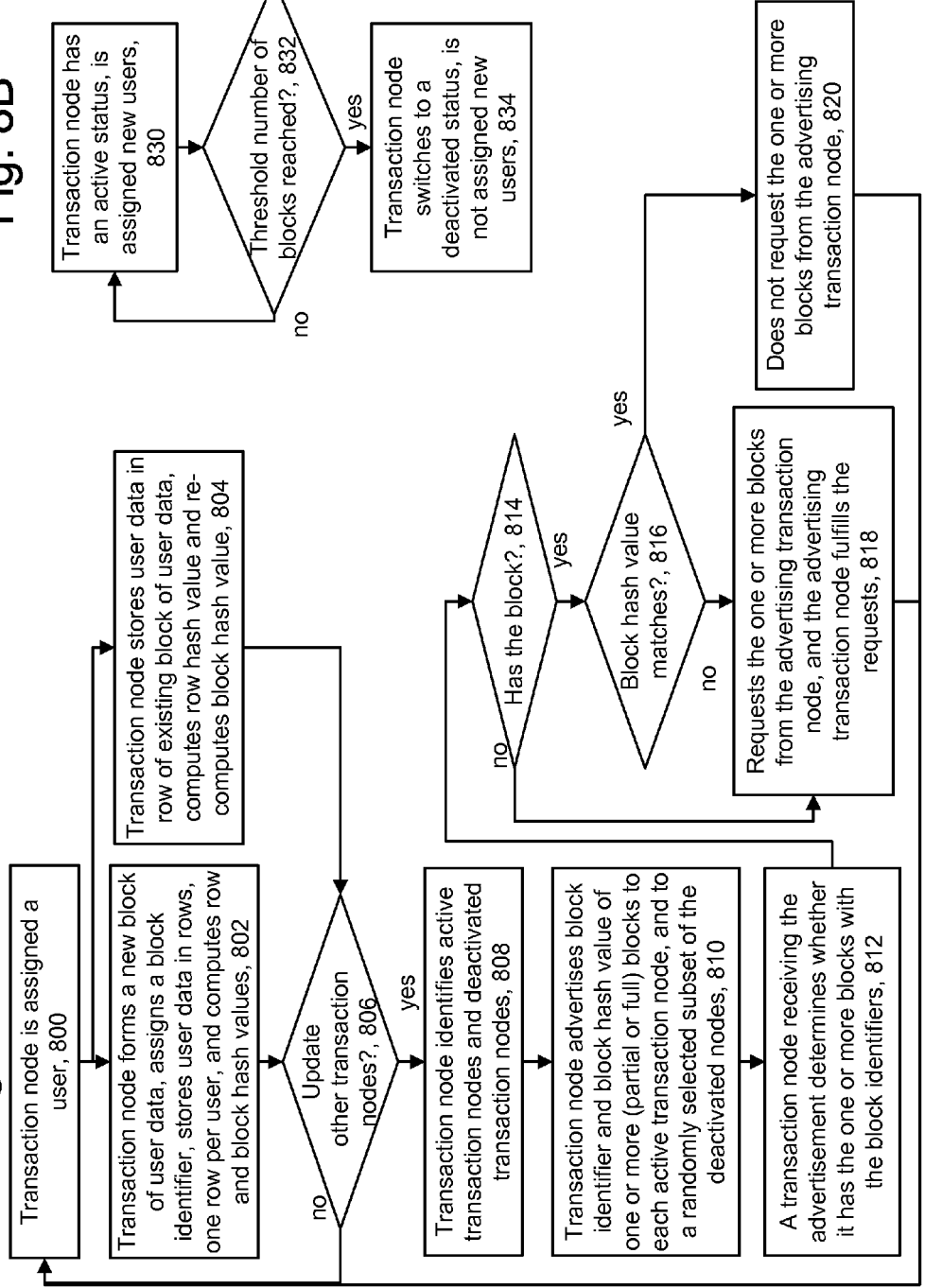

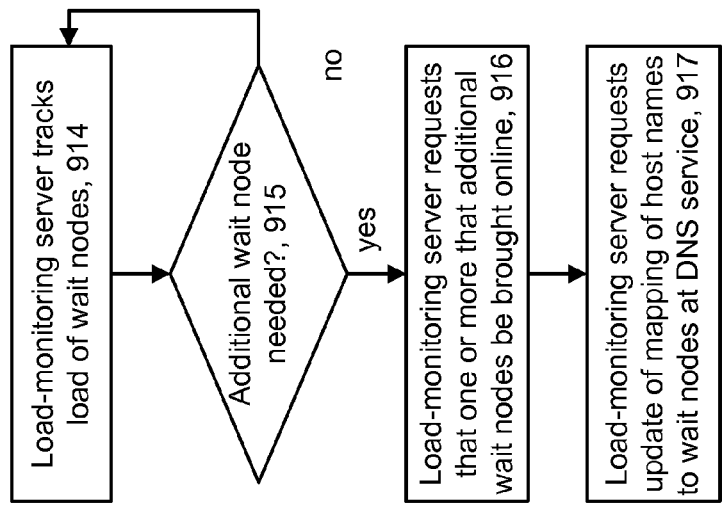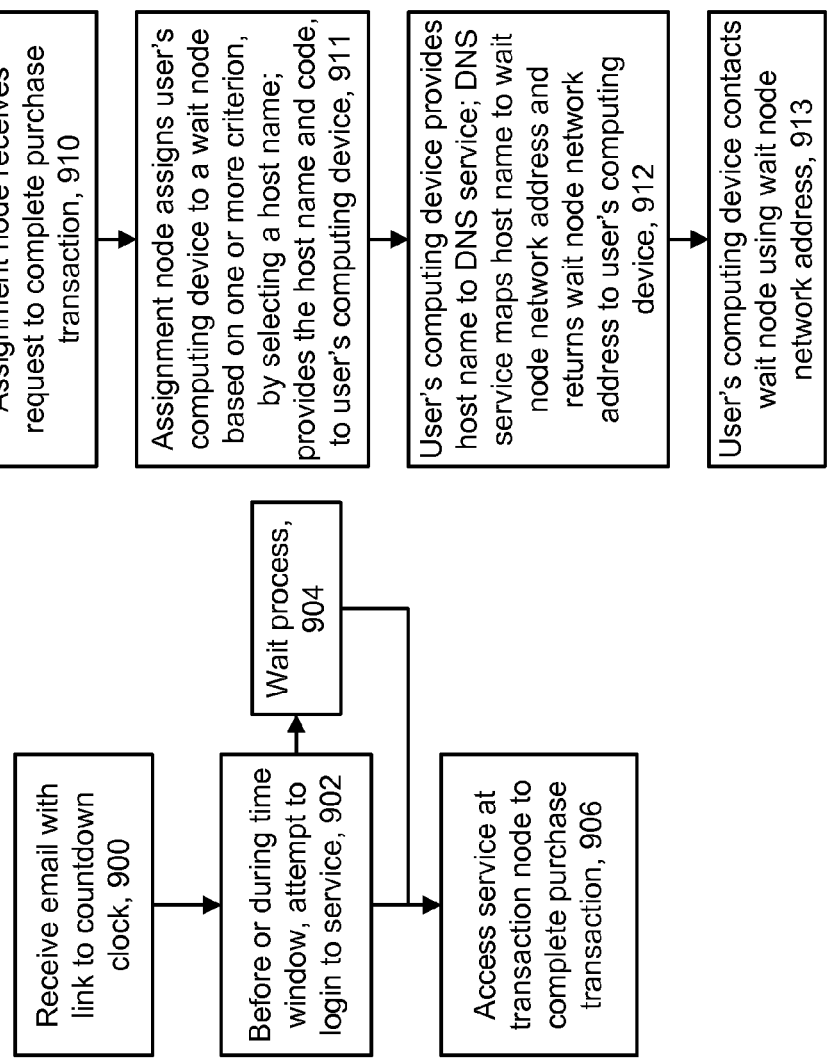

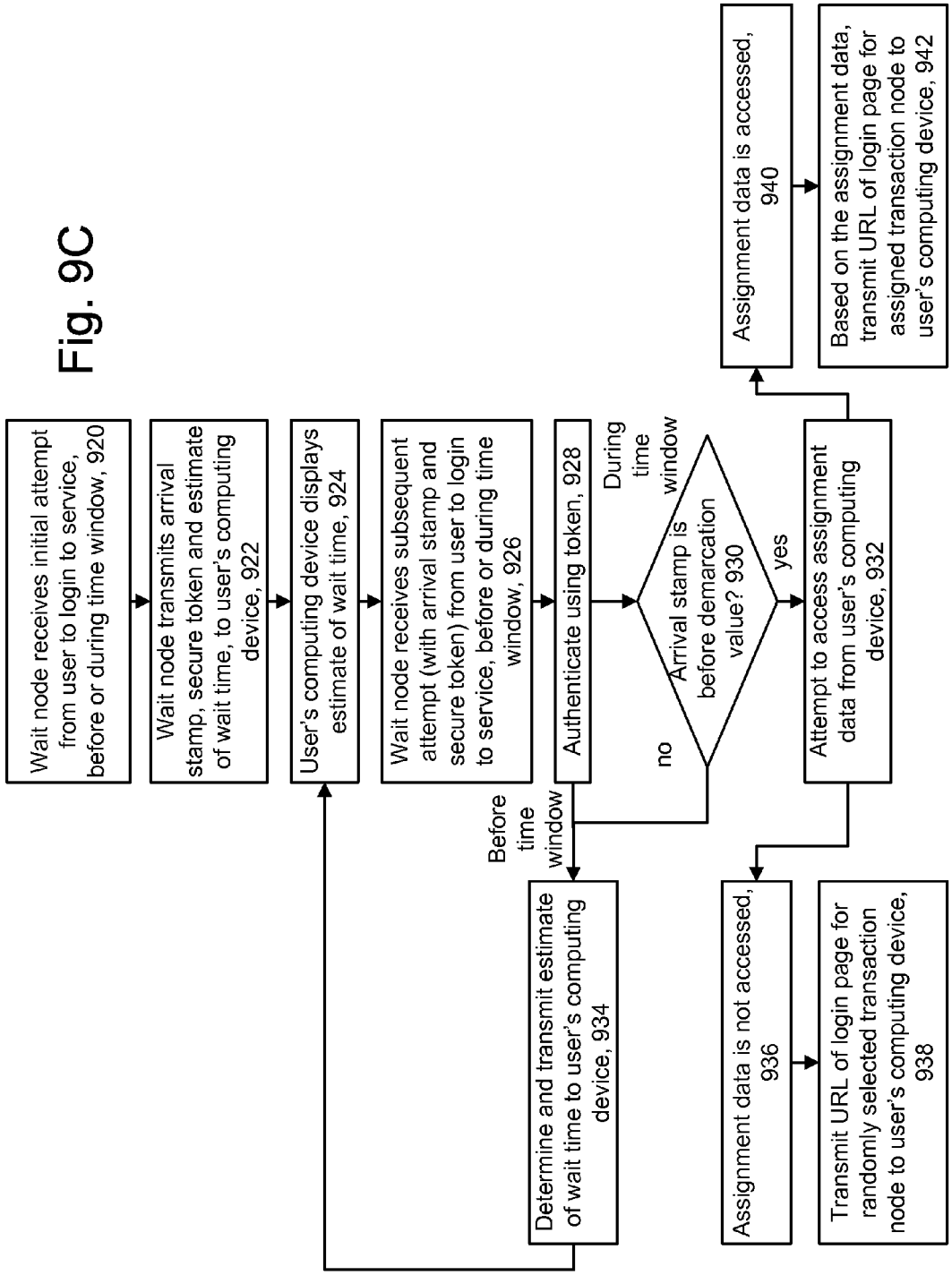

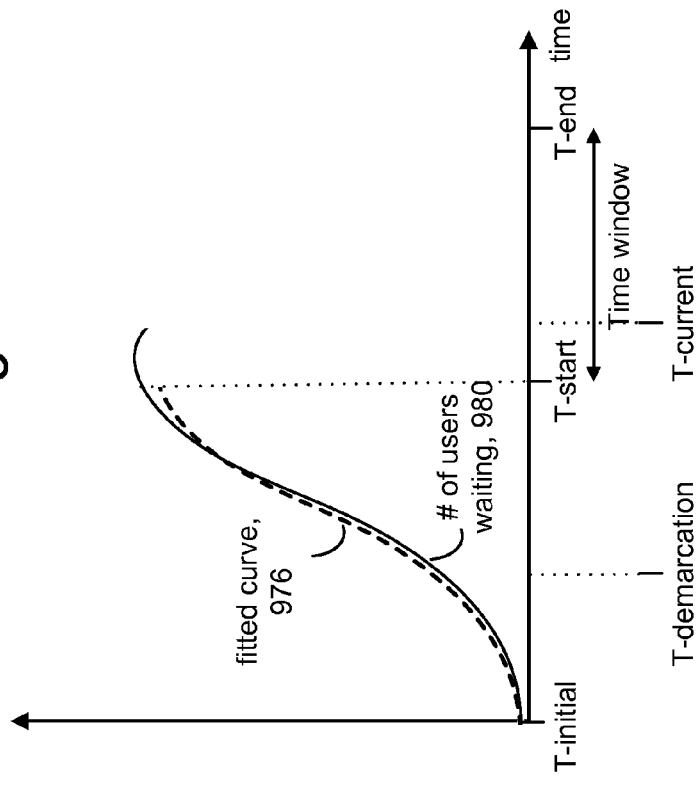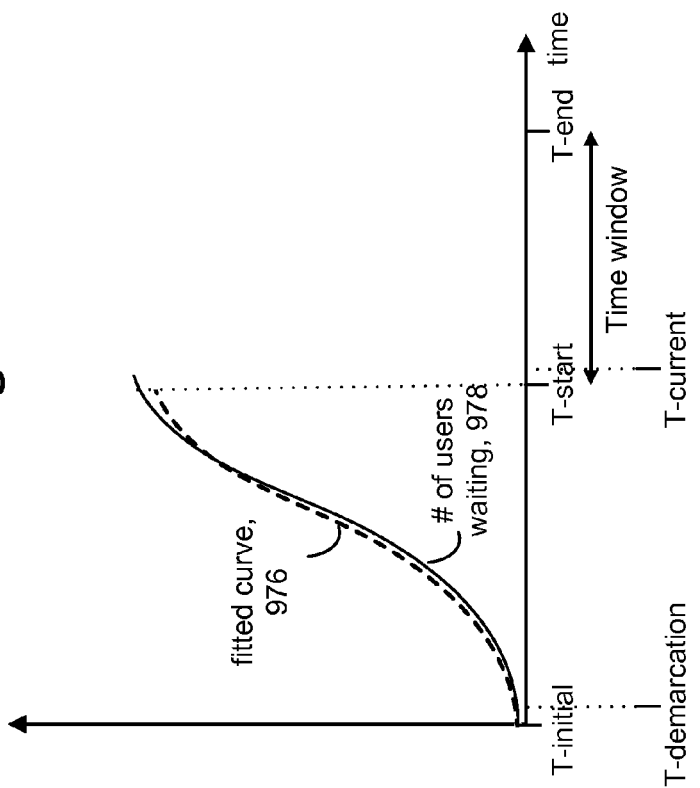

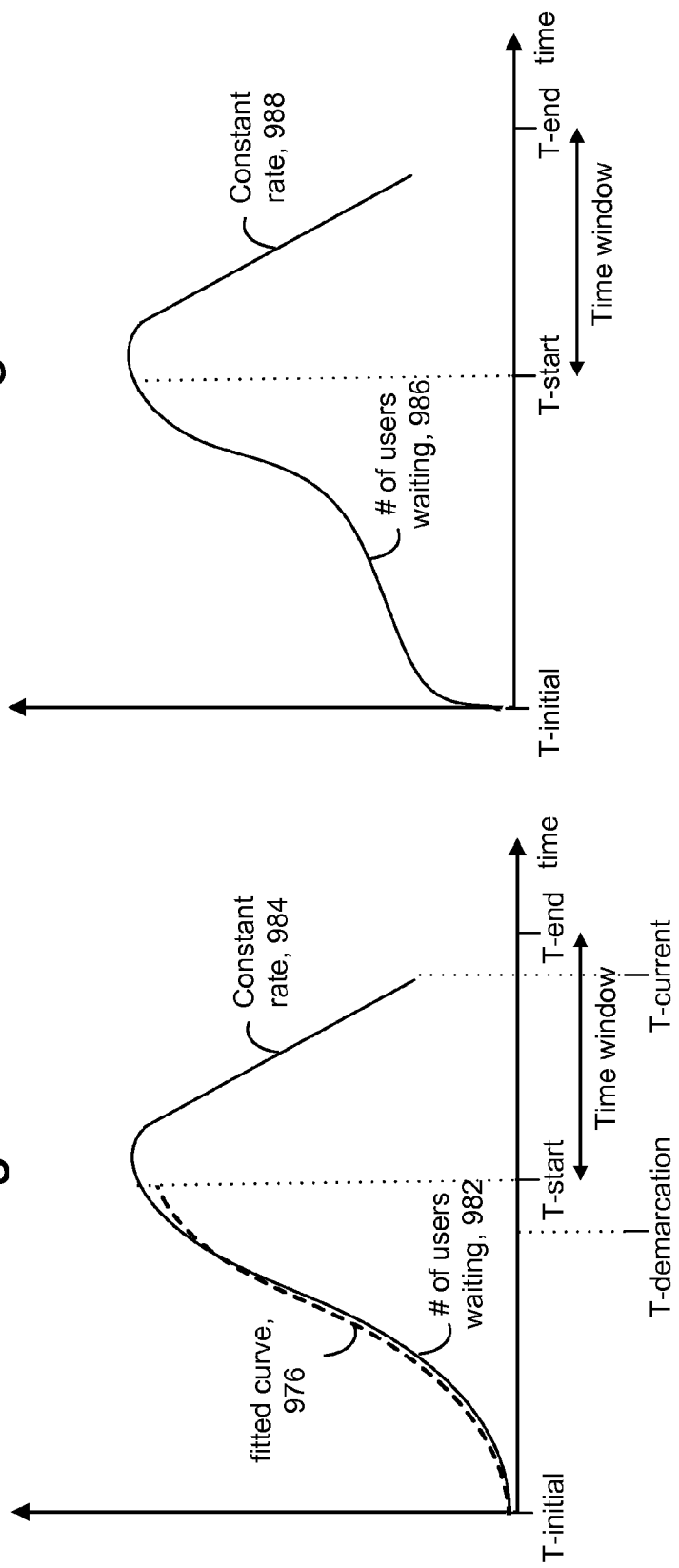

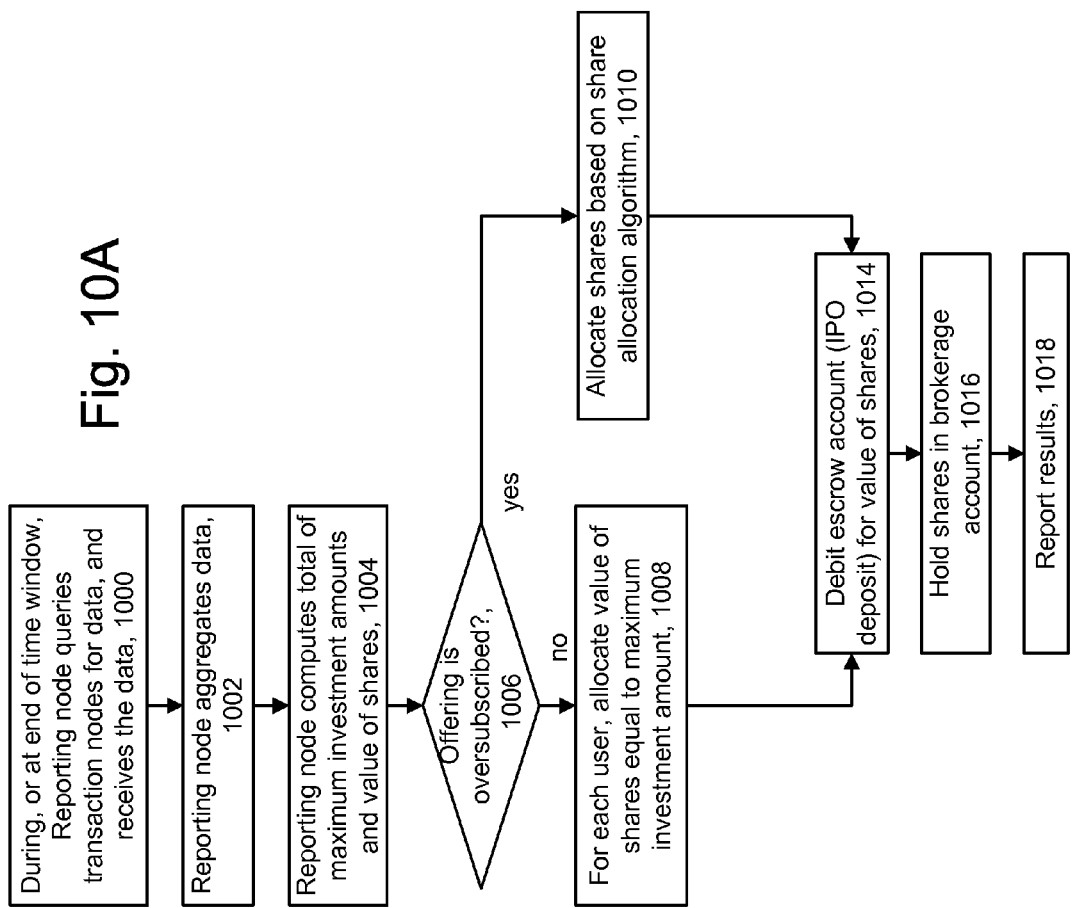

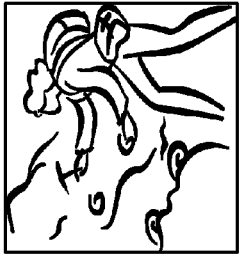

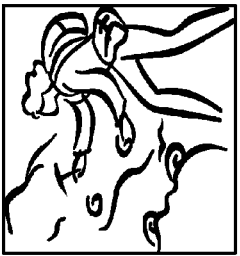

Fig. 17

User interface 1700

The Great Outdoors IPO CSOP

Web page for final decision (final share price is within expected range) 1702

The remaining time in the purchase time window is:

1 hour, 39 min ⌐1706

1704

Expected price range of shares was: $10-$20, 1712

1714

Since the final price is within the expected price range of $10-$20, you can elect to withdraw or to reduce your purchase amount. Any remaining deposit will be returned. If you don't withdraw, your reservation automatically becomes a purchase.

Final share price is: $15, 1710

1716
Your maximum reserve amount:
1722
New maximum investment amount (cannot exceed the maximum reserve amount)

1718  1720
$200

1724  1726

1720
Accept this as the maximum investment amount

1728
Accept this as the maximum investment amount

1732
Review and submit

Withdraw (I do not want to purchase any shares), 1730

1701
Current date/time: Sept. 3, 6:21pm

Fig. 18

User interface 1800

The Great Outdoors IPO CSOP

Web page for final decision (final share price is not within expected range) 1802

The remaining time in the purchase time window is:

1 hour, 39 min — 1706

1704

Since the final price is not within the expected price range of $10-$20, you must reconfirm your purchase. Otherwise, your purchase will be withdrawn. Any remaining deposit will be returned.

1814

Final share price is: $22, 1810

Expected price range of shares was: $10-$20, 1712

1716 — Your maximum reserve amount: 1718 — $200 — 1720

☐ 1720 Accept this as the maximum investment amount

1722 — New maximum investment amount: (cannot exceed the maximum reserve amount) 1724 — 1726

☐ 1728 Accept this as the maximum investment amount

Withdraw (I do not want to purchase any shares), 1730

Current date/time: Sept. 3, 6:21pm — 1701

Review and submit, 1732

ASYNCHRONOUS REPLICATION OF DATABASES OF PEER NETWORKS

CROSS-REFERENCE TO RELATED APPLICATIONS

This application is related to the following applications, each of which is incorporated herein by reference and filed herewith on Sep. 23, 2011: (1) "Web And Social Media Platform For Selling IPO Stock To Large Numbers Of Issuer's Customers," by inventors Schneider et al. (U.S. patent application Ser. No. 13/242,111, published as US2013/0080351 on Mar. 28, 2013), (2) "Massively Scalable Electronic Gating System," by inventors Ho et al. (U.S. patent application Ser. No. 13/242,100, published as US2013/0080635 on Mar. 28, 2013), and (3) "User Login With Redirect To Home Network," by inventors Ho et al. (U.S. patent application Ser. No. 13/242,091, published as US2013/0081125 on Mar. 28, 2013.

BACKGROUND

Large groups of servers in server farms are used to provide web-based services to users. Each server or server farm can maintain data of the users which is used in providing the web-based services. However, sharing of user data among the servers can be problematic, particularly in situations in which a large number of users need to access the servers in a short amount of time.

SUMMARY

Techniques are provided for sharing of user data among servers in an efficient, asynchronous manner.

In one embodiment, a computer-implemented method is provided for sharing user enrollment data among a plurality of transaction nodes. The method includes: receiving requests from users to enroll with a web-based service, the plurality of transaction nodes run separate instances of the web-based service; assigning the users to the plurality of transaction nodes, one transaction node per user; at each transaction node, maintaining one or more blocks of user enrollment data of the users assigned to the transaction node; in response to one or more of the transaction nodes being assigned a threshold number of users, designating the one or more of the transaction nodes as deactivated transaction nodes which are not assigned additional users, while a subset of transaction nodes of the plurality of transaction nodes remain as active transaction nodes and are assigned additional users; and causing the active transaction nodes to update one another regarding the one or more blocks, and to update at least one, but fewer than all, of the one or more of the deactivated transaction nodes regarding the one or more blocks.

In another embodiment, a computer-implemented method is provided for sharing user enrollment data of a plurality of transaction nodes which run separate instances of a web-based service. The method includes, at a transaction node of the plurality of transaction nodes: maintaining a database of users who are assigned to the transaction node, the database includes one or more blocks of user enrollment data of the users, each of the one or more blocks includes rows which include user identifiers of the users assigned to the transaction node, and a row hash value based on the user identifiers, where groups of the rows are arranged in the block, and each block has a block identifier and a block hash value based on the row hash values of the rows of the block; as additional users are assigned to the transaction node, advertising a block identifier and a block hash value of at least one of the blocks to at least a subset of transaction nodes of the plurality of transaction nodes; receiving a request for the at least one of the blocks from another transaction node of the subset of transaction nodes; and fulfilling the request by communicating the at least one of the blocks to the another transaction node.

In another embodiment, a computer-implemented method is provided for sharing user enrollment data of a plurality of transaction nodes which run separate instances of a web-based service. The method comprises, at a transaction node of the plurality of transaction nodes: maintaining a database of users who are assigned to the transaction node, the database includes one or more blocks of user enrollment data of the users, each block has a block identifier; as additional users are assigned to the transaction node, detecting formation of each block in the database; and in response to the detecting formation of each block in the database, advertising a block identifier of each block to each transaction node of a first subset of transaction nodes of the plurality of transaction nodes, and to at least one, but fewer than all transaction nodes of a second subset of transaction nodes of the plurality of transaction nodes.

In another embodiment, a computer-implemented method is provided for sharing user enrollment data of a plurality of transaction nodes which run separate instances of a web-based service. The method includes, at a transaction node of the plurality of transaction nodes: maintaining a database of users who are assigned to the transaction node, the database includes one or more blocks of user enrollment data of the users, each block has a hash value based on the user enrollment data of the block, and a block identifier; and detecting a change in the user enrollment data of one of the blocks and, in response, re-computing the hash value of the block and advertising the block identifier and the block hash value of the one of the blocks to each transaction node of a first subset of transaction nodes of the plurality of transaction nodes, and to at least one, but fewer than all transaction nodes of a second subset of transaction nodes of the plurality of transaction nodes.

Corresponding computer-implemented methods, apparatuses, and tangible computer readable storage devices for performed the techniques described herein are provided.

BRIEF DESCRIPTION OF THE DRAWINGS

FIG. 1B depicts an example configuration of any of the computing devices of FIG. 1.

FIG. 2 depicts a method for providing an initial public offering.

FIG. 3 further details of step 220 of FIG. 2.

FIG. 6A depicts further details of step 222 or 224 of FIG. 2, from a perspective of a transaction node.

FIGS. 6B-6D depict further details of step 222 or 224 of FIG. 2, from a user's perspective, where the user accesses an account first and second times in FIGS. 6B and 6C, respectively, from a first computing device, and a third time in FIG. 6D from a second computing device.

FIG. 6E depicts an alternative to FIG. 6C, where the home transaction node of a user changes after assignment data is written to the first computing device.

FIG. 7 depicts further details of step 222 or 224 of FIG. 2, from a perspective of a transaction node which receives a redirected request from a user.

FIG. 8A depicts further details of step 222 of FIG. 2, where a transaction node updates a database and shares a database update.

FIG. 8B depicts further details of step 808 of FIG. 8A, where a transaction node switches from an active status to a deactivated status.

FIG. 9A depicts further details of step 224 of FIG. 2, from a user perspective.

FIG. 9B1 depicts further details of step 904 of FIG. 9A, from a perspective of an assignment node, a user and a DNS service.

FIG. 9B2 depicts a process for adding a wait node based on load.

FIG. 9C depicts further details of step 904 of FIG. 9A, from a perspective of a user and a wait node.

FIG. 9H-M depict further details of advancing a demarcation value as set forth in FIG. 9E.

FIG. 10A depicts further details of step 226 of FIG. 2, from a perspective of a reporting server.

FIGS. 11-15 relate to step 222 of FIG. 2.

FIG. 11 depicts an example user interface 1100 related to step 300 of FIG. 3.

FIG. 12 depicts an example user interface 1200 related to selection 1106 of FIG. 11.

FIG. 13 depicts an example enrollment user interface 1300 which is provided in response to selection 1210 of FIG. 12.

FIG. 14 depicts an example enrollment user interface 1400 which is provided in response to selection 1316 of FIG. 13.

FIGS. 16A-20 relate to step 224 of FIG. 2.

FIG. 16A depicts an example user interface 1600 of a countdown clock which is provided in response to selection 1506 of FIG. 15A.

FIG. 16B depicts an example user interface 1620 which follows the user interface 1600 of FIG. 16A when the user is able to log in to the IPO CSOP account.

FIG. 16E depicts an example transaction user interface 1680 which follows the user interface 1660 of FIG. 16D, where the user is able to log in to complete a purchase transaction.

FIG. 17 depicts an example transaction user interface 1700 which follows the user interface 1680 of FIG. 16E, in which the user can complete a purchase transaction, where the final share price is within the expected range.

FIG. 18 depicts an example transaction user interface 1800 which follows the user interface 1680 of FIG. 16E, in which the user can complete a purchase transaction, where the final share price is not within the expected range.

FIG. 19 depicts an example transaction user interface 1900 which is provided in response to selection 1732 of FIG. 17 or 18.

FIG. 20 depicts an example transaction user interface 2000 which is provided in response to selection 1914 of FIG. 19.

DETAILED DESCRIPTION

Figure 1A:
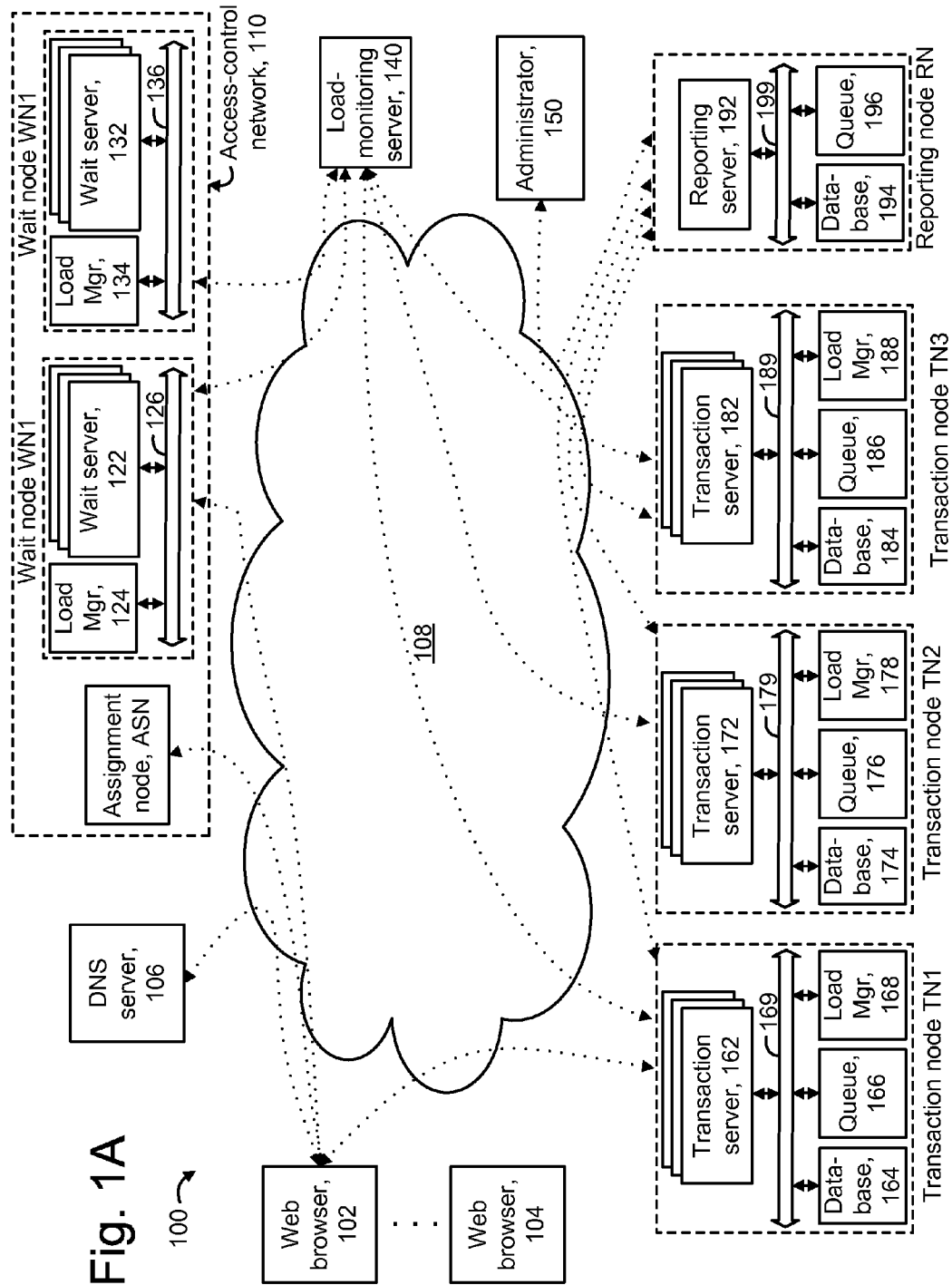
FIG. 1A depicts a computing environment 100 in which web browsers access transaction nodes.

As mentioned at the outset, multiple servers or server farms are used to provide web-based services to users. An example of a web-based service is an online IPO stock offering.

An efficient, fully electronic process is provided which allows a private company to directly offer and sell shares of their stock to investors, including small investors. A small investor can include any person who is a customer/consumer of the issuer of the stock, for instance. Small investors are sometimes referred to as retail investors and generally, but not always, include an investor of limited financial means.

For example, the web and social media platforms allow a company to offer shares to their customers and other stakeholders as well as to the general public. The company benefits in many ways. For example, the customers become "customer-owners" who have increased loyalty to the company, both as customers and shareholders. Moreover, the offering to the retail investors can be conducted alone, or as part of a larger, traditional offering in which investment banks are involved. In such a combined offering, a portion of the shares can be allocated to retail investors. Allowing the participation of retail investors democratizes the market. A private company can make shares available for very small amounts, such as $50 to $300, which are affordable to the retail investor. To facilitate such small amounts, fractional shares can be held in accounts of a brokerage house on behalf of the retail investors, where the retail investors are beneficial owners of the accounts. That is, the shares are held in street name. The retail investor can also express a desired investment amount as a currency amount, rather than a number of shares. The retail investor benefits by gaining access to offerings which were previously unavailable to them, and to loyalty rewards and offers which the issuers may provide.

Due to the large numbers of retail investors who can participate, e.g., thousands or even millions, problems of scalability are addressed to handle a large amount of communications and purchase orders, as well as handling short time windows which may be imposed to complete the purchase transactions which are involved in the offering.

An IPO Customer Stock Ownership Plan (CSOP) allows a company ("issuer") to make its own offering directly to its customers simultaneously with an underwritten offering, and to disclose them together in separate registration statements which reference each other. The company itself can promote and make its offering. In other cases, a broker-dealer acts in an underwriter capacity, e.g., is in the underwriting syndicate. The registration statement is a document which is filed with the Securities and Exchange Commission (SEC) under US laws as Form S-1. It includes a prospectus, which is the legal offering or "selling" document. The prospectus is preliminary at this point since it is not yet effective with the SEC. The prospectus describes important facts about the company's business operations, financial condition, and management. Everyone who buys the new issue, as well as anyone who is solicited to purchase the securities, must have access to the prospectus. Advantageously, the offering can be made with or without an underwriter, at the issuer's discretion. Moreover, the offer of shares and the taking of orders can both be accomplished electronically using the technology platform described herein.

The offering of the shares to customers (and to the general public) can be done by the regulatory means available to issuers in an IPO, primarily through use of notices under Rule 134 of the Securities and Exchange Act of 1934 ("Rule 134 Notices"). Traditionally, these were the "tombstone" notices in newspapers, but Rule 134 Notices provide for an issuer to send notices to persons with whom they have an existing means of communication (such as emails to customers who order items online, who receive bills by email, or who otherwise receive communications from a company), as well as to post the notices publicly, including as banner advertisements on the web or via social media platforms. Rule 134 Notices may include information about how the IPO CSOP works, and can be linked or direct persons to an offer landing page on the web with the preliminary prospectus and other relevant information.

Interested persons can click through to the landing page, which includes the preliminary prospectus (often called the "Red Herring") that has been filed with the SEC as part of the Registration Statement, and the page will be available only after the preliminary prospectus includes the estimated price range for shares in the IPO. The landing page can include information about the offering and the process for making a conditional offering or "reservation" in the offer, along with other useful information and appropriate disclaimers and disclosures. The potential investor then goes to an enrollment page to establish an account of deposit, e.g., an IPO deposit account, select the maximum amount to be invested (e.g., limited to a relatively small maximum amount such as $300) and to provide required information, including required personal data, bank information, and suitability data. From the personal data, the investor's identification can be verified, which is required for accepting an electronic signature and making the required US tax certification.

Although the offering may not involve a party which is subject to anti-money laundering requirements under the Patriot Act, or to suitability requirements for a recommendation under an IPO, the technology solution herein addresses both. It can identify, and verify the identity of, the investor, and perform an Office of Foreign Assets Control (OFAC) screening of the investor. In addition, in view of the relatively small investment amounts, it can provide a set of questions that can be electronically, e.g., automatically, reviewed to determine the suitability of the investment to the investor, based on the issuer's determination.

Investors who have made a conditional offer will receive a notice approximately two business days before the pricing of the shares is determined. The technology automatically draws funds from the IPO deposit.

At the time the price is determined, the investors will receive notice that they have a time window such as two hours to reconfirm their conditional order or to change it. At this point, the technology allows a massive number of individuals, such as up to five million individuals, to access the service and confirm their orders within the time window. With the confirmed reservations, the issuer determines the allocation of shares based on its process as described in the prospectus (such as "first come first served," pro-rata, or some other process) and accepts the offer for the final determination of shares per investor.

After the IPO CSOP, further investments can be solicited. For example, a post-IPO CSOP allows the investor to make a one-time purchase, or to set up automatic recurring purchases of the stock. Typically, a direct stock purchase plan (DSPP) allows a company to make small amounts of stock available when the company has been public for at least one year and meets certain regulatory size requirements. DSPP plans are usually offered without any fees to buy or sell stock. The post-IPO CSOP can receive interim investments in the issuer prior to the full-fledged CSOP DSPP being available one year after the IPO by having an ever-green Registration Statement on Form S-1, that is, by the issuer amending the Registration Statement and updating it with material events.

FIG. 1A depicts a computing environment 100 in which web browsers access transaction nodes. Web browsers 102, . . . , 104 are run on respective computing devices (e.g., laptops, smart phones, tablets or PCs) of users/investors who participate in the stock offering. A network cloud 108 represents the Internet or one or more other wide area or local area networks which allow the depicted components to communicate with one another. A set of transaction nodes TN1, TN2 and TN3 run separate instances of one or more online services, e.g., applications, which allow the users to participate in a stock offering as described herein. Due to the expected large numbers of users, a number of different transaction nodes can be provided, in one approach, where each node comprises a server farm. Each server in the server farm runs a separate instance of the online service as well. The online service can include one or more of a web-based service, a social media service, a mobile computing service, a service provided via the Internet, one or more intranets or other wide area networks, and the like.

TN1 includes one or more databases 164, a queue 166, a load manager 168, a communication system 169 and one or more transaction servers (including example server 162). The one or more databases 164 (e.g., database servers) store detailed information relating to the users who are assigned to TN1, as well as less detailed information of all other users, and information for communicating with other entities such as other transaction nodes, the load-monitoring server 140 and the administrator 150. The queue 166 stores requests for data from the reporting node RN. The load manager 168 manages a load of the transaction servers such as by receiving requests from the web browsers, for instance, and distributing them to the transaction servers for processing so that the load on each server is roughly even. The communication system 169 allows the database, queue, load manager and the transaction servers to communicate with one another, and with the network cloud 108. The communication system can handle routing of requests to, and responses from, the transaction servers, and can include, e.g., a bus, a network and a shared memory.

TN2 and TN3 can be arranged similarly to TN1 as peer nodes. For example, TN2 includes one or more databases 174, a queue 176, a load manager 178, a communication system 179 and one or more transaction servers (including example server 172). TN3 includes one or more databases 184, a queue 186, a load manager 188, a communication system 189 and one or more transaction servers (including example server 182).

The RN requests data from the transaction nodes for use in allocating shares and in providing reports of the offering. Requests from the RN may be queued in the queues of the transaction nodes. Responses with requested data can be queued in the queue 196 of the RN. One or more databases 194 are used to store received data and generated reports.

An access-control network 110 controls access to the transaction nodes at times of high demand by the users, such as during the time window for completing a purchase transaction, as well as at times of lower demand. The access-control network includes an assignment node ASN and example wait nodes WN1 and WN2, each of which may comprise a server farm, for instance. The assignment node receives requests from the web browsers to access the transaction nodes. When the user initially enrolls in the stock offering, the assignment server assigns the user to one of the transaction nodes, which becomes a "home" transaction node of the user. Other transaction nodes become "non-home" transaction nodes of the user. The user can access the home transaction node from time to time, during the offering, such as to enter and/or change user information such as contact information, check his or her account status, change a payment source, or perform a purchase transaction.

The transaction nodes in some cases are access-controlled and bandwidth-throttled networks.

The home transaction node can write assignment data, such as in the form of at least one cookie file, to the user's computing device when the user initially enrolls. When the user subsequently accesses the assignment node using the same computing device, the assignment node can access the assignment data and return the network address, such as a URL, of the assigned, "home" transaction node, to allow the user to again access the transaction node. If the assignment data is not available, such as when a different computing device is used, the assignment node can randomly assign the user to one of the transaction nodes. The transaction node can check its database to determine that the user has previously been assigned to another transaction node and redirect the user's computing device to that home transaction node. This feature is described further below in more detail.

The user also accesses the home transaction node during the time window for completing a purchase transaction, e.g., confirming the amount to invest, changing the amount to invest or withdrawing from the offering. However, due to high demand on the transaction nodes, the user may be required to wait to access the home transaction node. In this case, the user is assigned to one of the wait nodes, and the wait node can write an arrival stamp, such as in the form of a cookie file, to the user's computing device. The user's computing device periodically contacts the wait node with the arrival stamp to determine if the user's turn has arrived to access the transaction node. The wait node dynamically determines a wait time which is customized to the user based on the arrival stamp. When the wait node determines that a user's turn arrives, the wait node returns a URL of the transaction node which allows the user to perform the purchase transaction. A wait node can advantageously operate autonomously or semi-autonomously in making decisions to release the users to the transaction nodes. In some cases, the wait servers adjust a rate at which they release users based on information received from the load-monitoring server 140, which monitors loads of the transaction nodes. For example, the rate can be reduced if the load of the transaction nodes is above an optimal level, or increased if the load of the transaction nodes is below an optimal level. The load-monitoring server 140 can also detect a load on the wait nodes, e.g., to determine when additional wait nodes should be brought online. The same or different load-monitoring servers can monitor the transaction nodes and the wait nodes. These features are described further below in more detail.

The number of transaction nodes and wait nodes can be dynamically adjusted based on load so that additional nodes are brought online and excess nodes are taken off line as needed.

WN1 includes a load manager 124 which manages a load of one or more wait servers (including example wait server 122) arranged in a server farm, for instance, and a communication system 126 which allows the load manager and the wait servers to communicate with one another, and with the network cloud 108. The communication system 126 can handle routing requests and responses directed towards the wait servers and can include, e.g., a bus, a network and a shared memory. The load manager 124 receives requests from the web browsers, for instance, and distributes them to the wait servers for processing so that the load on each wait server is roughly even.

WN2 can be similar to WN1 and include a load manager 134, one or more wait servers (including example wait server 132) arranged in a server farm, for instance, and a communication system 136.

While the example depicts two wait nodes and three transaction nodes, typically many more of each can be provided to handle large volumes of users. Moreover, the nodes can be geographically distributed within a country or internationally. The assignment node ASN could also be a server farm or one of many such nodes.

An administrator node 150 represents a computing device of an administrator of the network who has the ability to configure and monitor the other nodes.

Note that while the access-control network is described in connection with an example implementation involving an offering of stock, the functions of the access-control network are generally applicable to any process in which access to one or more transaction nodes by a large number of users needs to be controlled. For example, situations in which a large number of users need to access one or more transaction nodes include voting, purchasing tickets to a large, popular event such as the Olympics, taking advantage of a sale of items, stock offerings other than IPOs, or other situations where the user manually interacts with a web and social media service to perform some action. The manual interacting can involve making a selection via a user interface. The functions of the transaction nodes and other components similarly are generally applicable.

The wait nodes are considered to be outside of, and independent of, the transaction nodes so that they do not share computational resources with the transaction nodes. Traffic between the users and the wait nodes does not impose a load on the transaction nodes. For example, the wait nodes can be outside of firewalls of the transaction nodes.

FIG. 1B depicts an example configuration of any of the computing devices of FIG. 1, including the user computing device and the servers. The computing device 200 is a simplified representation of a system which might be used as one of the web browsers or application server, for instance. The computing device 200 includes a storage device 202 such as a hard disk, solid state memory or portable media, a network interface 204 for communicating with other computing devices, at least one processor 206 for executing software instructions, a working memory 208 such as RAM for storing the software instructions after they are loaded from the storage device 202, for instance, and a user interface display 210 such as one or more video monitors. A user interface can be provided one or more monitors. The storage device may be considered to be a tangible, non-transitory processor- or computer-readable storage device having processor readable code embodied thereon for programming the at least one processor 206 to perform methods for providing the functionality discussed herein. The user interface display 210 can provide information to a human operator using any known display scheme, whether graphical, tabular or the like. In addition to an on-screen display, an output such as a hard copy such from a printer can be provided. One or more databases may be included in the storage device 202 when the storage device is part of a computing device such as an application server.

Further, the functionality described herein may be implemented using hardware, software or a combination of both hardware and software. For software, one or more non-transitory, tangible processor readable storage devices having processor readable code embodied thereon for programming one or more processors may be used. The non-transitory, tangible processor readable storage devices can include computer readable media such as volatile and nonvolatile media, removable and non-removable media. For example, non-transitory, tangible computer readable media may include volatile and nonvolatile, removable and non-removable media implemented in any method or technology for storage of information such as computer readable instructions, data structures, program modules or other data. Examples of non-transitory, tangible computer readable media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. In alternative embodiments, some or all of the software can be replaced by dedicated hardware including custom integrated circuits, gate arrays, FPGAs, PLDs, and special purpose processors. In one embodiment, software (stored on a storage device) implementing one or more embodiments is used to program one or more processors. The one or more processors can be in communication with one or more tangible computer readable media/storage devices, peripherals and/or communication interfaces.

FIG. 2 depicts a method for providing an initial public offering. The steps include: Learn about the Initial Public Offering (IPO), 220; Enroll in the IPO, including providing an instruction setting a maximum reserve amount, 222 (a non-binding amount to invest); Complete purchase transaction, including providing an instruction setting a maximum investment amount, 224; Receive allocated shares, 226; Enroll in post-IPO Customer Stock Ownership Plan (CSOP), 228; and Enroll in post-IPO Dividend Reinvestment Plan (DRIP), 230. Each of these steps is described in further detail below.

FIG. 3 further details of step 220 of FIG. 2. The steps include: Display information regarding an IPO, 300 (see also FIG. 11); Display information regarding how the IPO purchase plan works, 302 (which can link to a web page providing general information of the plan and the steps involved for the user); and Display a prospectus, 304 (which can link to a web page providing the preliminary prospectus, discussed previously).

Figure 4:
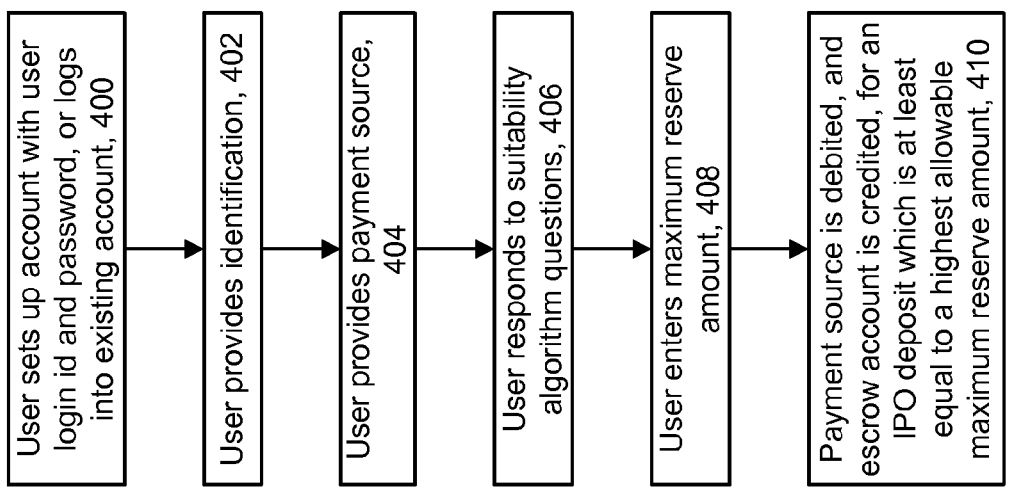
FIG. 4 further details of step 222 of FIG. 2, from a user perspective.

FIG. 4 further details of step 222 of FIG. 2, from a user perspective. The steps include: User sets up account with user login id and password, or logs into existing account, 400; User provides identification, 402 (such as name, address, email address, user login id, password, date of birth, phone number and social security number; see, e.g., FIG. 13); User provides payment source, 404 (such as information regarding a checking account, savings account or credit card; see, e.g., FIG. 13); User responds to suitability algorithm questions, 406 (see, e.g., FIG. 13); User enters maximum reserve amount, 408 (see, e.g., FIG. 13); and Payment source is debited, and escrow account is credited, for an IPO deposit which is at least equal to a highest allowable maximum reserve amount, 410. In one approach, this debit is an IPO deposit that is made with the reservation. The IPO deposit may be at least equal to the highest allowable maximum reserve amount from which the funds in the account may be used, even if the designated maximum reserve amount is less than the highest allowable maximum reserve amount. The amount required may be the highest amount or some specific higher amount. For example, the IPO deposit may be $400 when the highest allowable maximum reserve amount is $300. In another possible approach, the IPO deposit is equal to the designated maximum reserve amount.

Figure 5:
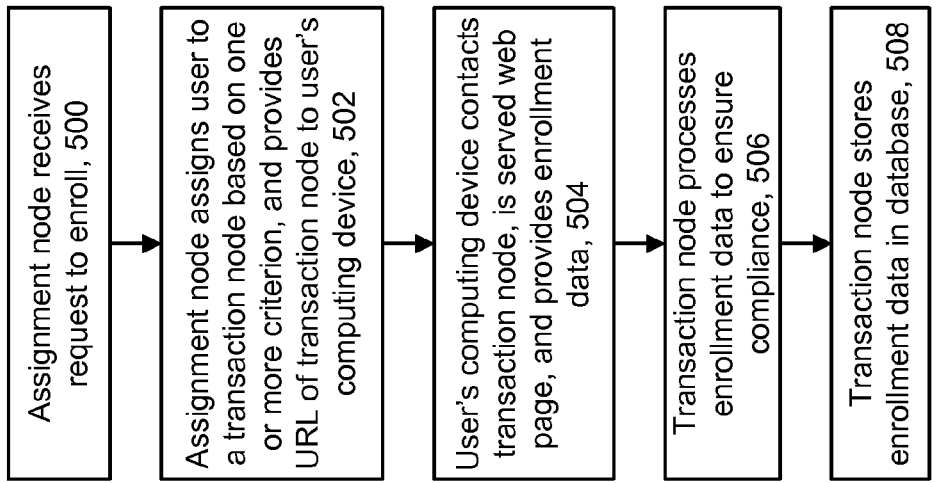
FIG. 5 depicts further details of step 222 of FIG. 2, from a network-side perspective.

FIG. 5 depicts further details of step 222 of FIG. 2, from a network-side perspective. The steps include: Assignment node receives request to enroll, 500 (see, e.g., FIGS. 13 and 14); Assignment node assigns user to a transaction node based on one or more criterion, and provides URL of transaction node to user's computing device, 502; User's computing device contacts transaction node, is served web page, and provides enrollment data, 504 (see, e.g., FIGS. 13 and 14); Transaction node processes enrollment data to ensure compliance, 506; and Transaction node stores enrollment data in database, 508 (see, e.g., FIG. 8C). The enrollment data is stored, linked to accounts of the users, in at least one database. The network-side perspective can be that of the assignment node and one or more transaction nodes, for instance.

Regarding step 502, for example, the transaction nodes can be in different geographic locations, and the requests from the web browsers of the users to enroll in the stock offering can include data indicative of geographic locations of the web browsers. The transaction nodes can be assigned to the web browsers based on the data indicative of the geographic location, so that there is a correspondence between the geographic locations of the web browsers and the geographic locations of the transaction nodes to which the web browsers are assigned. The data indicative of the geographic locations can include time zone data which is maintained by the user's computing device, or Internet Protocol addresses associated with the user's computing devices. In another approach, the transaction nodes are assigned to the web browsers based on a geographic location of a Domain Name System server which handles the requests from the web browsers to enroll, so that there is a correspondence between the geographic location of the Domain Name System server and a geographic location of the transaction nodes to which the web browsers are assigned. Alternatively, or additionally, the transaction nodes could also be assigned based on a random factor, e.g., randomly, or with some degree of randomness.

Figure 13:
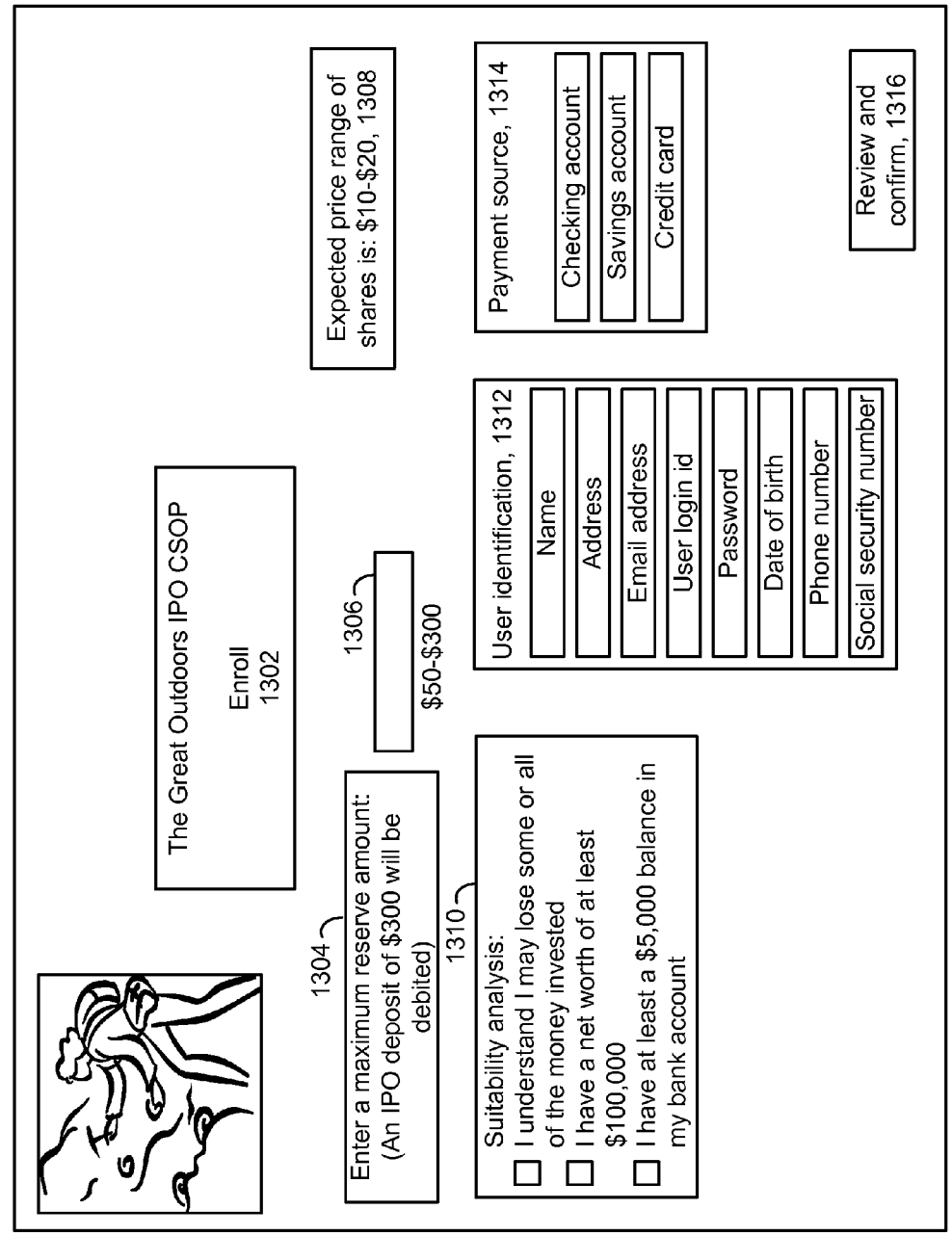

Regarding step 506, this can include ensuring that the user has filled in the required information and passed a suitability algorithm (see, e.g., FIG. 13).

FIG. 6A depicts further details of step 222 or 224 of FIG. 2, from a perspective of a transaction node. For example, this could occur when the user is accessing an enrollment user interface or a transaction user interface. The steps include: Transaction node receives user request, serves login browser form, 600 (see, e.g., FIG. 16A); User enters user login id in user id text field of login browser form, 602 (see, e.g., FIG. 16A); Login browser form causes user login id to be transmitted to transaction node, 604; and Transaction node accesses database to determine if user is new, 608 (see, e.g., FIG. 8D). Regarding steps 602 and 604, the login browser form can include code which executes automatically in the background of the web browser application, without changing an appearance or other functionality of the web browser, to detect when the user enters the user login id in the user id text field of the login browser form and provides a subsequent command such as tabbing to the password text field, clicking on the password text field, selecting a "submit" button, or otherwise causing the cursor to move outside the user id text field.

In an example implementation, the code includes asynchronous JavaScript and XML (AJAX) code, or JavaScript Object Notation. The code attaches event handlers to the form so that when the login id is entered, the login id alone is sent by the user's computing device to the non-home transaction node that sent/served the form to the user's computing device. In response to receiving the login id, the non-home transaction node provides an updated login browser form to the user's computing device. The updated login browser form is received and inserted into the web browser page. In one possible implementation, the updated login browser form posts to the correct home transaction node. That is, the updated login browser form uses the POST request method of the HTTP protocol. This protocol is used to send data to a server as part of a request, such as when uploading a file or submitting a completed form. The POST request method includes a URL, headers and a message body which allows for an arbitrary length data of any type to be sent to the server.

Using the login browser form, the user's computing device does not transmit the user's password to the non-home transaction server. Generally, when the user's computing device is served a login browser form, the form does not transmit the password to the transaction node that served the form until the login id is sent to that transaction node and the transaction node verifies that it is the home transaction node. If the serving transaction node is a non-home transaction node, it returns an updated login browser form to the user's computing device that points to the home transaction node. This happens, in the normal case, where the user types in the login id and moves on the password field and in the exceptional case, where the user first moves to the password field and types in the password then moves back to the login id field or takes some other action such as selecting the "submit" button. Thus, the password is not provided to the non-home transaction node even if the password has been typed in to the password text field of the login browser form. If the serving transaction node is the home transaction node, it configures the user's computing device to continue to communicate with the home transaction node.

Generally, for each field in the login browser form, there is a corresponding action or target. The code can modify the action or target to transmit the user login id to the non-home transaction node.

Regarding step 608, the transaction node can compare the user login id to data in its database (such as in FIG. 8D) to determine whether the user is assigned to the transaction node.

After step 608, one of three different paths is followed. A first path includes: User is new (e.g., based on FIG. 8D); and Transaction node accepts assignment of user, and writes assignment data (e.g., a cookie file with an identifier of the transaction node) to user's computing device, 606. The assignment data can be used by other entities such as the assignment node to make a best efforts attempt to direct the user to the home transaction node in a subsequent session. However, in one possible scenario, the assignment data is not always current since the user could be reassigned to a different transaction node. A transaction node can rely on its own database records rather than the assignment data stored on the user's computing device to determine whether it is the home transaction node of a user, if there is a conflict between the two.

A second path includes: User was assigned to transaction node, 612 (e.g., as determined from the data in FIG. 8C or 8D). In this case, the user was properly directed to the home transaction node. The first and second paths include: User enters password in password text field of login browser form and selects "submit," 614 (see, e.g., FIG. 16A); Login browser form causes password (optionally with the login user id) to be transmitted to transaction node, 616. Subsequently, steps 618 and 622, or step 620 are reached, as follows: Transaction node logs user in to account, allows user to complete enrollment, and updates database, 618 (see, e.g., FIG. 8C); and Transaction node shares updates with other transaction nodes, 622 (see, e.g., FIG. 8A); or Transaction node logs user in to account, allows user to complete purchase transaction, and updates database, 620 (see, e.g., FIG. 8A). Step 620 is similar to step 618 but is not followed by the transaction node sharing the update of the new user, in one approach.

A third path from step 608 includes: User was assigned to another transaction node, 610 (e.g., as determined from the data in FIG. 8D, which allows the non-home transaction node to identify the home transaction node of any user); and (non-home) Transaction node provides code (including a secure token) to user's computing device to redirect transmissions from the user's computing device to the another (home) transaction node, 624 (see, e.g., FIG. 7). For example, the code can execute automatically in the background of the web browser application, and can include asynchronous JavaScript and XML (AJAX) code, or JavaScript Object Notation. The code can identify a network address such as a URL of the home transaction node. Generally, for each field in the login browser form, there is a corresponding action or target. The code can rewrite the URL used in subsequent transmissions of the user's computing device.

Further, the code can include a secure token which is generated by the non-home transaction node, e.g., by hashing the user login id, and digitally signing the hash with a key such as a public key of the home transaction network. The secure token can be embedded in the code sent back to the web browser of the user. The user's computing device can include the secure token with each subsequent transmission that the user's computing device sends to the home transaction node. The secure token proves to the home transaction node that the subsequent transmission is genuine. This avoids the home transaction node accepting a false transmission, such as from a person that stole a user name and password and performs some type of cross-site scripting attack.

Thus, an example implementation uses public-key cryptography, which requires two separate keys, one to lock or encrypt the plaintext, and one to unlock or decrypt the cyphertext. Neither key will do both functions. One of these keys is published or public and the other is kept private. If the lock/encryption key is the one published then the system enables private communication from the public to the unlocking key's owner. If the unlock/decryption key is the one published then the system serves as a signature verifier of documents locked by the owner of the private key. In the above example, the unlock/decryption key is the one published. However, other authentication techniques can be used as well.

Advantageously, communications from the user's computing device can be redirected to the home transaction network without providing sensitive information such as the password to the non-home transaction node. Moreover, due to the ability to authenticate a received request using the secure token, the home transaction node does not need to access a separate server such as a single sign-on/authentication server. Such a server is thus avoided as a point of failure.

The process of FIG. 6A can be understood further by considering by the user's perspective, as discussed, e.g., in FIGS. 6B-6D.

FIG. 6B-6D depict further details of step 222 or 224 of FIG. 2, from a user's perspective, where the user accesses an account first and second times in FIGS. 6B and 6C, respectively, from a first computing device, and a third time in FIG. 6D from a second computing device. Thus, these can be three separate sessions.

In FIG. 6B, the steps include: First computing device of user contacts assignment node to access a user interface, 630; First computing device receives request from assignment node to read assignment data, does not fulfill request, 632; First computing device receives URL of a transaction node, 634; First computing device is served a login browser form from the transaction node, and transmits the user login id to the transaction node, 636; First computing device transmits the user password to the transaction node, and is permitted to log in and access the user interface, 638; and First computing device receives assignment data from the (now home) transaction node, 639.

In FIG. 6C, the steps include: First computing device of user contacts assignment node to access a user interface, 640; First computing device receives request from assignment node to read assignment data, fulfills request, 642; First computing device receives URL of the home transaction node, 644; First computing device is served a login browser form from the home transaction node, and transmits the user login id to the transaction node, 646; and First computing device transmits the user password to the home transaction node, and is permitted to log in and accesses the user interface, 648.

In FIG. 6D, the steps include: Second computing device of user contacts assignment node to access a user interface, 650; Second computing device receives request from assignment node to read assignment data, does not fulfill request, 652; Second computing device receives URL of a randomly-selected transaction node, 654; Second computing device is served a login browser form from the randomly-selected transaction node, and transmits the user login id to the randomly-selected transaction node, 656; Second computing device receives redirect code/updated login browser form and secure token from the randomly-selected transaction node, 658; and Second computing device transmits the user login id, password and secure token to the home transaction node as a redirected transmission, is permitted to log in, and accesses the user interface, 659.

FIG. 6E depicts an alternative to FIG. 6C, where the home transaction node of a user changes after assignment data is written to the first computing device. The steps include: First computing device of user contacts assignment node to access a user interface, 660; First computing device receives request from assignment node to read assignment data, fulfills request, 662; First computing device receives URL of former home transaction node, 664; First computing device is served a login browser form from the former home transaction node, and transmits the user login id to the former home transaction node, 666; First computing device receives redirect code/updated login browser form and secure token from the former home transaction node, 668; and First computing device transmits the user login id, password and secure token to the new home transaction node as a redirected transmission, is permitted to log in, and accesses the user interface, 669.

The home transaction node of a user can change when the user is re-assigned from a first transaction node to a second transaction node, for instance. The re-assigning can involve deleting an entry in a database of the first transaction node, and providing a new entry in a database of the second transaction node with the identifier of the second transaction node indexed to information of the user such as the user identifier and password.

FIG. 7 depicts further details of step 222 or 224 of FIG. 2, from a perspective of a transaction node which receives a redirected request from a user. As mentioned above, in some cases a user's computing device can be directed to a non-home transaction node by the assignment node or other mechanism. For example, this could occur when the user is enrolling in the offering and/or performing the purchase transaction. The user's computing device is subsequently redirected to the home transaction node.

The steps include: Transaction node receives a user request with a secure token, 700; Transaction node authenticates the request using the secure token, 702 (such as by using a public key of the transaction node); and Transaction node accesses database to determine that the user is already assigned to the transaction node, 704 (e.g., using data in FIG. 8C or 8D). Subsequently, one of two paths is followed. One path includes the steps of: Transaction node logs user in to account, allows user to complete enrollment, and updates database, 706 (FIG. 8D), followed by Transaction node shares updates with other transaction nodes, 710. Another path include the step of: Transaction node logs user in to account, allows user to complete purchase transaction, and updates database, 708. Thus, the sharing of the update is not performed in this path, in one possible implementation.

The redirect feature is generally applicable to scenarios in which users are assigned to a home transaction node of multiple transaction nodes, and is not limited to the case where the transactions involve a stock offering.

FIG. 8A depicts further details of step 222 of FIG. 2, where a transaction node updates a database and shares a database update. The steps include: Transaction node is assigned a user, 800; Transaction node forms a new block of user data, assigns a block identifier, stores user data in rows, one row per user, and computes row and block hash values, 802 (see, e.g., FIG. 8D); Transaction node stores user data in row of existing block of user data, computes row hash value and re-computes block hash value, 804; Update other transaction nodes?, 806; Transaction node identifies active transaction nodes and deactivated transaction nodes, 808 (see, e.g., FIG. 8E); Transaction node advertises block identifier and block hash value of one or more (partial or full) blocks to each active transaction node, and to a randomly selected subset of the deactivated nodes, 810; A transaction node receiving the advertisement determines whether it has the one or more blocks with the block identifiers, 812; (Receiving transaction node) Has the block?, 814; Block hash value matches? (comparing one or more block hash values of the receiving transaction node to one or more block hash values of the advertisement), 816; (Receiving transaction node) Requests the one or more blocks from the advertising transaction node, and the advertising transaction node fulfills the requests, 818; and (Receiving transaction node) Does not request the one or more blocks from the advertising transaction node, 820.

Generally, a block id can be assigned for a next new block as soon as a previous block is filled. As new users are added to the growing block, the block hash is recomputed and updates are sent to the other transaction nodes as described elsewhere. An active transaction node can send an advertisement for each new user which is added, in one approach. An active transaction node continues to accept new user assignments, while a deactivated transaction node does not. In one approach, the sharing of updates occurs sooner and more frequently to other active transaction nodes than to other deactivated transaction nodes. It is more urgent for an active transaction node than a deactivated transaction node to receive an update regarding user enrollment data so that two transaction nodes do not enroll, and become home transaction nodes to, the same user. In one approach, an active transaction node can receive an update of a partial block, e.g., one or more rows, while a deactivated transaction node receives an update only of a full block, or perhaps multiple full blocks. The frequent updating of active transaction nodes generates more network traffic but ensures that any other active transaction nodes are informed of new users as soon as possible.

The active transaction nodes are a first subset of transaction nodes of the plurality of transaction nodes, and the deactivated transaction nodes are a second subset of transaction nodes of the plurality of transaction nodes.

Generally, when a new user is assigned to a transaction node, and the user performs actions such as enrolling in a stock offering and/or performing a purchase transaction, the transaction node provides a new entry/row for the user in one or more databases. For example, the transaction node may use one database to maintain detailed information regarding the user such as described in FIG. 8C. This information need not be shared, since the other transaction nodes have no need for such details. However, the transaction node also maintains another database or record with less detailed information which is shared with other transaction nodes, so that a non-home transaction node will be able to redirect a user's computing device to a home transaction node.

Using the block format, the data of a specified number of users such as fifty users can fill a block to capacity.

The transaction nodes can advertise the block identifier and block hash value to other transaction nodes, such as via point-to-point communications, e.g., using TCP/IP. Communications between transaction nodes can also include a digital signature for security. Optionally, broadcasting is used but this can result in additional traffic. A transaction node which receives an advertisement with a block identifier, or a range of block identifiers, compares the received block identifier(s) to its own records (step 814) such as in FIG. 8D. For example, a node can advertise "I am transaction node TN1 and I have blocks 1-23 with block hash values ###-###." Or, "I am transaction node TN1 and I have a new block 23 with block hash value ###." If the receiving transaction node does not have a record with the received block identifier(s), the receiving transaction node requests the block(s) from the advertising transaction node, which fulfills the request by communicating the full block(s) of data (step 818) to the receiving transaction node. If the receiving transaction node does have a record with the received block identifier(s), and the block hash value matches (step 816), the receiving transaction node does not request the block (or block portion) from the advertising transaction node (step 820). If the receiving transaction node does have a record with the received block identifier(s), and the block hash value does not match (step 816), the receiving transaction node requests the block(s) from the advertising transaction node, which fulfills the request by communicating the full block(s) of data (step 818) to the receiving transaction node.

At step 806, an update can be triggered for various reasons. As mentioned, a new block or block change can trigger an update. For example, a user can be assigned to a transaction node, or a user can change his or her user information, such as an email address, or a user can be reassigned from one transaction node to another, e.g., by an administrator or an automated process. In such cases, the transaction node can recompute the block hash value of the block which changed, and advertise both the block identifier and the recomputed block hash value to the other transaction nodes. Note that either an active or a deactivated node can have a changed block. The passage of an increment of time can also trigger an update.

Optionally, a node can advertise all of the blocks it has and their block hash values, rather than advertising a single new or changed block or block portion. The receiving node can determine which blocks are new or changed based on this information.

Thus, updates are communicated only as needed among the transaction nodes. The relatively short advertisements do not generate excessive network traffic.

Further, to ensure that other transaction nodes are up to date, each transaction node can periodically send an advertisement for blocks or portions of blocks (e.g., one or more rows) that have not changed, e.g., unchanged blocks. This ensures that a transaction node that was offline the last time an advertisement was sent for a given block or that was not randomly selected to receive the advertisement at the time it occurred, will be informed of the new or changed block or block portion.

The transaction nodes can also communicate secure tokens with the advertisements and requests for blocks, which are used to authenticate the advertisements as coming from a trusted source.

The updating of the transaction nodes is asynchronous because the process occurs in the background, and the transaction nodes do not hold up other tasks to wait to receive an update. Some latency in updating is acceptable because a user is not likely to login using different computing devices in a short period of time.

FIG. 8B depicts further details of step 808 of FIG. 8A, where a transaction node switches from an active status to a deactivated status. The steps include: Transaction node has an active status, is assigned new users, 830; Threshold number of blocks reached?, 832; and Transaction node switches to a deactivated status, is not assigned new users, 834.

At step 832, once a transaction node has been assigned a threshold number of users, or created a threshold number of blocks, it may transition itself from an active status in which new users are accepted, to a deactivated status in which new users are not accepted. For example, at any given time, one or more of the transaction nodes can be designated as active enrollment nodes or sign-up nodes which allow users to enroll in the offering. For example, there might be a sign-up node for West coast users and a sign-up node for East coast users. When a sign-up node forms a new block of entries, it sends an advertisement as a "block status" message to the other active sign-up nodes, if any, and to a small randomly selected subset of the other, deactivated (non sign-up) transaction nodes. The reason for sending block status messages to only a small subset (e.g., more generally, a strict subset—less than all) of the deactivated transaction nodes is that, during periods of high sign-up load, there will already be a lot of network traffic from the new users. This approach reduces the amount of block status traffic in the network. Moreover, only the active sign up nodes need to be updated in near real-time so that they can prevent the same user id from being registered/enrolled on different sign up nodes. The deactivated transaction nodes do not need to be updated in near real-time because they are not enrolling new users, and can therefore be updated less frequently than the active transaction nodes.

Figure 8C:
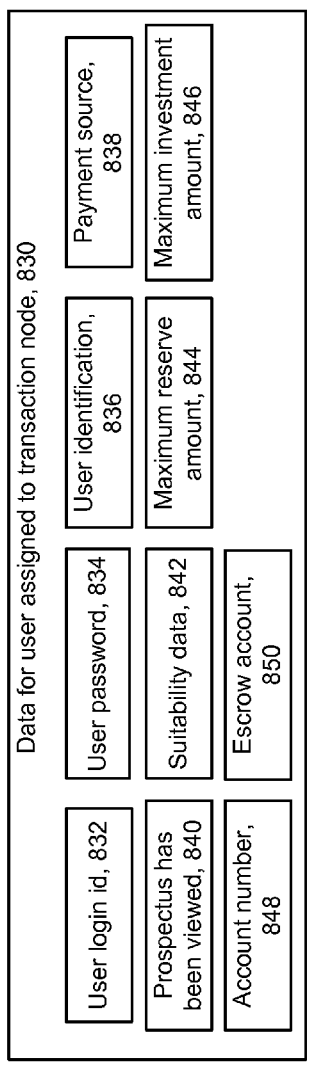
FIG. 8C depicts example data fields maintained by a transaction node for a user assigned to the transaction node.

FIG. 8C depicts example data fields maintained by a transaction node for a user assigned to the transaction node. The data 830 includes: User login id, 832; User password, 834; User identification, 836; Payment source, 838; Prospectus has been viewed, 840 (an indication of whether or not the user has view the prospectus); Suitability data, 842 (an indication of whether or not the user has passed the suitability algorithm, and associated data); Maximum reserve amount, 844; Maximum investment amount, 846; Account number, 848 (for purposes of the offering); and Escrow account (account identifier and balance/IPO deposit), 850.

Figure 8D:
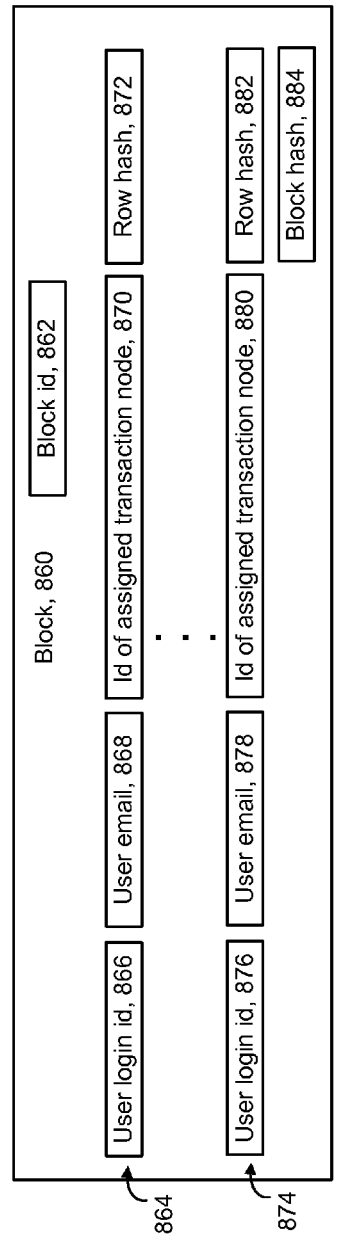
FIG. 8D depicts an example block of data maintained by each transaction node for users assigned to any of the transaction nodes.

FIG. 8D depicts an example block of data maintained by each transaction node for users assigned to any of the transaction nodes. The block 860 includes: Block id, 862; Row of user data, 864, including, for one user, User login id, 866, User email, 868, Id of assigned transaction node, 870, and Row hash, 872 (obtained by applying a hash function to one of more of the data fields in the row). The block further includes, for an additional Row of user data, 874, User login id, 876, User email, 878, Id of assigned transaction node, 880, Row hash, 882 and Block hash, 884 (obtained from the row hash values 872, . . . , 882).

Figure 8E:
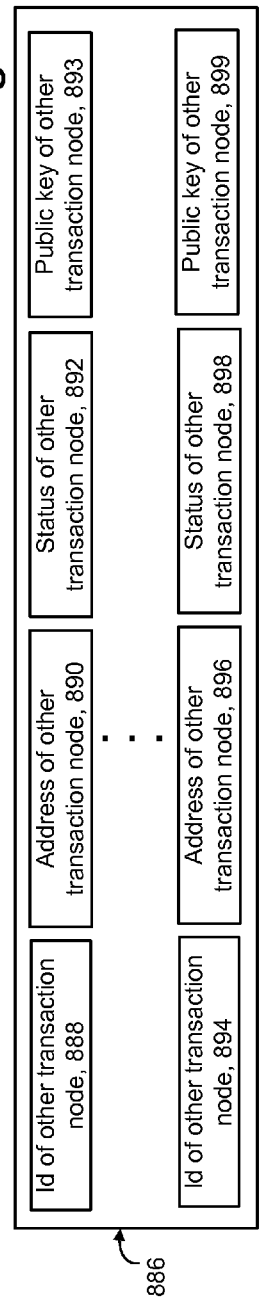
FIG. 8E depicts example data fields maintained by each transaction node of the status and address of other transaction nodes.

FIG. 8E depicts example data fields maintained by each transaction node of the status and address of other transaction nodes. The data 886 includes, for one other transaction node: Id of other transaction node, 888; Address of other transaction node, 890 (e.g., a network address such as IP address and port); Status of other transaction node, 892 (e.g., active, deactivated, offline); and public key of the other transaction node 893. The data 886 further includes, for an additional transaction node: Id of other transaction node, 894; Address of other transaction node, 896; Status of other transaction node, 898; and public key of the other transaction node 899.

A transaction node can maintain the public key of the other transaction nodes for use in generating a secure authentication token when redirecting a user to a home transaction node as described, e.g., in connection with FIGS. 6A-7.

Figure 15A:
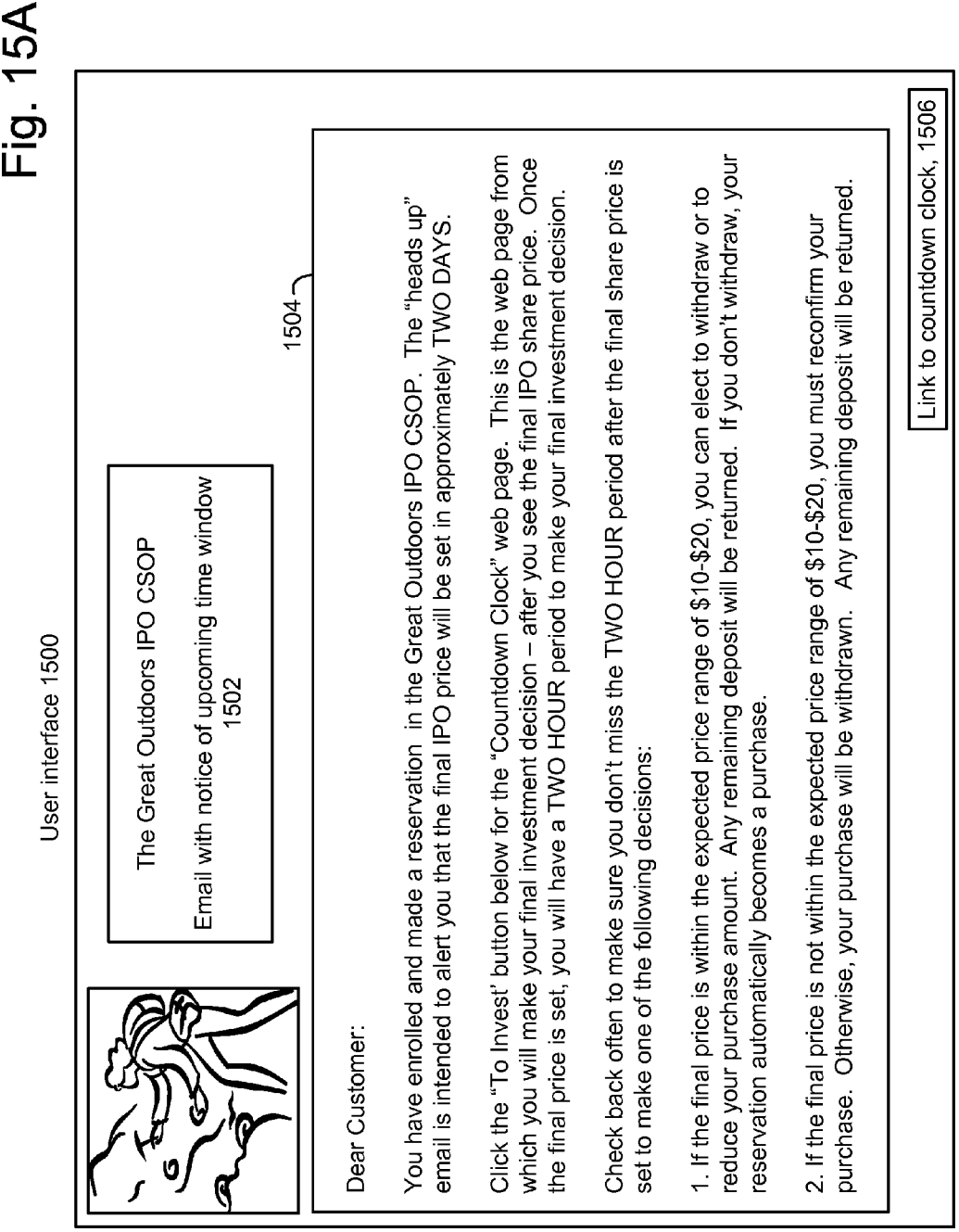
FIG. 15A depicts an example user interface 1500 of an email communication which is provided in step 900 of FIG. 9A.
Figure 16A:
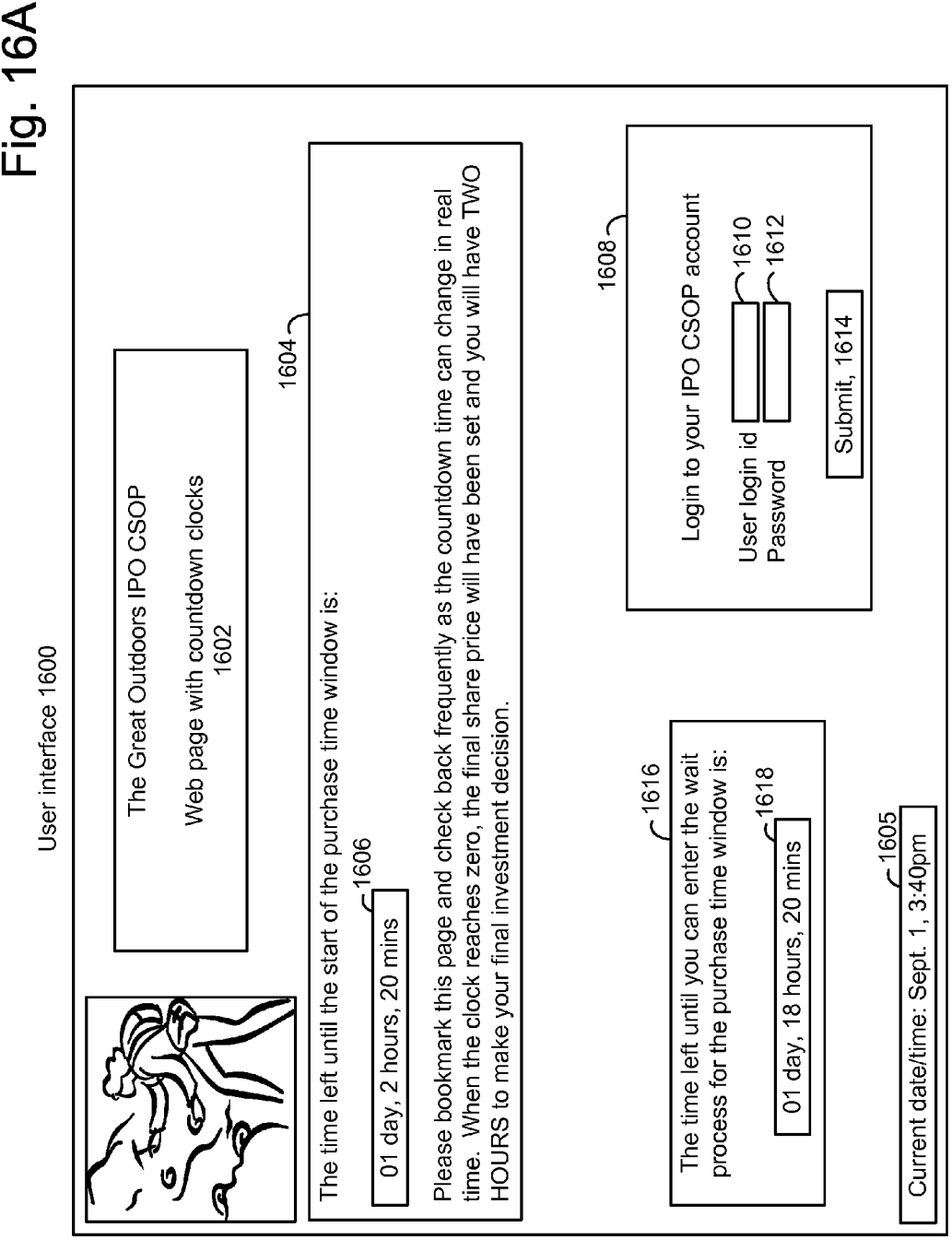
Figure 19:
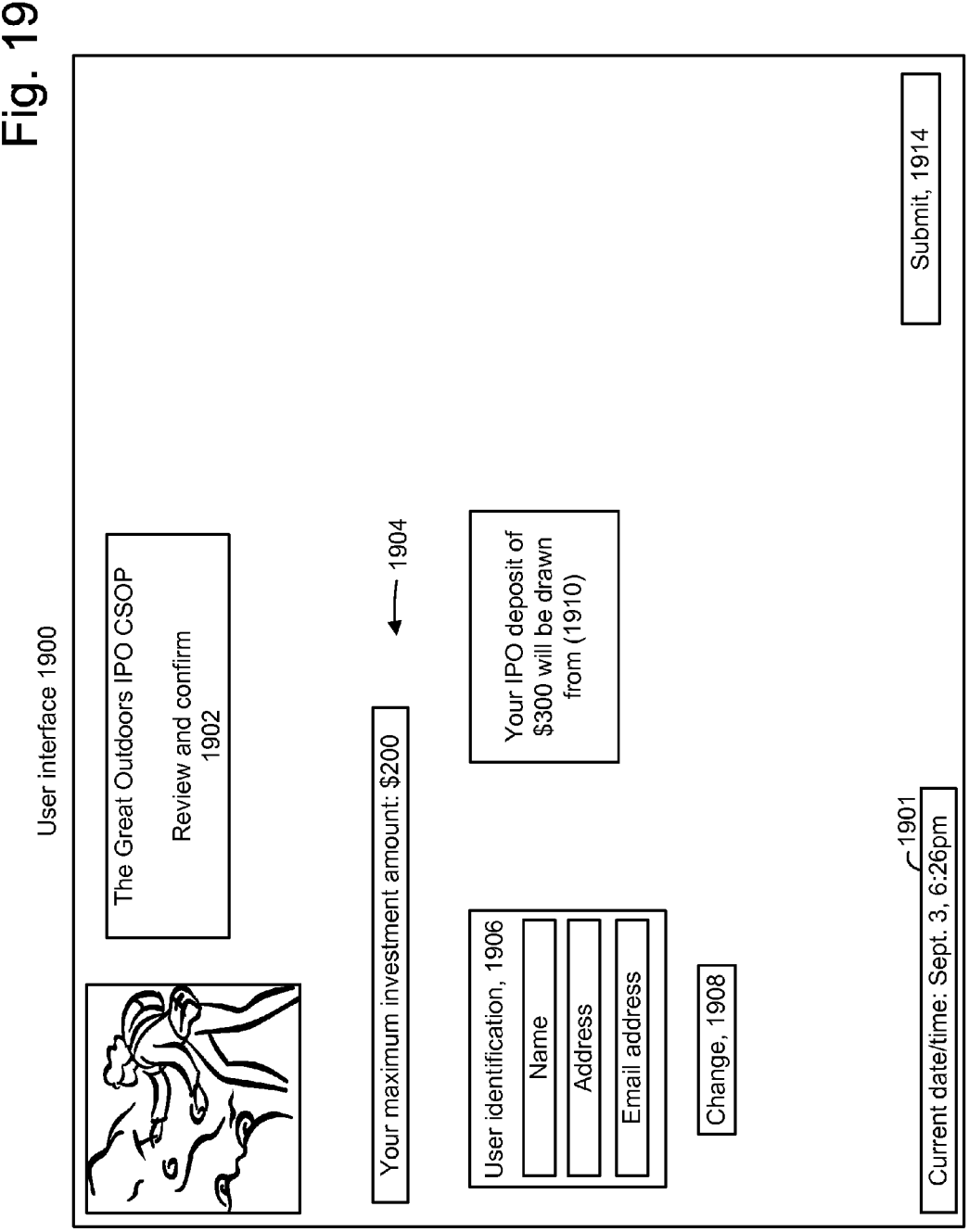

FIG. 9A depicts further details of step 224 of FIG. 2, from a user perspective. The steps include: Receive email with link to countdown clock, 900 (FIG. 15A); Before or during time window, attempt to login to service (e.g., a web or social media based service), 902 (FIGS. 16A and 16B); Wait process, 904 (FIGS. 9B1-9J and 16C-16E); and Access service at transaction node to complete purchase transaction, 906 (FIGS. 17-19).

FIG. 9B1 depicts further details of step 904 of FIG. 9A, from a perspective of an assignment node, a user and a DNS service. The steps include: Assignment node receives request to complete purchase transaction, 910; and Assignment node assigns user's computing device to a wait node based on one or more criterion, by selecting a host name; provides the host name and code, to user's computing device, 911. For example, the one or more criterion can be a geographic criterion as discussed previously. The code can execute automatically in a background the user's web browser to periodically send requests to the wait server, such as every minute or few minutes. For instance, the code can be AJAX code which makes a remote call using a JavaScript tag in a format such as "JavaScript=wait node URL." "Periodic" includes fixed and/or varying intervals.

The steps also include: User's computing device provides host name to DNS service; DNS service maps host name to wait node network address and returns wait node network address to user's computing device, 912; and User's computing device contacts wait node using wait node network address, 913.

By providing wait nodes, this avoids traffic between the users and the transaction nodes which would otherwise occur if the users kept trying to login to the transaction odes directly.

Specifically, the wait nodes can be in different geographic locations, and the requests from the web browsers of the users to complete the purchase transaction can include data indicative of geographic locations of the web browsers. The wait nodes can be assigned to the web browsers based on the data indicative of the geographic location, so that there is a correspondence between the geographic locations of the web browsers and the geographic locations of the wait nodes to which the web browsers are assigned. The data indicative of the geographic locations can include, e.g., time zone data which is maintained by the user's computing device, or Internet Protocol addresses associated with the user's computing devices. In another approach, the wait nodes are assigned to the web browsers based on a geographic location of a Domain Name System (DNS) server which handles the requests from the web browsers to enroll or complete a purchase transaction, so that there is a correspondence between the geographic location of the DNS server and a geographic location of the wait nodes to which the web browsers are assigned. Alternatively, or additionally, the wait nodes could also be assigned based on a random factor.

In a particular process for assigning a user to a wait node, the assignment node randomly selects a host name and provides this host name to the user's computing device, e.g., as a URL. For example, assume there are assignment nodes in different geographic areas. Each assignment node has a fixed number of wait node host names. The user's computing device contacts the DNS service using the host name, and the host name is mapped to particular wait node by the DNS service (step 918). The DNS service returns the network address such as the IP address of the wait node to the user's computing device to allow the user's computing device to contact the wait node. As mentioned, a wait node represents a unit of physical computing devices, e.g., a server or a server farm. As an example, there are 50,000 host names and, initially, at a start of the wait process, 500 wait nodes. Thus, multiple host names will map to one wait node. There is a large pool of wait node host names. These can be mapped to wait nodes in one of two ways. In the first way, we manage DNS entries to map the host names to the wait nodes. In the second way, we use an external DNS service such as "AMAZON ROUTE 53®," which is a scalable Domain Name System (DNS) web service available from AMAZON CORP., to manage the mappings. The external DNS service translates a human readable host name such as www.hostname0001.com into a numeric IP address, as a network address. The assignment servers do not manage the mappings from wait host names to wait nodes in this approach.

When new wait nodes are brought online, the mapping is handled via DNS as described above. A determination of a need to add more wait nodes can be made by the load-monitoring server 140, based on loads of the wait nodes (see FIG. 9B2). We assume that additional wait nodes can be brought online with short notice, such as from a commercial web service (an example is AMAZON ELASTIC COMPUTE CLOUD (EC2) available from AMAZON CORP.) which allows customers to rent server time. Based on the request rate or the load on the wait nodes, the load monitoring server can transmit a request, e.g., to the commercial web service, to have one or more additional wait nodes brought online.

The mapping of the host names to wait nodes at the DNS service is then updated so that the new wait nodes are in a pool of available wait nodes. This allows the number of wait nodes to be dynamically adjusting, e.g., increased or decreased, to optimally handle the user load. Further, the adjustment can be made without changing the content of a content delivery network, which is difficult to refresh.

The process thus includes dynamically adjusting a number of the wait nodes in the wait process based on a number or rate of the requests or the load on the wait nodes, and based on the adjusting, updating a mapping of host names to the wait nodes. Each web browser is assigned to a wait node by selecting one of the host names. The network address of the associated wait node is identified by the DNS service and returned to the web browser (e.g., the host name is resolved by the DNS service) when the web browser tries to contact that host name.

FIG. 9B2 depicts a process for adding a wait node based on load. As discussed in connection with FIG. 9B1, the steps include Load-monitoring server tracks load of wait nodes, 914; Additional wait node needed?, 915; Load-monitoring server requests that one or more that additional wait nodes be brought online, 916; and Load-monitoring server requests update of mapping of host names to wait nodes at DNS service, 917.

FIG. 9C depicts further details of step 904 of FIG. 9A, from a perspective of a user and a wait node. The steps include: Wait node receives initial attempt from user to login to web service, before or during time window, 920 (e.g., via the user interface of FIG. 16B); Wait node transmits arrival stamp, secure token and estimate of wait time, to user's computing device, 922; User's computing device displays estimate of wait time, 924 (e.g., FIG. 16C-16E); Wait node receives subsequent attempt (with arrival stamp and secure token) from user to login to service, before or during time window, 926; and Authenticate using token, 928 (e.g., authenticating the subsequent attempt as being genuine). Step 924 can use AJAX or other code which executes automatically in the background of a web browser, for instance, to display the estimate of the wait time. A message can also be displayed such as: "Please continue to wait. Your request will be processed in turn."

Note that the arrival stamp can be a time stamp which provides an arrival time. Or, the arrival stamp can be a sequential number, e.g., a sequential serial number. The use of a sequential number can make it easier to admit the users to the transaction servers at a constant rate even when many users arrive at essentially the same time. This is true because each fixed sequence number increment in the demarcation value will involve a same number of users. In contrast, if many users were to make wait node requests at the same time, they would receive virtually identical arrival stamps and each fixed time increment of the demarcation time could involve widely varying numbers of users. While using sequential numbers provides an advantage in managing the release of the users to the transaction nodes, it can introduce a small incremental wait time in the user receiving the arrival stamp to ensure that each user receives a distinct arrival number.

Note also that a wait queue per event, where there are multiple concurrent events, can be provided. For example, there are two concurrent IPO time windows which are subject to wait process at the same time, each user who wishes to participate in both events would wait for each event separately, in one approach. In another approach, one wait process can grant admission to multiple events.

Thus, the response the user receives in step 922 (the response to the user's request to establish a place in the wait process) includes a secure token or signature which allows the wait node, as part of an access-control network, to verify an authenticity of the subsequent requests at step 928. Each of the subsequent requests can include the secure token.

The arrival stamp and the secure token received at step 922 can be provided in at least one cookie file which is stored by the web browser. Each of the subsequent requests at step 926 can include the at least one cookie file.

Following step 928, one of two paths can be taken. In one path, the current time is before the time window, in which case the next step is: Determine and transmit estimate of wait time to user's computing device, 934 (FIGS. 9F and 9G); followed by step 924. In another path, the current time is within the time window, in which case the next step is: Determine whether the value of the arrival stamp is before the demarcation value. If decision step 930 is false (e.g., it is not yet the user's turn to access a transaction node to perform a purchase transaction or other transaction), step 934 follows. If decision step 930 is true, (e.g., it is now the user's turn to access a transaction node to perform a purchase transaction or other transaction), step 932 follows: Attempt to access assignment data from user's computing device, 932. For example, this can be an attempt to read a cookie file which was previously written to the user's computing device.

At step 940, the assignment data is not accessed. For example, this may occur if, during the wait process, the user used a different computing device which does not have the cookie. Or the cookie file may be corrupted or otherwise unavailable. In this case, the next step is: Transmit URL of login page for randomly selected transaction node to user's computing device, 938 (a web page such as in FIGS. 17 and 18). Since the wait node cannot determine the home transaction node of the user, it assigns some transaction node, which may or may not turn out to be the home transaction node.

On the other hand, at step 940, the assignment data is accessed. In this case, the next step is: Based on the assignment data, transmit URL of login page for assigned transaction node to user's computing device, 946 (a web page such as in FIGS. 17 and 18). For example, the wait node may obtain the transaction node identifier (which can be any identifier, separate from a network address, for instance) from the assignment data, and cross-reference it to the URL. Each wait node may maintain a database of transaction node identifiers and their corresponding URLs which are used for a purchase transaction or other transaction.

A web and social media service can include, e.g., any user interfaces/web pages with which a user interacts. In the example of a stock offering, the service can include the enrollment user interfaces and the transaction interfaces, for example.

Figure 9E:
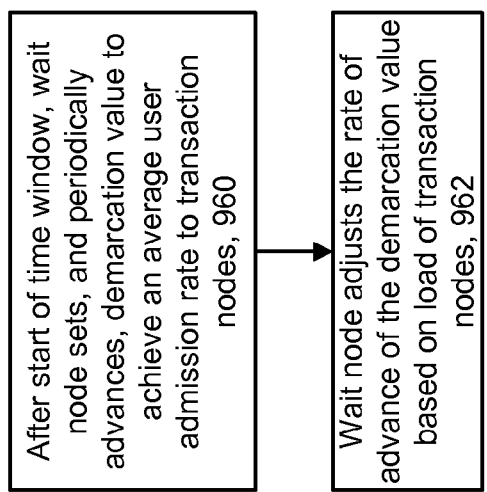
FIG. 9E depicts further details of setting a demarcation value as set forth in FIG. 9C.
Figure 9D:
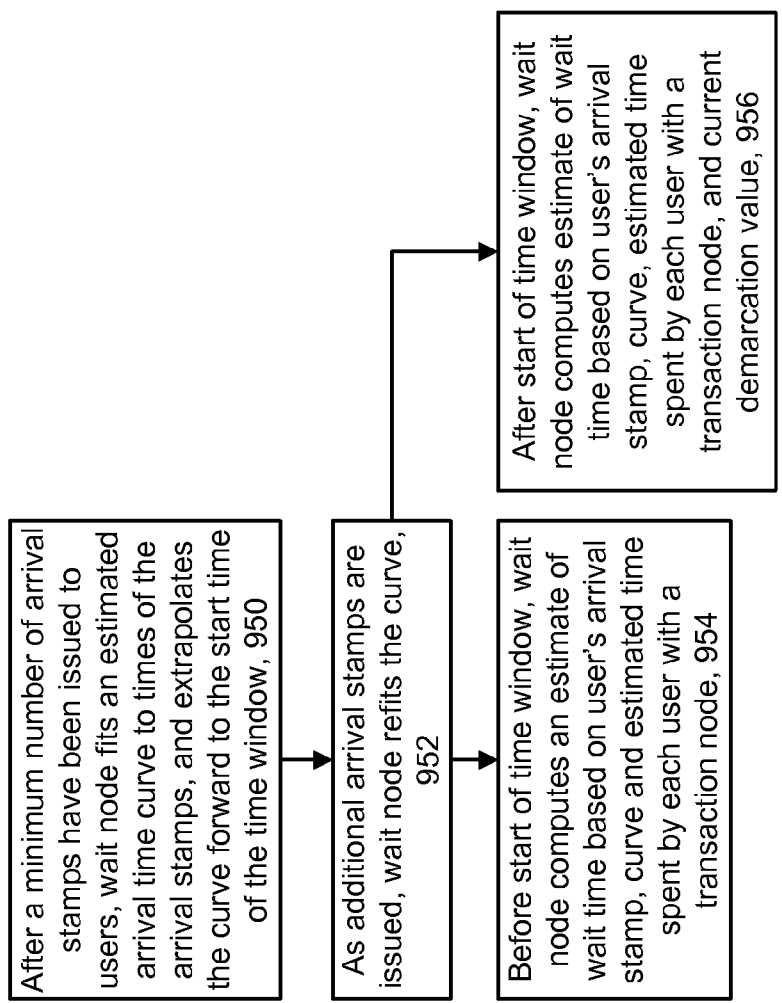
FIG. 9D depicts further details of estimating a wait time as set forth in FIG. 9C.
Figure 9G:
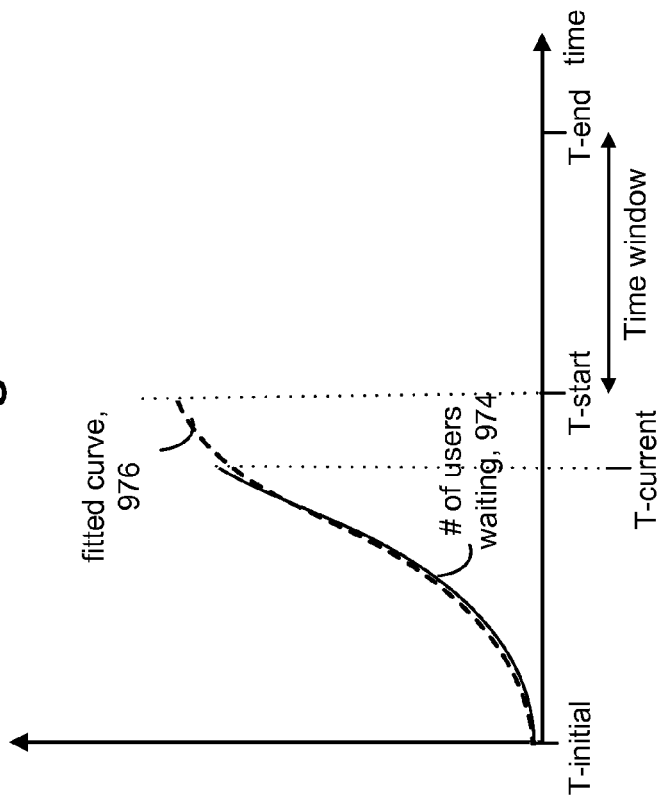
FIG. 9G depicts further details of re-fitting an estimated arrival time curve to arrival stamp data as set forth in step 952 of FIG. 9D.

FIG. 9D depicts further details of estimating a wait time as set forth in FIG. 9C. The steps include: After a minimum number of arrival stamps have been issued to users, the wait node fits an estimated arrival time curve to times of the arrival stamps, and extrapolates the curve forward to the start time of the time window, 950 (FIG. 9F); and, As additional arrival stamps are issued, wait node refits the curve, 952 (FIG. 9G). Subsequently, one of two paths can be followed. One path includes: Before start of time window, wait node computes an estimate of wait time based on user's arrival stamp, curve and estimated time spent by each user with a transaction node, 954 (using FIGS. 9F and 9G). Another path includes: After start of time window, wait node computes estimate of wait time based on user's arrival stamp, curve, estimated time spent by each user with a transaction node, and current demarcation value, 956 (using FIG. H-M). The arrival time is the time the user enters the wait process, and can be the time of the arrival stamp provided to the user by the wait node. The wait node can keep a record of the time each arrival stamp was issued, if the arrival stamp itself does not indicate the time, e.g., when the arrival stamp is a sequence number and not a time.

FIG. 9E depicts further details of setting a demarcation value as set forth in FIG. 9C. The steps include: After start of time window, wait node sets, and periodically advances, demarcation value to achieve an average user admission rate to transaction nodes, 960 (using FIG. H-M); and Wait node adjusts the rate of advance of the demarcation value based on load of transaction nodes, 962 (such as based on control signals from the load-monitoring server 140 in FIG. 1A).

Figure 9F:
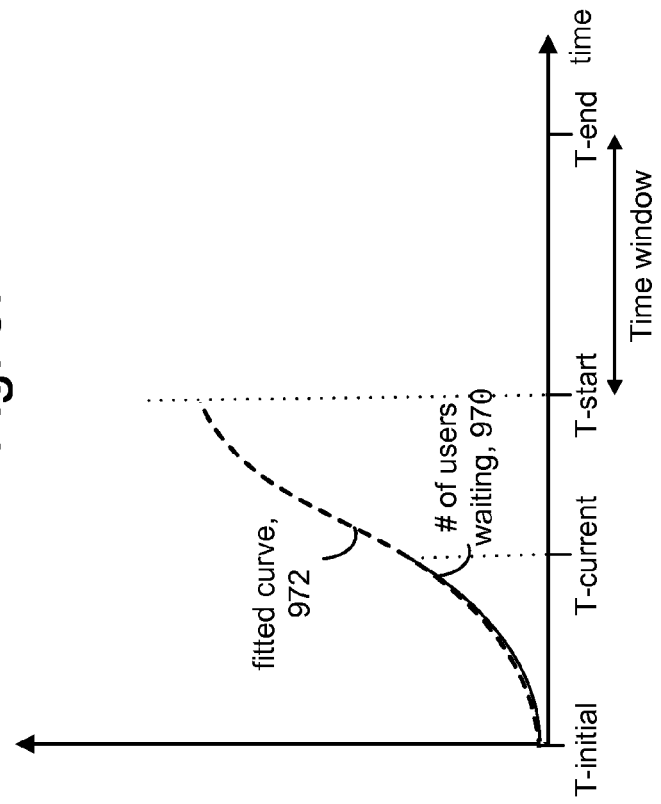
FIG. 9F depicts further details of a fitting an estimated arrival time curve to arrival stamp data as set forth in step 950 of FIG. 9D.

FIG. 9F depicts further details of a fitting an estimated arrival time curve to arrival stamp data as set forth in step 950 of FIG. 9D. The x-axis represents increasing time, such as in hours, while the y-axis depicts a number of users. The solid line 970 represents a number of users who are in the wait process of a wait node, between an initial time (T-initial) and a current time (T-current), and a dashed curve represents an estimated arrival time curve 972 which is fitted to the curve 970 and extrapolated forward in time to a starting time (T-start) of a time window which extends from T-start to T-end. The curves begin at T-initial. The extrapolation forward in time to a starting time determines the number of users waiting at T-start.

Generally, the wait process may be initiated at a certain time before, or at the start of, a time window. For example, the wait process may be initiated two hours before a two hour window for completing a purchase transaction in a stock offering, in which case T-initial is two hours before T-start. Typically, a few users will attempt to gain access well before the time window, while more users will attempt to gain access closer to the start of the time window, and other users will attempt to gain access during the time window. In some cases, a logarithmically increasing curve is used. In another example, when the offering is very popular, there may be a sudden increase in the number of arrival stamps issued just after T-initial (as shown by the curve 986 of the number of waiting users, with a constant rate portion 988 after T-start, in FIG. 9K). A sudden increase may occur particularly when the users are informed of the time at which they will be allowed to begin the wait process, such as by the countdown clock 1618 of FIG. 16A.

A wait node thus attempts to model the number of users who will arrive at the wait node based on actual measurements of already-arrived users, as well as heuristics which attempt to predict human behavior. The wait node can extend the model to the time window by estimating the rate at which users will be released to the transaction nodes.

As an example, assume that T-initial is September 3 at 4 pm, T-start is September 3 at 6 pm and T-end is September 3 at 8 pm.

The curves of FIGS. 9F-9J may be provided separately for each of one or more wait nodes.

FIG. 9G depicts further details of re-fitting an estimated arrival time curve to arrival stamp data as set forth in step 952 of FIG. 9D. Here, T-current is moved closer to T-start than in FIG. 9F. The solid line 974 represents the number of users waiting between T-initial and T-current, and the dashed curve represents an estimated arrival time curve 976 (different than 972) which is fitted to the curve 974 and extrapolated forward in time to T-start. Since the curve 976 is adjusted, the estimated wait time of the users is dynamically adjusted, in real time, during the wait process. This allows the users to have an accurate estimated wait time.

T-demarcation is a demarcation value. Users for whom the value of the arrival stamp is before or at the demarcation value are granted access to a transaction node, while users for whom the value of the arrival stamp is after the demarcation value must continue to wait to access a transaction node. The demarcation value can be periodically advanced. "Periodic" refers to different intervals which are not necessarily equal in duration and, if fact, are not likely to be equal in duration. In one approach, T-demarcation is periodically advanced to attempt to achieve an approximately average rate at which the web browsers are allowed to access a transaction node. The average rate can be adjusted based on feedback regarding a load of the transaction node. T-demarcation can be periodically advanced in increments, where each increment is sized to grant access to a transaction node by an approximately equal number, within a +/−tolerance (e.g., +/−5-10%), of the web browsers. The increments can be determined dynamically as additional users arrive at the wait node.

As mentioned, when users are given arrival stamps as time stamps, the demarcation value is a time. When users are given arrival stamps as a sequential number, the demarcation value is a number. The advancement of the demarcation value as a number works in the same fashion as the advancement of the demarcation value as a time, except there is increased knowledge of the effect of advancing the value: Every increment of one admits one more user from that wait node. With arrival stamps, advancing T-demarcation by one second might admit zero, one or many users.

T-demarcation can be periodically advanced at some times in response to commands from one or more load-monitoring servers (based on loads of the transaction nodes), external to the access-control network and the wait node, and, at other times, independently by the access-control network/wait node. The independent operation of the wait node is useful since it does not require constant communications with the load-monitoring servers. A wait node could continue to operate independently even if communications with the load-monitoring server are lost. In one approach, the wait node receives relatively more guidance when it first begins releasing users to the transaction nodes. For example, the users can be assigned to bins based on their arrival stamps, and a first bin released which has a size which is expected to result in an optimal CPU utilization at one or more transaction nodes. Based on feedback of the utilization from the load-monitoring server, the wait node decides when to release the next bin, in a gating process. After gaining some experience, such as after two or three feedback points, the wait node can release bins based on its own metrics, without guidance from the load-monitoring server, using the expected progression of arrival times. However, the wait node can adjust its release rate of bins based on feedback regarding utilization which is received from time to time from the load-monitoring server.

Generally, the estimated remaining time for a given user with an arrival stamp is based on an average expected amount of time each user will consume in accessing the user interface of a transaction node, a number of users having an earlier arrival stamp, and the estimated arrival time curve. The average expected amount of time each user will consume in accessing the user interface of a transaction node can be estimated based on heuristics and previous experience, for example. During the time window, it is also possible to measure the actual time consumed, but this may impose additional burdens which may not that helpful. Once a user completes a session with a transaction node, a session with the transaction node becomes available for an additional user. A transaction node handles many sessions concurrently.

Optionally, one or more users can be given priority over other users in accessing a transaction node, such as by adjusting an arrival stamp sent to a web browser of the higher priority user to be earlier than arrival stamps sent to web browsers of the regular priority users. In another approach, a separate, later demarcation value can be used for the priority users so that they granted access to a transaction node sooner. Such priority classifications may be prohibited or otherwise undesirable in some cases, such as for an IPO stock offering, and desirable in other contexts, such as allowing a highly valued customer to buy tickets to a popular event sooner than other customers.

FIG. 9H-M depict further details of advancing a demarcation value as set forth in FIG. 9E.

In FIG. 9H, T-current is just after T-start, so T-demarcation is just after T-initial. The curve 976 and number of users waiting 978 are depicted. As mentioned, users for whom the time of the arrival stamp is before (to the left of) T-demarcation are granted access to a transaction node when their web browser sends their request for access to the wait node. Before this time, their requests are denied.

In FIG. 9I, T-current and T-demarcation advance, but by different amounts, relative to FIG. 9H. The curve 976 and number of users waiting 980 are depicted.

In FIG. 9J, T-current and T-demarcation again advance by different amounts, relative to FIG. 9I. The curve 976 and number of users waiting 982 are depicted. However, T-current is approaching T-end. A curve 984 (which is part of the number of users waiting 982) depicts an approximately constant rate of decline of the number of waiting users which is achieved during the time window. In some cases, some users may not gain access to a transaction node before T-end. These users can be excluded from the offering, or the time window can be extended, or some other concession made, if desired. Another option is to estimate whether some users may not gain access to a transaction node before T-end, and to take a corrective action such as bringing online one or more additional transaction nodes, or running the existing transaction nodes at a higher capacity.

Figure 9M:
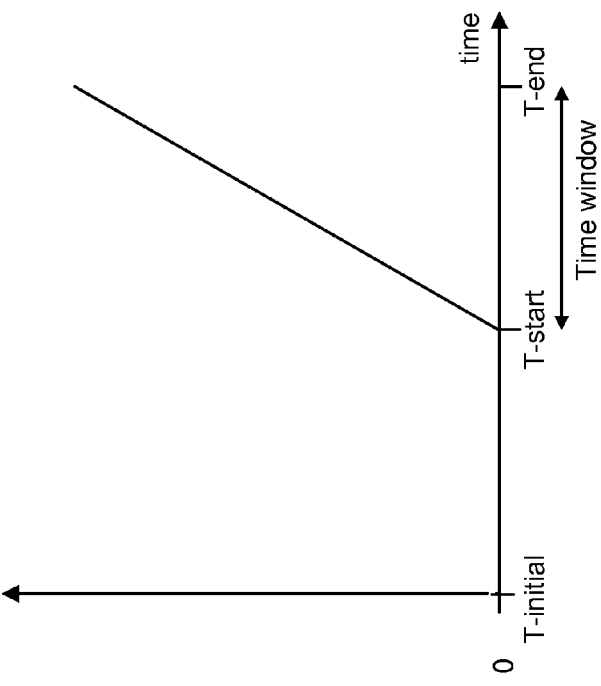
Figure 9L:
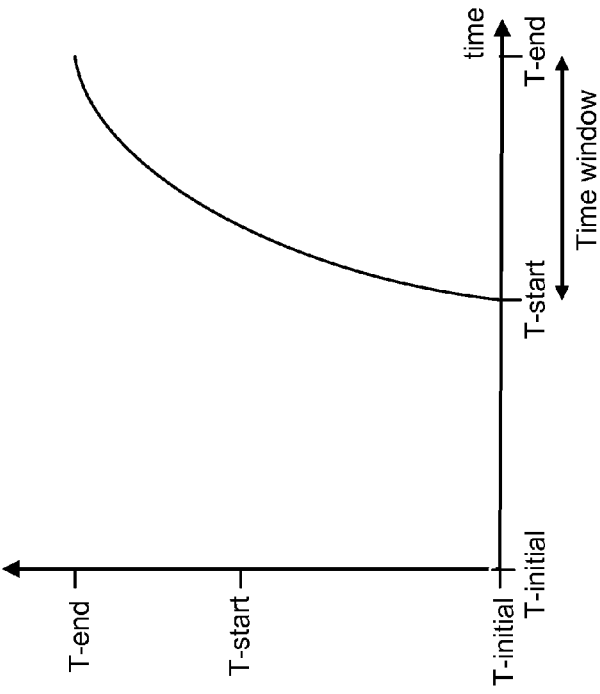

FIG. 9L depicts arrival stamps of users being selected by a wait node to access a transaction node, versus time. The users having an arrival stamp (e.g., time) close to T-initial are selected around T-start, while the users having an arrival stamp (e.g., time) close to T-end are admitted around T-end. The y-axis could alternatively represent arrival sequence numbers as depicted in FIG. 9M. FIG. 9M depicts arrival sequence numbers of users being selected by a wait node to access a transaction node, versus time. Note the non-linear and linear curves of FIGS. 9L and 9M, respectively.

Figure 10B:
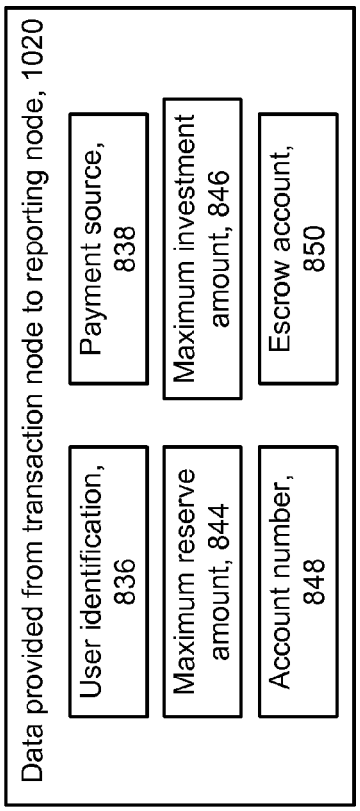
FIG. 10B depicts example data fields provided from a transaction node to a reporting node.

FIG. 10A depicts further details of step 226 of FIG. 2, from a perspective of a reporting server. The steps include: During, or at end of time window, Reporting node queries transaction nodes for data, and receives the data 1000 (such as by sending requests to the queues of the transaction nodes, and receiving the data from the database servers of the transaction nodes in responses sent to the queue of the reporting node, as a central reporting node); Reporting node aggregates data, 1002 (see, e.g., FIGS. 10B and 10C); Reporting node computes total of maximum investment amounts and value of shares, 1004; and decision step 1006, which determines whether the offering is oversubscribed. Decision step 1000 is true when the total of the maximum investment amounts is greater than the value of shares (e.g., the final share price x number of shares in the offering). If decision step 1000 is false, the offering is undersubscribed.

The reporting node can query the transaction nodes during and/or after, typically soon after, the time window. A query during the time window could be done to obtain preliminary data. The reporting node can initiate the query to avoid the need for the transaction nodes to have this intelligence, although it is also possible to configure the transaction nodes using a push model to initiate the sending of report data to one or more reporting nodes.

Figure 10C:
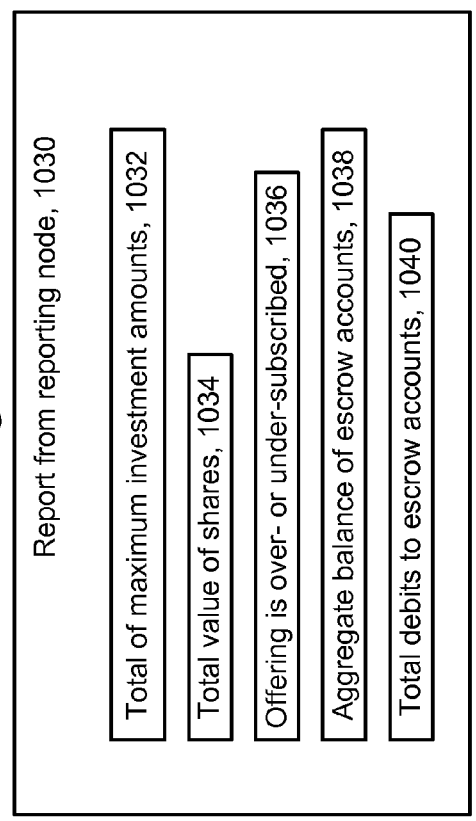
FIG. 10C depicts an example report of a reporting node, based on the data fields of FIG. 10A.

If decision step 1006 is false, the next steps are: For each user, allocate value of shares equal to maximum investment amount, 1008; Debit escrow account (IPO deposit) for value of shares, 1014; Hold shares in brokerage account, 1016 (with the user as the beneficial owner); and Report results, 1018 (FIG. 10C). If decision step 1006 is true, the next steps are: Allocate shares based on a share allocation algorithm, 1010; followed by steps 1014, 1016 and 1018, as discussed.

When the offering is oversubscribed, the share allocation algorithm at step 1010 can take various forms. For example, each user can be allocated a prorated amount of shares of the stock having a value which is a ratio, less than one, of the maximum investment amount of the user. For example, the ratio (between zero and one) can be the value of all shares of the offering divided by the total of the maximum investment amounts. For instance, if the value of all shares of the offering is 800 million dollars and the total of the maximum investment amounts is one billion dollars, each user can be allocated the same ratio of 0.8 of the user's maximum investment amount.

Or, the purchase orders may be fulfilled fully in the order received, first come, first served, until the shares are all allocated, leaving some users with no shares.

Another approach allocates an amount of shares which is based on a priority of the user. For example, a highly valued customer may be allocated a higher portion of the customer's maximum investment amount, or a higher absolute maximum investment amount, than a normal priority customer.

Another approach gives different maximum investment amounts different priorities. For example, a user with a larger maximum investment amount can be given a higher priority and receive, e.g., 90% of the maximum investment amount, while a user with a smaller maximum investment amount can be given a lower priority and receive, e.g., 80% of the maximum investment amount. Or, the requests may be filled in reverse size order, smallest first, largest last.

Or, the allocating of shares may be based on a random factor such that users are randomly selected to have their orders fully fulfilled, until the shares are all allocated, leaving some users with no shares.

The allocating of shares is part of the closing of the offering. The IPO deposit in the escrow account is drawn from to pay for the allocated shares. The payment is transferred to an account on behalf of the issuer.

FIG. 10B depicts example data fields provided from a transaction node to a reporting node. The data includes the data fields from FIG. 8C, which is the detailed user data maintained by the home transaction node of a user. The data includes: User identification, 836; Payment source, 838; Maximum reserve amount, 844; Maximum investment amount, 846; Account number, 848; and Escrow account, 850. This data can be received concurrently from multiple database servers of the transaction node, before, during and/or upon completion of, the time window. Each database server thus provides a fragment of a report which might otherwise be generate on a single system. However, when data is generated from a massive number of users, such as millions of users in a short amount of time, such as two hours, the load on a single system/server may be too great. Accordingly, the reporting node independently asks the database servers for their data and assembles that data into a single, cohesive report.

FIG. 10C depicts an example report of a reporting node, based on the data fields of FIG. 10A. Various types of reports can be provided, such as a cash report (e.g., cash in and cash out). The cash report indicates how much cash is on hand in a bank account at any time. A seven-day rolling report can be provided. There is an amount of money coming in from the users from their payment sources, and there is an amount of money which is used to buy the stock. As an example, the reports which can be provided include: Total of maximum investment amounts, 1032; Total value of shares, 1034; an indication of whether the offering is over- or under-subscribed, 1036; Aggregate balance of escrow accounts, 1038; Total debits to escrow accounts, 1040.

FIGS. 11-15 relate to step 222 of FIG. 2.

FIG. 11 depicts an example user interface 1100 related to step 300 of FIG. 3. The user interfaces can be geared toward the retail investor and provided with appropriate design, graphic elements and branding of the issuer company, for instance. The user interfaces can be provided as web pages of a web-based service and/or in emails, text messages, via social media platforms or via other electronic communications. Moreover, the user interfaces can be integrated into a company's existing web site and online social media outlets for maximum synergy. Example social media outlets/platforms include a blog, a FACEBOOK® web page, a TWITTER® web page and a customer blog which can be accessed by buttons 1110, 1112, 1114 and 1116, respectively. Social media is a tool which companies can use to communicate with their customers.

A blog (a blend of the words "web" and "log") is a type of website or part of a website which can be maintained by a company to provide regular entries of commentary, descriptions of events, or other material such as graphics or video. A blog can be interactive, allowing customer and other visitors to the page to leave comments and even message each other via widgets on the blogs. One type of blog is a microblog, which differs from a traditional blog in that its content is typically smaller in both actual and aggregate file size. Microblogs allow users to exchange small elements of content such as short sentences, individual images, or video links.

FACEBOOK® is an example of a social networking service and website which allows users to create a personal profile, add other users as friends, and exchange messages, including automatic notifications when they update their profile. Additionally, users may join common-interest user groups, organized by workplace, school or college, or other characteristics such as their interest in a company generally or a product or service of a company. Users of FACEBOOK® can "like" status updates, comments, photos, and links posted by friends and other users, as well as advertisements, by clicking a link at the bottom of the post or content. This makes the content appears in their friends' news feeds. A "Like Button" is also available for use on websites outside FACEBOOK® When the user clicks the Like button on web site, a story appears in the user's friends' news feed with a link back to the website. Further, a "wall" is a space on each user's profile page that allows friends to post messages for the user. One user's wall is visible to anyone with the ability to see his or her full profile, and different users' wall posts show up in an individual's news feed.

TWITTER® is an example of an online social networking and microblogging service that enables its users to send and read text-based posts of up to 140 characters, known as "tweets."

Social media can be implemented in any type of network, including the web, a mobile network, e.g., a cellular phone network which uses radio signals, and the like. An example of using social media in a mobile network is when a company monitors and optionally responds to text messages it receives.

One advantage of social media is that it allows a company to manage customer relationships, such as by monitoring customer feedback, responding to complaints and answering questions about their products or services, and establishing a rapport with their customers, who are likely to spread a positive impression of the company to other potential customers. Social media provides a personality and a face for a company, allowing it to engage the community and personalize its business.

A company can also implement software which monitors other web sites and social media platforms, which it does not control, e.g., to detect when its company name or product/service is mentioned.

In this example, the company name is "The Great Outdoors." A region 1102 states: "The Great Outdoors is going public! Participate in our IPO CSOP." A region 1104 states: "An IPO. An Initial Public Offering or IPO is a financial event in which a privately held company sells stock to the public. Learn more." The "Learn more" text can be a hyperlink to another web page with more information. A region 1106 states: "How it works. Three easy steps on how to buy stock in our IPO. Learn more." The "Learn more" text can be a hyperlink to another web page (FIG. 12) with more information. A region 1108 states: "A Prospectus. A prospectus is a legal document that explains the IPO and the risks involved. It is important to read. View the Prospectus." The "View the Prospectus" text can be a hyperlink to another web page with the preliminary prospectus. The service may track when the user accesses, e.g., views, the prospectus to meet legal requirements. The service may also require the user to indicate that he or she has read and understood the terms of the offering.

This figures and others provides example of instructions to the users for participating in the offering.

Figure 12:
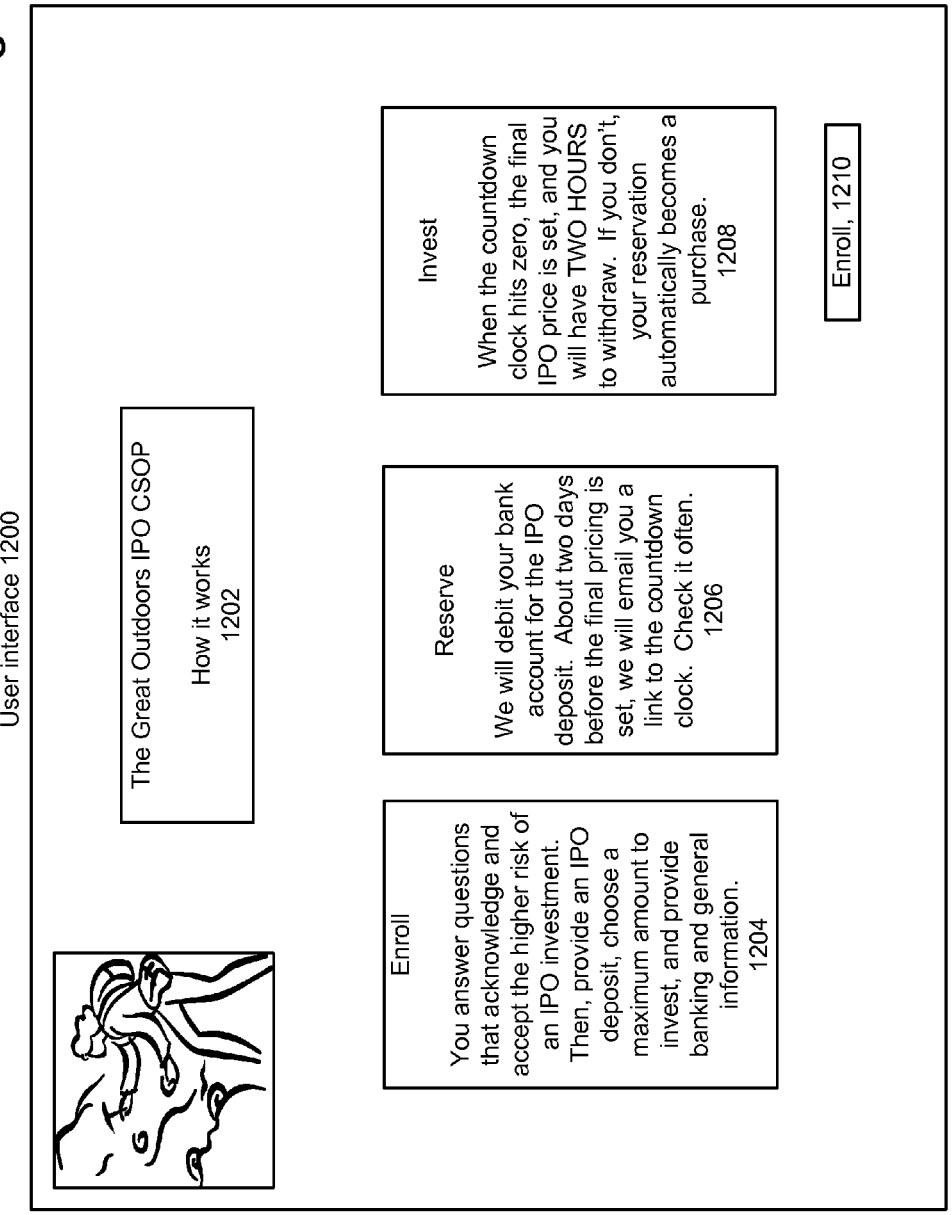

FIG. 12 depicts an example user interface 1200 related to selection 1106 of FIG. 11. Region 1202 states: "The Great Outdoors IPO CSOP. How it works." Region 1204 states: "Enroll. You answer questions that acknowledge and accept the higher risk of an IPO investment. Then, provide an IPO deposit, choose a maximum amount to invest, and provide banking and general information." Region 1206 states: "Reserve. We will debit your bank account for the IPO deposit. About two days before the final pricing is set, we will email you a link to the countdown clock. Check it often." Region 1208 states: "Invest. When the countdown clock hits zero, the final IPO price is set, and you will have TWO HOURS to withdraw. If you don't, your reservation automatically becomes a purchase." The user selects an "Enroll" button to begin the enrollment process.

FIG. 13 depicts an example enrollment user interface 1300 which is provided in response to selection 1210 of FIG. 12. Region 1302 states: "The Great Outdoors IPO CSOP. Enroll." A region 1308 states: "Expected price range of shares is: $10-$20." This is information from the preliminary prospectus. Region 1304 states: "Enter a maximum reserve amount: (An IPO deposit of $300 will be debited)" and region 1306 is a text field which allows the user to enter a dollar or other currency amount. Region 1304 informs the user that the IPO deposit will be debited from the user's payment source and transferred to an escrow account on behalf of the user. As mentioned, the IPO deposit/escrow account will be drawn from at the time of the offering to fund the maximum investment amount. Region 1304 allows the user to enter an instruction setting a maximum reserve amount. A check can be made to ensure that the amount is within prescribed limits, e.g., $50-$300. A region 1310 provides a suitability analysis. The analysis may provide a set of questions and the answers will be screened against the suitability algorithm.

When a broker recommends an investment to a customer, the broker is required to conduct a suitability analysis.

Where an online IPO is set up by a company itself and there is no broker recommendation, there may be an interest in having similar protections or an expectation that a broker-dealer not making a recommendation would still conduct a suitability analysis in an IPO context. As such, a suitability algorithm can be provided which filters each potential investor electronically.

Accordingly, a suitability algorithm can be provided which is tailored to the small amount of the investment. The suitability algorithm need not be as in-depth as a traditional analysis, and in fact, can be performed automatically, with human intervention, by the web service, as an electronic screening. The criteria for the suitability algorithm could be decided by the issuer or it can be variable. It may involve yes/no questions, or may require more detailed responses by the user. It can take the inputs from the user and automatically make a decision as to whether the investment is suitable. If the investment does not appear to be suitable, the service may inform the user via the web page and prevent the user from enrolling in the offering, or warn the user while allowing the user to proceed if desired. Thus, we can electronically eliminate those investors from the reservation/enrollment process that fail to pass the suitability algorithm. Or, if a first round of questions does not clearly establish that the investment is suitable, the user may be asked additional, more detailed and probing questions in a second round. Response to these additional questions may be processed automatically to make a final decision as to whether the investment is suitable.

Thus, the suitability algorithm determines if an investment in the offering is suitable for the user, and the user is allowed to enroll in the offering upon the suitability algorithm determining that the offering is suitable for the user, in one implementation.

The suitability algorithm can include a questionnaire, where, for at least one user, responses by the user to the questionnaire are analyzed to determine if an investment in the offering is suitable for the user.

The suitability algorithm can determine a financial profile of the user by accessing electronic records of the user which identify at least one of account balances, credit information and other investments. For example, a transaction node can access locally-held and or remotely-held records with this information.

Region 1312 includes text fields which allow the user to enter user identification information such as: Name, Address, Email address, Password, Date of birth, Phone number and Social security number. Region 1314 includes text fields which allow the user to enter payment source data relating to one or more of a: Checking account (e.g., ACH Bank routing number and Account number), Savings account and Credit card. The user can select a "Review and confirm" button to continue. The IPO deposit can be made from the payment source.

Figure 14:
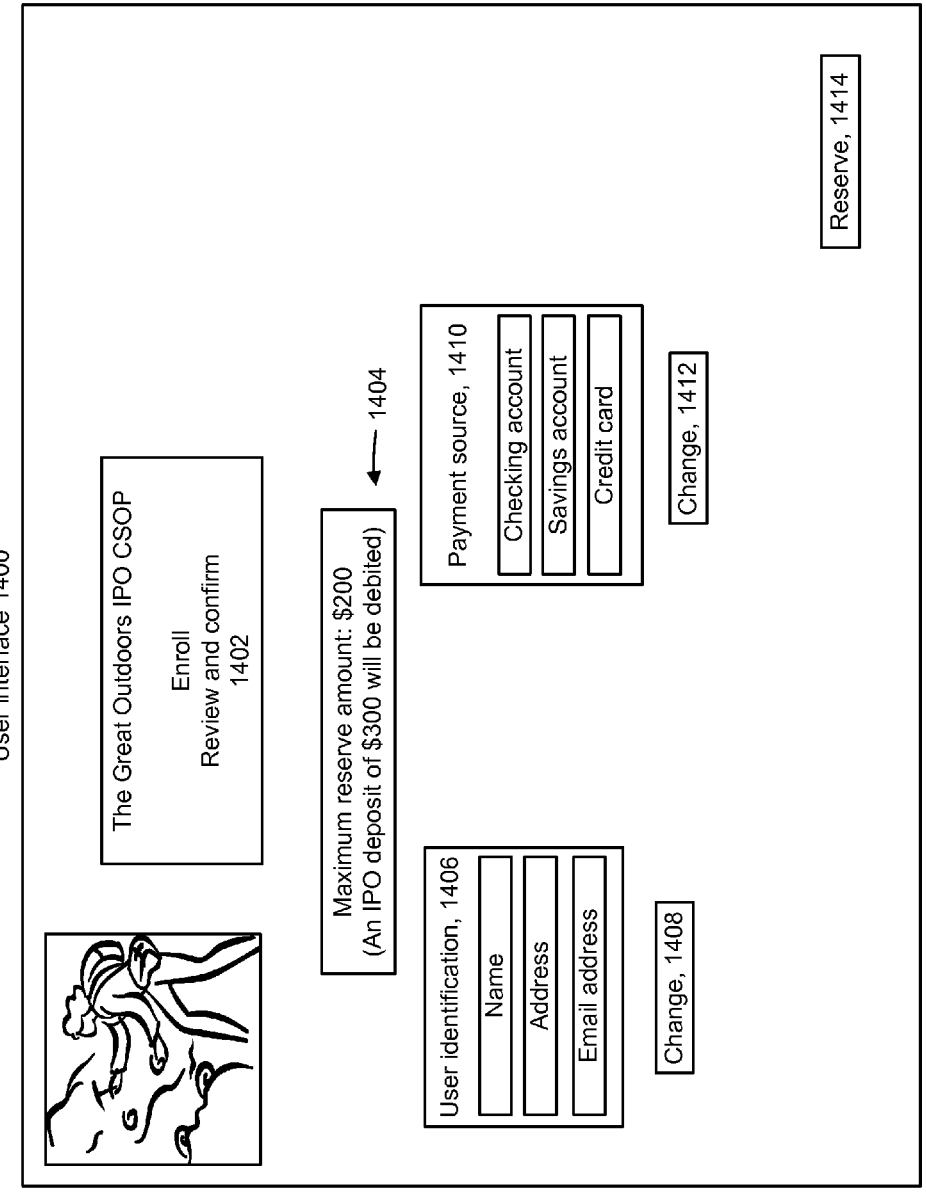

FIG. 14 depicts an example enrollment user interface 1400 which is provided in response to selection 1316 of FIG. 13. This page essentially repeats the information of FIG. 13 to allow the user to review it before submitting it to the transaction node. A region 1402 states: "The Great Outdoors IPO CSOP. Enroll." A region 1404 indicates the maximum reserve amount which the user entered. This is the maximum investment which the user can make during the purchase transaction, in one approach. The user could reduce the amount or withdraw during the purchase transaction. The user has entered $200 as the maximum reserve amount (via text field 1306). The payment source will be debited for the IPO deposit. A region 1406 provides the User identification such as Name, Address and Email address. A "Change" button 1408 can be selected to change the User identification data. A region 1410 provides the Payment source data for: Checking account, Savings account and Credit card. A "Change" button 1412 can be selected to change the Payment source data. A "Reserve" button 1414 can be selected to submit the data to thereby complete the reservation of shares in the offering. As mentioned, the reservation does not represent a firm purchase offer since securities regulations require that the user be able to reduce the investment amount or withdraw from the offering once the final price of the shares is set, at the start of the time window.

FIG. 15A depicts an example user interface 1500 of an email communication which is provided in step 900 of FIG. 9A. Region 1502 states: "The Great Outdoors IPO CSOP. Email with notice of upcoming time window." A region 1504 states;

"Dear Customer: You have enrolled and made a reservation in the Great Outdoors IPO CSOP. The "heads up" email is intended to alert you that the final IPO price will be set in approximately TWO DAYS.

Click the "Link to Countdown Clock" button below for the "Countdown Clock" web page. This is the web page from which you will make your final investment decision—after you see the final IPO share price. Once the final price is set, you will have a TWO HOUR period to make your final investment decision.

Check back often to make sure you don't miss the TWO HOUR period after the final share price is set to make one of the following decisions:

1. If the final price is within the expected price range of $10-$20, you can elect to withdraw or to reduce your purchase amount. Any remaining deposit will be returned. If you don't withdraw, your reservation automatically becomes a purchase.

2. If the final price is not within the expected price range of $10-$20, you must reconfirm your purchase. Otherwise, your purchase will be withdrawn. Any remaining deposit will be returned."

A "Link to Countdown Clock" button 1506 can be selected to access the "Countdown Clock" web page (see, e.g., FIGS. 16A and 16B).

Optionally, when the final price is set, such as on the date of the offering, before the time window, a further electronic communication such as an email, a text message, or an update to a FACEBOOK page can be provided to the users to inform them that the final price is outside the expected range, so they are required to access the transaction user interface to provide an instruction setting a maximum investment amount, in order to buy shares in the offering. For example, the communication can be provided based on user contact information in the accounts of the users. The contact information can be an email address when an email is sent, or a FACEBOOK account identifier when a web page or "wall" of the user is updated to include the communication. An email or text message can also be sent to the user as a notification that the wall is updated. A TWITTER® message could also be sent as a notification or communication.

Or, a further communication can be provided to the users to inform them that the final price is within the expected range, so they are not required to access the transaction user interface to provide an instruction setting a maximum investment amount, in order to buy shares in the offering. Instead, their maximum reserve amount will automatically become the maximum investment amount. The users whose investment is automatically withdrawn are users of at least a second subset of the plurality of users who do not access the transaction user interface during the time window to provide an instruction setting a maximum investment amount.

Figure 15B:
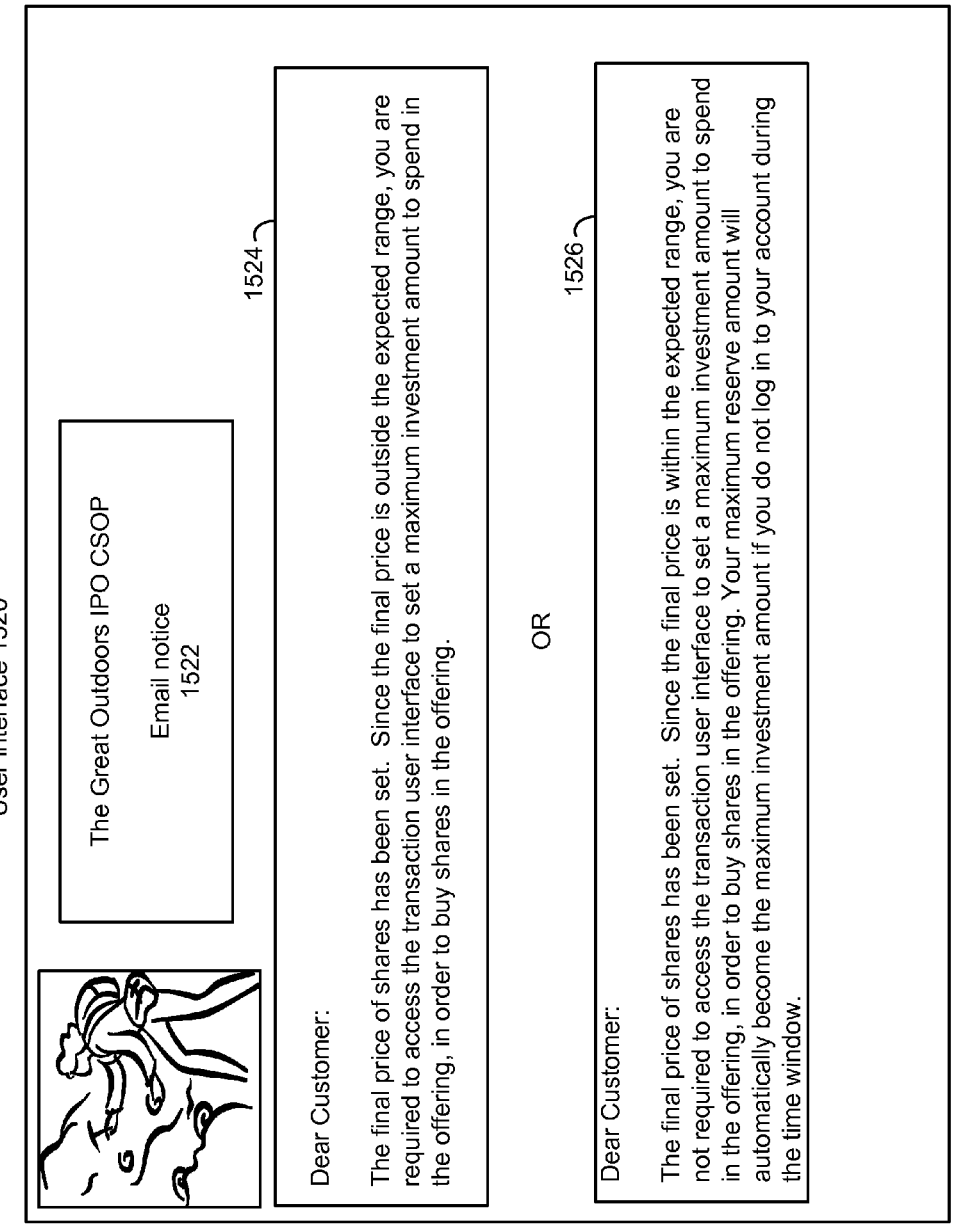
FIG. 15B provides an email which includes a region 1524 or 1526 in case the final price is outside or within, respectively, the expected price range.

For example, FIG. 15B provides an email which includes a region 1524 or 1526 in case the final price is outside or within, respectively, the expected price range. Such an email could be sent on the offering date, at or before T-start, for instance. A region 1522 states: "The Great Outdoors IPO CSOP. Email notice." Region 1524 states: "Dear Customer: The final price of shares has been set. Since the final price is outside the expected range, you are required to access the transaction user interface to set a maximum investment amount to spend in the offering, in order to buy shares in the offering." Region 1526 states: "Dear Customer: The final price of shares has been set. Since the final price is within the expected range, you are not required to access the transaction user interface to set a maximum investment amount to spend in the offering, in order to buy shares in the offering. Your maximum reserve amount will automatically become the maximum investment amount if you do not log in to your account during the time window."

FIGS. 16A-20 relate to step 224 of FIG. 2.

FIG. 16A depicts an example user interface 1600 of a countdown clock which is provided in response to selection 1506 of FIG. 15A. Region 1602 states: "The Great Outdoors IPO CSOP. Web page with countdown clocks." Region 1604 states: "Time left until the start of the purchase time window is: 01 day, 2 hours, 20 mins (region 1606). Please bookmark this page and check back frequently as the countdown time can change in real time. When the clock reaches zero, the final share price will have been set and you will have TWO HOURS to make your final investment decision." Region 1606 thus provides a countdown clock to the start of the time window. A region 1608 asks the user to: "Login to your IPO CSOP account" by entering the user login id (identifier) in a user id text field 1610, entering a password in a password text field 1612, and selecting a "Submit" button 1614.

Optionally, a region 1616 states: "The time left until you can enter the wait process for the purchase time window is: 01 day, 18 hours, 20 mins (region 1618)." Region 1618 thus provides a countdown clock to the start of the time at which the user can enter the wait process (T-initial), which, in this example, is two hours before the start of the time window (T-start). The wait process is optional. When it is used, the users may not be allowed to enter the wait process until T-start or some specified earlier time. Consider the previous example, where T-initial is September 3 at 4 pm, T-start is September 3 at 6 pm and T-end is September 3 at 8 pm. The current date/time (region 1605) is September 1, 3:40 pm.

FIG. 16B depicts an example user interface 1620 which follows the user interface 1600 of FIG. 16A when the user is able to log in to the IPO CSOP account.

Region 1622 is the same as region 1604 of FIG. 16A except the countdown clock 1624 is now at 1 hour, 15 min. A region 1626 states: "You are now able to enter the wait process for the purchase time window." In the above example, the user is allowed to enter the wait process two hours before the start of the time window. Since the current time is 1 hour, 15 min, before the start of the time window, the user is informed that he or she is now allowed to enter the wait process. The user enters the user login id into a user id text field 1610 and the password into the password text field 1612, and selects a "Submit" button to login to the wait process. The current date/time (region 1607) is September 3, 4:45 pm.

Figure 16C:
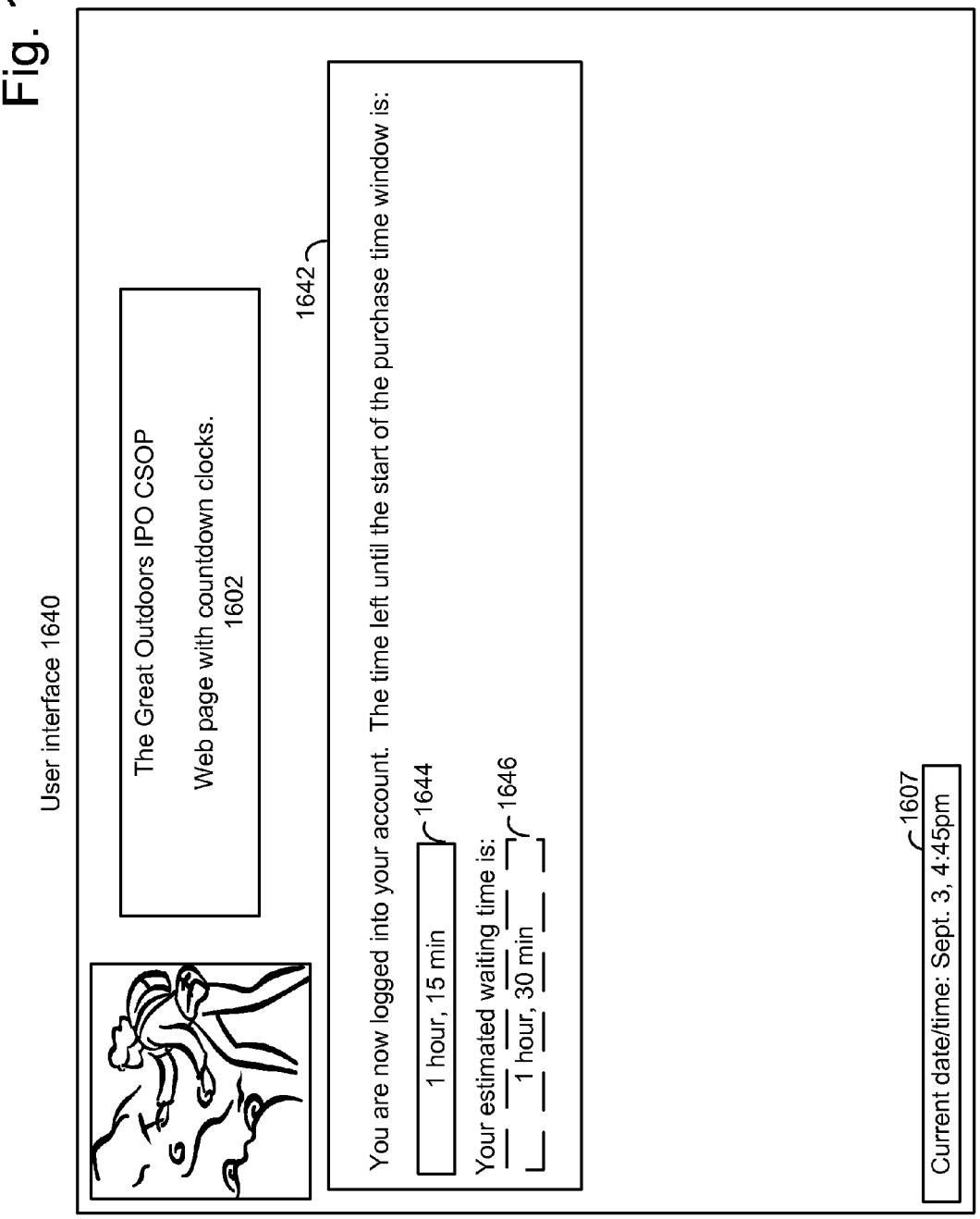
FIG. 16C depicts an example user interface 1640 which follows the user interface 1620 of FIG. 16B after the user logs in to the IPO CSOP account, and an estimated waiting time for the user is displayed.

FIG. 16C depicts an example user interface 1640 which follows the user interface 1620 of FIG. 16B after the user logs in to the IPO CSOP account, and an estimated waiting time for the user is displayed. Specifically, region 1642 states: "You are now logged into your account. The time left until the start of the purchase time window is: 1 hour, 15 min" (in countdown block 1644). Additionally, a new countdown clock 1646 is now displayed which informs the user that: "Your estimated waiting time is: 1 hour, 30 min." This means the user should be able to access a transaction node about 15 minutes after T-start (see, e.g., FIG. 9F). The countdown clock 1646 thus provides a countdown to the start of the time at which the user is estimated to be able to login to a transaction node and conduct a purchase transaction. The current date/time (region 1607) is still September 3, 4:45 pm.

Figure 16D:
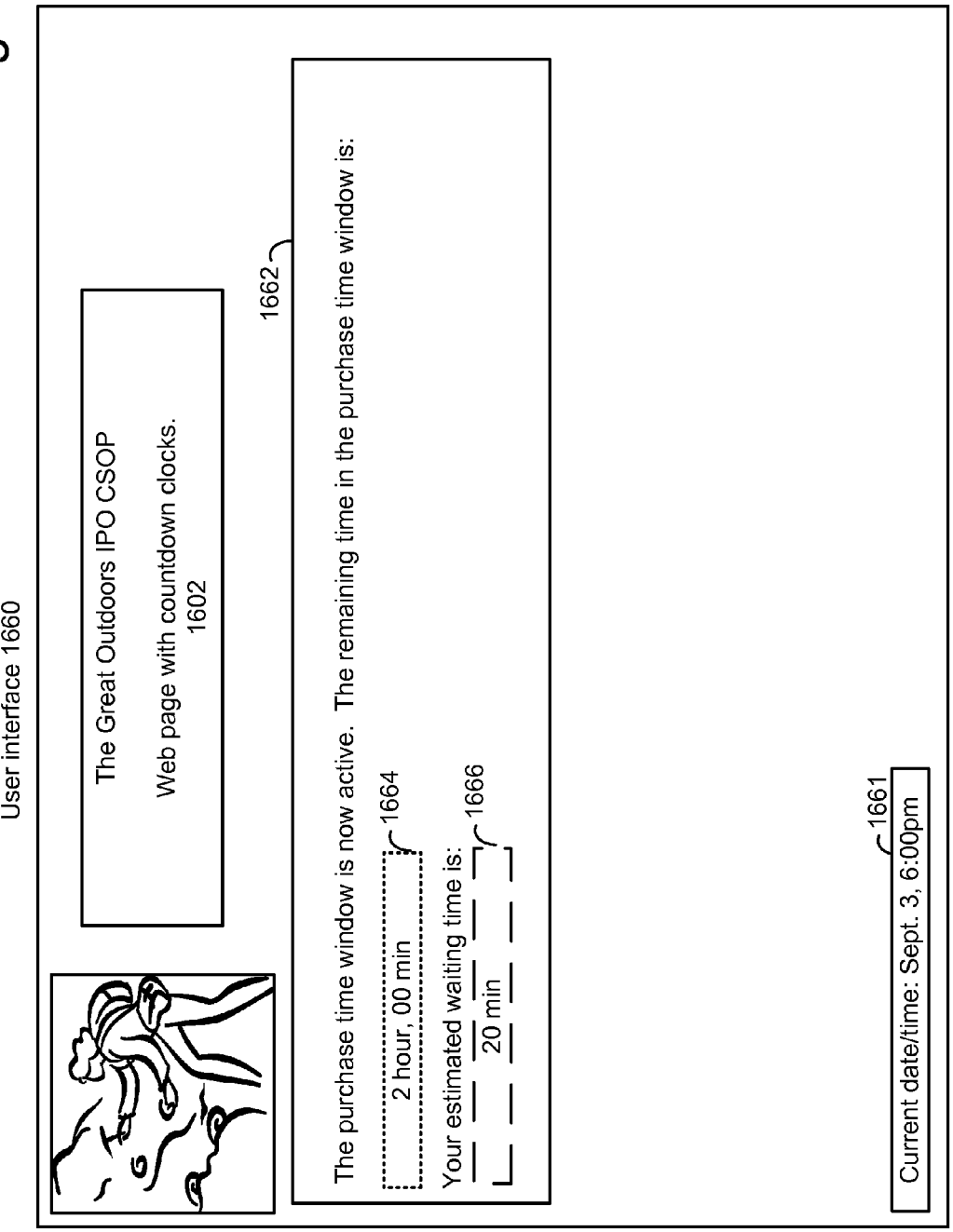
FIG. 16D depicts an example user interface 1660 which follows the user interface 1640 of FIG. 16C at a start of the purchase time window.

FIG. 16D depicts an example user interface 1660 which follows the user interface 1640 of FIG. 16C at a start of the purchase time window. Region 1662 states: "The purchase time window is now active. The remaining time in the purchase time window is: 2 hour, 00 min" (countdown clock 1664). The current time corresponds to the countdown clock 1644 of FIG. 16C reaching zero. The countdown clock 1664 is a new clock which provides a countdown to the end of the time window. The region 1666 is a continuation of the countdown clock 1646 of FIG. 16D and indicates that the current estimated waiting time is 20 min. Note that the estimated waiting time was updated relative to FIG. 16C to be 5 minutes later so that the user is estimated to be able to be access a transaction node at 6:20 pm (20 minutes after 6 pm) instead of 6:15 pm (1 hour, 30 minutes after 4:45 pm). The current date/time (region 1661) is September 3, 6:00 pm.

FIG. 16E depicts an example transaction user interface 1680 which follows the user interface 1660 of FIG. 16D, where the user is able to log in to complete a purchase transaction. A region 1682 states: "It is now your turn to complete your purchase transaction in The Great Outdoors IPO CSO. The remaining time in the purchase time window is: 1 hour, 40 min" (countdown clock 1684). The current date/time (region 1681) is September 3, 6:20 pm. Region 1686 states: "Login again to complete your purchase transaction." The user interface 1680 can be a web page which is served to the user's computing device by a transaction node, based on a URL of the transaction node which is automatically provided to the user's computing device by the wait node in response to the user's computing device querying the wait node with an arrival stamp for which the time or sequence number is now before the demarcation value. As mentioned, when providing a URL to direct the user's computing device to one of the transaction nodes, the wait node can attempt to determine the home transaction node of the user by reading a cookie file from the user's computing device. If the wait node can make this determination, it provides a URL of the home transaction node. If the wait node cannot make this determination, it provides a URL of a transaction node which can be selected randomly or based on other criteria. The URL which is provided can be a special URL for the purchase transaction and was previously withheld from user to prevent the user from accessing the transaction node out of turn.

Note that this is a second login of the user in the process. Optionally, different login credentials such as different passwords are used in each login. This allows the process to be more secure. Also, this second login allows a non-home transaction node to redirect a user to a home transaction node such as discussed in connection with FIGS. 6 and 7. The second login is optional, as the user can alternatively be directed to a web page to perform the purchase transaction without a further login.

The user enters the user login id into a user id text field 1688 and tabs to the password text field 1690. As discussed, in response to this action, before the user enters the password and selects the "Submit" button 1692, code at the user's computing device causes the user's computing device to communicate the user login id to the transaction node. The transaction node uses the user login id, or other identifier of the user, to determine whether the user's computing device should be redirected. If the user's computing device should be redirected, the transaction node provides code, e.g., by modifying code at the user's computing device, to provide the redirection.

The user enters the password in the password text field 1690 and selects the "Submit" button 1692. In response, the password and a request to login are transmitted to the home transaction node. The user interface of either FIG. 16 or 17 follows. Subsequent communications occur in a session between the user's computing device and the home transaction node.

FIG. 17 depicts an example transaction user interface 1700 which follows the user interface 1680 of FIG. 16E, in which the user can complete a purchase transaction, where the final share price is within the expected range. The current date/time (region 1701) is September 3, 6:21 pm. A region 1702 states: "The Great Outdoors IPO CSOP. Web page for final decision (share price is within expected range)." A region 1704 states: "The remaining time in the purchase time window is: 1 hour, 39 min" (countdown clock 1706). Region 1710 states: "Final share price is: $15." Region 1712 states: "Expected price range of shares was: $10-$20." Region 1714 states: "Since the final price is within the expected price range of $10-$20, you can elect to withdraw or to reduce your purchase amount. Any remaining deposit will be returned. If you don't withdraw, your reservation automatically becomes a purchase." Region 1716 states: "Your maximum reserve amount:" and region 1718 states: "$200." Region 1722 states "New maximum investment amount: (cannot exceed the maximum reserve amount)." Regions 1720 and 1728 state: "Accept this as the maximum investment amount." The user can select the checkbox 1720 to accept the maximum reserve amount as the maximum investment amount. Or, the user can enter a lower amount, e.g., less than $200 in a text field 1724 and select the checkbox 1726 to accept this new amount as the maximum investment amount. Regions 1720 and 1728 allow the user to enter an instruction setting a maximum investment amount.

Optionally, the user could set a maximum investment amount which is higher than the maximum reserve amount.

A region 1730 states: "Withdraw (I do not want to purchase any shares)." The user selects a button 1732 which states: "Review and submit" to continue to FIG. 19.

FIG. 18 depicts an example transaction user interface 1800 which follows the user interface 1680 of FIG. 16E, in which the user can complete a purchase transaction, where the final share price is not within the expected range. FIG. 18 has some similar regions as FIG. 17. Like-numbered elements in the different figures are corresponding. The current date/time (region 1701) is September 3, 6:21 pm. Region 1802 states: "The Great Outdoors IPO CSOP. Web page for final decision (share price is not within expected range)." Region 1810 states: "Final share price is: $22." Region 1814 states: "Since the final price is not within the expected price range of $10-$20, you must reconfirm your purchase. Otherwise, your purchase will be withdrawn. Any remaining deposit will be returned." The user selects the button 1732 which states: "Review and submit" to continue to FIG. 19.

Optionally, a common transaction user interface is used regardless of whether the final share price is within the expected range. When separate transaction user interfaces are used based on whether the final share price is within the expected range, the administrator can configure the desired arrangement when the final share price is known.

FIG. 19 depicts an example transaction user interface 1900 which is provided in response to selection 1732 of FIG. 17 or 18. The current date/time (region 1901) is September 3, 6:26 pm. Region 1902 states: "The Great Outdoors IPO CSOP. Review and confirm." The user can confirm the previously made purchase order. Note that manual interaction of the user with the service is performed via the different user interfaces. A region 1904 informs the user that: "Your maximum investment amount: is "$200." A region 1906 repeats the user identification data provided by the user such as Name, Address and Email address, and a region 1910 repeats the payment source data provided by the user. Note that, in one approach, an IPO deposit in an escrow account has previously been made from the payment source, in which case the maximum investment amount will be drawn from the IPO deposit, as indicated at region 1910. The IPO deposit may also be drawn from for other reasons, such as based on subsequent decisions by the user such as to participate in the post-IPO CSOP and/or in a DRIP, discussed further below. A "Change" button 1908 allows the user identification to be modified by the user. The user selects a "Submit" button 1914 to continue.

Figure 20:
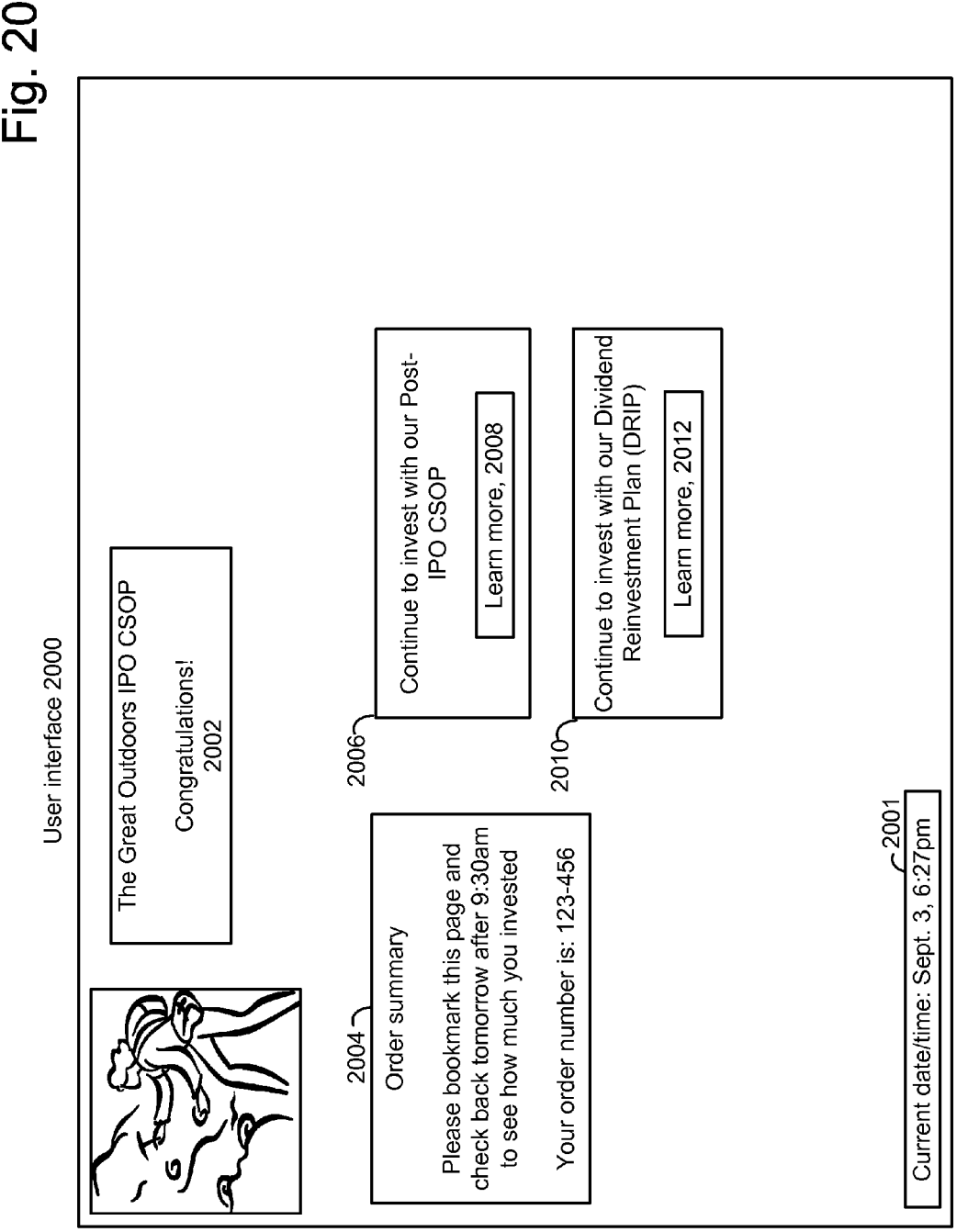

FIG. 20 depicts an example transaction user interface 2000 which is provided in response to selection 1914 of FIG. 19. The current date/time (region 2001) is September 3, 6:27pm. A region 2002 states: "The Great Outdoors IPO CSOP. Congratulations!" A region 2004 states: "Order summary. Please bookmark this page and check back tomorrow after 9:30 am to see how much you invested. Your order number is: 123-456." A region 2006 states: "Continue to invest with our Post-IPO CSOP. Learn more" (button 2008, resulting in FIG. 23 when selected). A region 2010 states: "Continue to invest with our Dividend Reinvestment Plan (DRIP). Learn more" (button 2012, resulting in FIG. 24 when selected). At this time, the time window is still active so the shares have not yet been allocated. The user is thus informed to check back some hours later when the allocation has been made.

Figure 21:
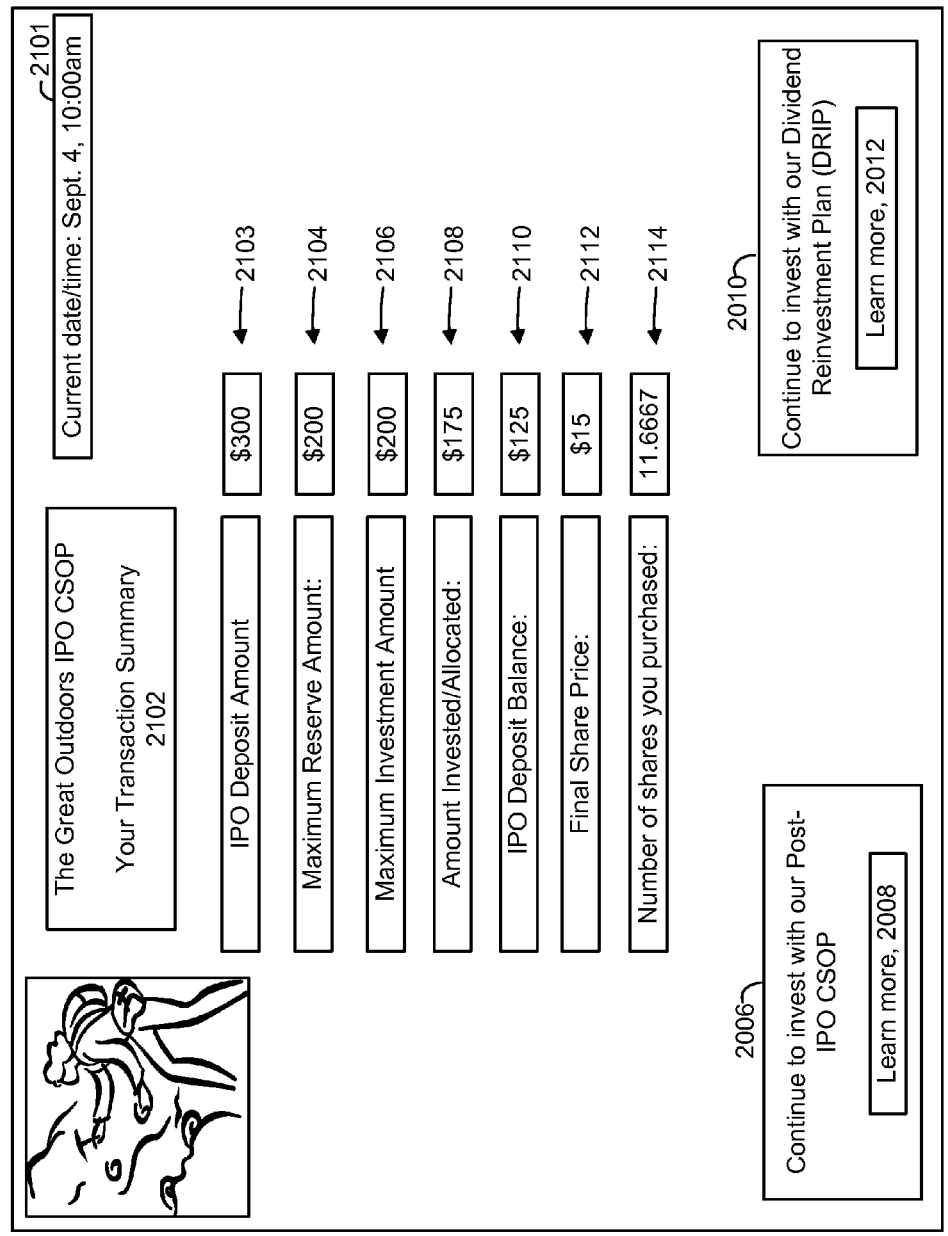
FIG. 21 relates to step 226 of FIG. 2 and depicts an example post-offering user interface 2100 which provides a transaction summary.

FIG. 21 relates to step 226 of FIG. 2 and depicts an example post-offering user interface 2100 which provides a transaction summary. The current date/time (region 2101) is September 4, 10:00 am, several hours after the end of the time window, and after the shares are allocated. Region 2102 states: "The Great Outdoors IPO CSOP. Your Transaction Summary." Region 2103 indicates that the "IPO Deposit Amount" is $300. Region 2104 indicates that the "Maximum Reserve Amount" is $200. Region 2106 indicates that the "Maximum Investment Amount" is $200. Region 2108 indicates that the "Amount Invested/Allocated" is $175 (this is the value of the shares allocated to the user in an oversubscribed offering). This region could link to an explanation of how the allocation was performed. Region 2110 indicates that the "IPO Deposit Balance" is $125 ($300-$175). Region 2112 indicates that the "Final Share Price" is $15. Region 2114 indicates that the "Number of shares you purchased" is 11.6667 (175/15). Note that a fraction of a share is purchased. Regions 2006 and 2010, discussed in connection with FIG. 20, are repeated here as a further advertisement to encourage the user to participate in these programs.

Note that some of the enrolled users may not log in to the transaction user interface during the time window. For example, some users may realize that the final price of the shares is within the expected range, and are willing to let the maximum reserve amount automatically become the maximum investment amount. These users can also access a user interface such as in FIG. 21. A reminder message such as an email can be communicated to such users (or to all users who were allocated shares) to remind them that the transaction summary is available. If the final share price is outside the expected range and the user does not log in to the transaction user interface during the time window, no shares will be allocated to the user, in one approach. In this case, a transaction summary could be provided which informs the user that he or she has been automatically withdrawn from the offering and allocated no shares.

Generally, of the plurality of users who enroll in the offering, a first subset (e.g., a strict subset, less than all) of these users will participate in the transaction user interface. A second subset (e.g., a strict subset, less than all) of these users will not participate in the transaction user interface. The allocation for each subset can involve updating accounts of the users based on the maximum investment amounts of all enrolled users.

Figure 22:
FIG. 22 depicts an example post-offering user interface 2200 for a Post-IPO CSOP, which is provided in response to selection 2008 of FIG. 20 or 21, and which provides further details of step 228 of FIG. 2.

FIG. 22 depicts an example post-offering user interface 2200 for a Post-IPO CSOP, which is provided in response to selection 2008 of FIG. 20 or 21, and which provides further details of step 228 of FIG. 2. Region 2202 states: "The Great Outdoors IPO CSOP. Continue to invest with our Post-IPO CSOP." Region 2202 states: "As part of The Great Outdoors Post-IPO CSOP, you can choose to buy our stock automatically on a monthly basis or make a one-time purchase. You can opt out at any time.

The Post-IPO CSOP will last 12 months from the date of the IPO. You pay no fees to buy or sell stock.

If you decide to proceed, choose a preset amount from $10 to $50, or a custom amount up to $2,500. For payment, we will automatically debit the same payment source you used in our IPO CSOP."

Regions 2206, 2208 and 2210 and associated checkboxes allow the user to choose a preselected amount ($10, $25 or $50, respectively) which will be deducted from the payment source on a recurring, e.g., monthly, basis. Region 2212 and an associated text field allow the user to set a custom amount to be deducted on a recurring or one time basis. A region 2214 allows the use to view the legally-required prospectus of the Post-IPO CSOP. With this plan, the user buys publically-traded shares of the stock to increase his or her holdings of the stock beyond what was acquired in the IPO. The user selects a "Submit" button 2216 to continue to a "review and confirm" page, similar to FIG. 19, to place the order.

Figure 23:
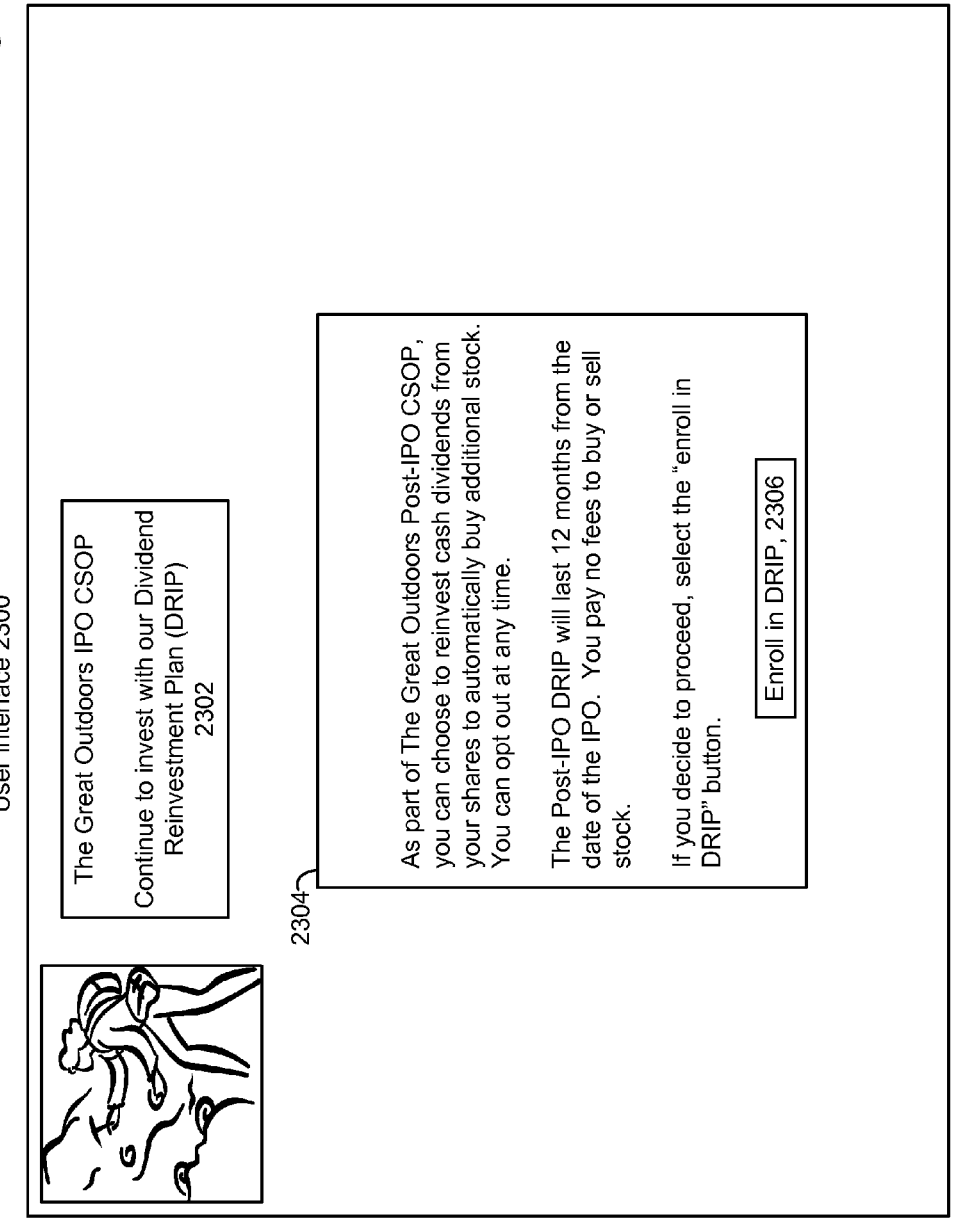
FIG. 23 depicts an example post-offering user interface 2300 for a Post-IPO DRIP, which is provided in response to selection 2012 of FIG. 20 or 21, and which provides further details of step 230 of FIG. 2.

FIG. 23 depicts an example post-offering user interface 2300 for a Post-IPO DRIP, which is provided in response to selection 2012 of FIG. 20 or 21, and which provides further details of step 230 of FIG. 2. Region 2302 states: "The Great Outdoors IPO CSOP. Continue to invest with our Dividend Reinvestment Plan (DRIP)." Region 2304 states: "As part of The Great Outdoors Post-IPO CSOP, you can choose to reinvest cash dividends from your shares to automatically buy additional stock. You can opt out at any time.

The Post-IPO DRIP will last 12 months from the date of the IPO. You pay no fees to buy or sell stock.

If you decide to proceed, select the 'enroll in DRIP' button" (button 2306). No amount need be selected by the user since all dividends will be reinvested. The user selects the button 2306 to continue to a "review and confirm" page, similar to FIG. 19, to place the order.

The foregoing detailed description has been presented for purposes of illustration and description. It is not intended to be exhaustive or limited to the precise form disclosed. Many modifications and variations are possible in light of the above teaching. The described embodiments were chosen in order to best explain the principles of the technology and its practical application, to thereby enable others skilled in the art to best utilize the technology in various embodiments and with various modifications as are suited to the particular use contemplated. It is intended that the scope of the technology be defined by the claims appended hereto.

What is claimed is:

1. A computer-implemented method of sharing user enrollment data, comprising:
   receiving requests from users to enroll with a web-based service, a plurality of computing devices run separate instances of the web-based service;
   assigning the users to the plurality of computing devices, one computing device per user;
   at each computing device of the plurality of computing devices, maintaining one or more blocks of user enrollment data of the users assigned to the computing device;
   in response to one or more of the computing devices being assigned a threshold number of users, designating the one or more of the computing devices as one or more deactivated computing devices which are not assigned additional users, while a subset of computing devices of the plurality of computing devices remain as active computing devices and are assigned additional users; and
   causing the active computing devices to update one another regarding the one or more blocks of the active computing devices with more urgency than an urgency by which the active computing devices update the one or more deactivated computing devices regarding the one or more blocks of the active computing devices.

2. The computer-implemented method of claim 1, wherein:
   the causing the active computing devices to update one another regarding the one or more blocks of the active computing devices with more urgency than the urgency by which the active computing devices update the one or more deactivated computing devices regarding the one or more blocks of the active computing devices, comprises causing one of the active computing devices to update all other of the active computing devices regarding a partial block and a full block of the one of the active computing devices and to update the one or more deactivated computing devices regarding the full block but not the partial block.

3. The computer-implemented method of claim 1, wherein:
   the causing the active computing devices to update one another regarding the one or more blocks of the active computing devices with more urgency than the urgency by which the active computing devices update the one or more deactivated computing devices regarding the one or more blocks of the active computing devices, comprises causing one of the active computing devices to update all other of the active computing devices regarding a partial block of the one of the active computing devices, which is less than a full block, but preventing the one active computing device from updating the one or more deactivated computing devices regarding the partial block.

4. The computer-implemented method of claim 1, wherein:
the assigning of the users to the plurality of computing devices is based on a geographic correspondence between the users and the plurality of computing devices.

5. The computer-implemented method of claim 1, wherein:
the causing the active computing devices to update one another regarding the one or more blocks comprises causing the active computing devices to communicate block identifiers of the one or more blocks to one another.

6. The computer-implemented method of claim 5, wherein:
one of the active computing devices transmits the block identifier of a selected block of the one or more blocks to another of the active computing devices;
the another of the active computing devices compares the block identifier of the selected block to block identifiers of blocks of the another of the active computing devices; and
if the block identifier of the selected block does not match any of the block identifiers of the blocks of the another of the active computing devices, the another of the active computing devices requests the selected block from the one of the active computing devices.

7. The computer-implemented method of claim 1, wherein:
the one or more blocks changed based on a reassignment of a user from one of the active computing devices to another of the active computing devices.

8. The computer-implemented method of claim 1, wherein:
the one or more blocks comprise a new block of user enrollment data.

9. The computer-implemented method of claim 1, wherein:
at each computing device of the plurality of computing devices, each of the one or more blocks of user enrollment data of the users assigned to the computing device comprises rows which comprise user identifiers of the users assigned to the computing device, and a row hash value based on the user identifiers, where groups of the rows are arranged in the block, and each block has a block identifier and a block hash value based on the row hash values of the rows of the block; and
the causing the active computing devices to update one another regarding the one or more blocks comprises causing the active computing devices to communicate the block hash values of the one or more blocks to one another.

10. The computer-implemented method of claim 9, wherein:
one of the active computing devices transmits the block hash value of a selected block of the one or more blocks to another of the active computing devices;
the another of the active computing devices compares the block hash value of the selected block to block hash values of blocks of the another of the active computing devices; and
if the block hash value of the selected block does not match any of the block hash values of the blocks of the another of the active computing devices, the another of the active computing devices requests the selected block from the one of the active computing devices.

11. The computer-implemented method of claim 1, wherein:
the one or more deactivated computing devices comprise a plurality of deactivated computing devices; and
the method performed further comprises causing one deactivated computing device of the plurality of deactivated computing devices to update at least one other deactivated computing device of the plurality of deactivated computing devices but fewer than all other deactivated computing devices of the plurality of deactivated computing devices regarding one or more blocks of the one deactivated computing device, and to update all of the active computing devices regarding the one or more blocks of the one deactivated computing device.

12. The computer-implemented method of claim 1, further comprising:
causing the plurality of computing devices to communicate with one another to advertise an existence of one or more unchanged blocks of user enrollment data.

13. The computer-implemented method of claim 1, wherein:
the causing the active computing devices to update one another regarding the one or more blocks of the active computing devices with more urgency than the urgency by which the active computing devices update the one or more deactivated computing devices regarding the one or more blocks of the active computing devices, comprises causing the active computing devices to update one another with a greater frequency than a frequency with which the one or more deactivated computing devices are updated.

14. The computer-implemented method of claim 1, wherein:
the causing the active computing devices to update one another regarding the one or more blocks of the active computing devices with more urgency than the urgency by which the active computing devices update the one or more deactivated computing devices regarding the one or more blocks of the active computing devices, comprises causing one of the active computing devices to update all other active computing devices of the active computing devices while updating at least one, but fewer than all, of the one or more deactivated computing devices.

15. The computer-implemented method of claim 14, wherein:
the at least one, but fewer than all, of the one or more deactivated computing devices are randomly selected by the one of the active computing devices.

16. The computer-implemented method of claim 1, wherein:
each active computing device of the active computing devices is adapted to use user enrollment data of other active computing devices of the active computing devices to avoid accepting an assignment of a user who was previously assigned to one of the other active computing devices.

17. At least one tangible processor-readable storage device processor-readable code embodied thereon for programming at least one processor to perform a method of sharing user enrollment data, the method comprising the steps of:
receiving requests from users to enroll with a web-based service, a plurality of computing devices run separate instances of the web-based service;
assigning the users to the plurality of computing devices, one computing device per user;
at each computing device of the plurality of computing devices, maintaining one or more blocks of user enrollment data of the users assigned to the computing device;
in response to one or more of the computing devices being assigned a threshold number of users, designating the one or more of the computing devices as one or more deactivated computing devices which are not assigned additional users, while a subset of computing devices of the plurality of computing devices remain as active computing devices and are assigned additional users; and causing the active computing devices to update one another regarding the one or more blocks of the active computing devices with a greater frequency than the active computing devices update the one or more deactivated computing devices regarding the one or more blocks of the active computing devices.

18. A computer-implemented method of sharing user enrollment data comprising:

at one computing device of a plurality of computing devices which run separate instances of a web-based service, maintaining a database of users who are assigned to the one computing device, the database comprises one or more blocks of user enrollment data of the users, each of the one or more blocks comprises rows which include comprise user identifiers of the users assigned to the one computing device, and a row hash value based on the user identifiers, where groups of the rows are arranged in the block, and each block has a block identifier and a block hash value based on the row hash values of the rows of the block;

as additional users are assigned to the one computing device, advertising a block identifier and a block hash value of at least one of the blocks to at least a subset of computing devices of the plurality of computing devices, the subset of computing devices comprises active computing devices which are assigned additional users, the plurality of computing devices comprise deactivated computing devices which are not assigned additional users, and the advertising is directed to all of the active computing devices and to at least one, but fewer than all, of the deactivated computing devices;

receiving a request for the at least one of the blocks from another computing device of the subset of computing devices; and fulfilling the request by communicating the at least one of the blocks to the another computing device.

19. The computer-implemented method of claim 18, wherein: the one computing device randomly selects the fewer than all of the deactivated computing devices.

20. The computer-implemented method of claim 18, further comprising:

receiving an update to a selected block of the one of more of the blocks;

in response to the receiving the update, updating the selected block, updating a block hash value of the selected block to provide an updated block hash value, and advertising a block identifier and the updated block hash value of the selected block to the at least a subset of computing devices;

receiving a request for the selected block from an additional computing device of the subset of computing devices; and fulfilling the request for the selected block by communicating the selected block to the additional computing device.

21. The computer-implemented method of claim 20, wherein:

the update comprises a reassignment of a user from the one computing device to another of the plurality of computing devices.

22. The computer-implemented method of claim 20, wherein:

the update comprises a new user assigned to the one computing device.

23. The computer-implemented method of claim 18, wherein:

the block identifier of the at least one of the blocks is advertised with a range of block identifiers of the one computing device.

24. The computer-implemented method of claim 18, wherein:

the fulfilling of the request updates the another computing device with user enrollment data of the one computing device to allow the another computing device to avoid accepting an assignment of a user who was previously assigned to the one computing device.

25. At least one tangible processor-readable storage device processor-readable code embodied thereon for programming at least one processor to perform a method of sharing user enrollment data, the method comprising:

at one computing device of a plurality of computing devices which run separate instances of a web-based service, maintaining a database of users who are assigned to the one computing device, the database comprises one or more blocks of user enrollment data of the users, each of the one or more blocks comprises rows which include user identifiers of the users assigned to the one computing device, and a row hash value based on the user identifiers, where groups of the rows are arranged in the block, and each block has a block identifier and a block hash value based on the row hash values of the rows of the block;

as additional users are assigned to the one computing device, advertising a block identifier and a block hash value of at least one of the blocks to at least a subset of computing devices of the plurality of computing devices, the subset of computing devices comprises active computing devices which are assigned additional users and the plurality of computing devices comprise deactivated computing devices which are not assigned additional users, and the advertising is directed to all of the active computing devices in the subset of computing devices and to at least one, but fewer than all, of the deactivated computing devices;

receiving a request for the at least one of the blocks from another computing device of the subset of computing devices; and fulfilling the request by communicating the at least one of the blocks to the another computing device.

* * * * *